(12) United States Patent
Puri et al.

(10) Patent No.: US 12,288,135 B2
(45) Date of Patent: Apr. 29, 2025

(54) QUANTUM INFORMATION PROCESSING WITH AN ASYMMETRIC ERROR CHANNEL

(71) Applicant: Yale University, New Haven, CT (US)

(72) Inventors: Shruti Puri, New Haven, CT (US); Alexander Grimm, New Haven, CT (US); Philippe Campagne-Lbarcq, New Haven, CT (US); Steven M. Girvin, Hamden, CT (US); Michel Devoret, New Haven, CT (US)

(73) Assignee: Yale University, New Haven, CT (US)

( * ) Notice: Subject to any disclaimer, the term of this patent is extended or adjusted under 35 U.S.C. 154(b) by 1094 days.

(21) Appl. No.: 17/253,460

(22) PCT Filed: Jun. 28, 2019

(86) PCT No.: PCT/US2019/039945
§ 371 (c)(1),
(2) Date: Dec. 17, 2020

(87) PCT Pub. No.: WO2020/068237
PCT Pub. Date: Apr. 2, 2020

(65) Prior Publication Data
US 2021/0125096 A1 Apr. 29, 2021
US 2021/0390444 A9 Dec. 16, 2021

Related U.S. Application Data

(60) Provisional application No. 62/692,243, filed on Jun. 29, 2018.

(51) Int. Cl.
*G06N 10/70* (2022.01)
*G06N 10/40* (2022.01)
*H04L 1/04* (2006.01)

(52) U.S. Cl.
CPC .............. *G06N 10/70* (2022.01); *G06N 10/40* (2022.01); *H04L 1/04* (2013.01)

(58) Field of Classification Search
CPC ........ G06N 10/00; G06N 10/40; G06N 10/70; B82Y 10/00; H04L 1/04
See application file for complete search history.

(56) References Cited

U.S. PATENT DOCUMENTS 5,635,834 A 6/1997 Sloggett et al.
7,135,701 B2 11/2006 Amin et al.
(Continued)

FOREIGN PATENT DOCUMENTS

CN 101548288 A 9/2009
CN 103246017 A 8/2013
(Continued)

OTHER PUBLICATIONS

Terhal, "Quantum Error Correction for Quantum Memories," in 87 Rev. Modern Physics 307-46 (2015). (Year: 2015).*
(Continued)

*Primary Examiner* — Ryan C Vaughn
(74) *Attorney, Agent, or Firm* — Wolf, Greenfield & Sacks, P.C.

(57) ABSTRACT

Techniques for performing quantum information processing using an asymmetric error channel are provided. According to some aspects, a quantum information processing includes a data qubit and an ancilla qubit, the ancilla qubit having an asymmetric error channel. The data qubit is coupled to the ancilla qubit. The ancilla qubit may be driven with a stabilizing microwave field to create the asymmetric error channel.

22 Claims, 14 Drawing Sheets

(56) References Cited

U.S. PATENT DOCUMENTS

| | | | |
|---|---|---|---|
| 7,307,275 | B2 | 12/2007 | Lidar et al. |
| 7,616,452 | B2 | 11/2009 | Wehrly, Jr. et al. |
| 7,791,780 | B2 | 9/2010 | Munro et al. |
| 7,966,549 | B2 | 6/2011 | Hollenberg et al. |
| 8,032,474 | B2 | 10/2011 | Macready et al. |
| 8,510,618 | B1 | 8/2013 | Pesetski et al. |
| 9,907,181 | B2 | 2/2018 | Kraft et al. |
| 10,127,499 | B1 | 11/2018 | Rigetti et al. |
| 10,248,491 | B1 * | 4/2019 | Zeng ................ G06F 11/1048 |
| 11,635,456 | B2 | 4/2023 | Ofek et al. |
| 2004/0000066 | A1 | 1/2004 | Ely et al. |
| 2004/0000666 | A1 | 1/2004 | Lidar et al. |
| 2004/0059760 | A1 | 3/2004 | Ageishi et al. |
| 2007/0296953 | A1 | 12/2007 | Allen et al. |
| 2008/0185576 | A1 | 8/2008 | Hollenberg et al. |
| 2009/0241013 | A1 | 9/2009 | Roetteler |
| 2011/0060710 | A1 | 3/2011 | Amin |
| 2014/0264285 | A1 | 9/2014 | Chow et al. |
| 2014/0368234 | A1 | 12/2014 | Chow et al. |
| 2016/0071021 | A1 | 3/2016 | Raymond |
| 2016/0267032 | A1 | 9/2016 | Rigetti et al. |
| 2016/0381800 | A1 | 12/2016 | Yagnamurthy et al. |
| 2017/0062692 | A1 | 3/2017 | Dial et al. |
| 2018/0330266 | A1 | 11/2018 | Simmons et al. |
| 2019/0020346 | A1 | 1/2019 | Wang et al. |
| 2019/0049495 | A1 | 2/2019 | Ofek et al. |
| 2020/0334104 | A1 | 10/2020 | Rosenblum et al. |

FOREIGN PATENT DOCUMENTS

| | | |
|---|---|---|
| CN | 104468529 A | 3/2015 |
| CN | 105281886 A | 1/2016 |
| CN | 106537424 A | 3/2017 |
| CN | 107431541 A | 12/2017 |
| JP | 2006-526794 A | 11/2006 |
| JP | 2010-511946 A | 4/2010 |
| JP | 2013-121161 A | 6/2013 |
| JP | 2014-523705 A | 9/2014 |
| JP | 2016-518637 A | 6/2016 |
| WO | WO 2005/093649 A1 | 10/2005 |
| WO | WO 2015/178992 A2 | 11/2015 |
| WO | WO 2016/138378 A1 | 9/2016 |
| WO | WO 2017/065856 A2 | 4/2017 |
| WO | WO 2017/115160 A1 | 7/2017 |
| WO | WO 2017/123940 A1 | 7/2017 |
| WO | WO 2017/139683 A1 | 8/2017 |
| WO | WO 2017/151200 A1 | 9/2017 |
| WO | WO 2018/089850 A1 | 5/2018 |

OTHER PUBLICATIONS

Extended European Search Report for European Application No. 19866408.8, dated Feb. 28, 2022.
Blumoff et al., Implementing and characterizing precise multiqubit measurements. Physical Review X. Sep. 14, 2016;6(3):031041.
Cohen, Autonomous quantum error correction with superconducting qubits. Université Paris Sciences et Lettres Doctoral Dissertation. Jun. 22, 2017:1-165.
Frattini et al., Optimizing the nonlinearity and dissipation of a snail parametric amplifier for dynamic range. Physical Review Applied. Nov. 8, 2018;10(5):054020.
Hu et al., Quantum error correction and universal gate set operation on a binomial bosonic logical qubit. Nature Physics. May 2019;15(5):503-8.
*U.S. Appl. No. 16/076,411, filed Aug. 8, 2018, Ofek et al.
*U.S. Appl. No. 16/959,251, filed Jun. 30, 2020, Rosenblum et al.
PCT/US2017/017534, Apr. 20, 2017, International Search Report and Written Opinion.
PCT/US2017/017534, Aug. 23, 2018, International Preliminary Report on Patentability.
EP17750901.5, Oct. 2, 2019, Extended European Search Report.
PCT/US2019/012441, Jul. 25, 2019, International Search Report and Written Opinion.
PCT/US2019/012441, Jul. 16, 2020, International Preliminary Report on Patentability.
PCT/US2019/039945, Mar. 9, 2020, International Search Report and Written Opinion.
PCT/US2019/039945, Jan. 7, 2021, International Preliminary Report on Patentability.
Extended European Search Report for European Application No. 19751978.8, dated Sep. 6, 2021.
Reinhold et al., Error-corrected gates on an encoded qubit. Nature Physics. Aug. 2020;16(8):822-6.
International Search Report and Written Opinion mailed Apr. 20, 2017 in connection with International Application No. PCT/US2017/017534.
International Preliminary Report on Patentability mailed Aug. 23, 2018 in connection with International Application No. PCT/US2017/017534.
Extended European Search Report for European Application No. 17750901.5, dated Oct. 2, 2019.
International Search Report and Written Opinion for International Application No. PCT/US2019/012441, mailed Jul. 25, 2019.
International Preliminary Report on Patentability for International Application No. PCT/US2019/012441, mailed Jul. 16, 2020.
International Search Report and Written Opinion for International Application No. PCT/US2019/039945, mailed Mar. 9, 2020.
Albert et al., Pair-cat codes: autonomous error-correction with low-order nonlinearity. Quantum Science and Technology. Jul. 2019;4(3):035007.
Albert et al., Performance and structure of single-mode bosonic codes. Physical Review A. Mar. 30, 2018;97(3):032346.
Aliferis et al., Fault-tolerant computing with biased-noise superconducting qubits: a case study. New Journal of Physics. Jan. 30, 2009;11(1):013061.
Aliferis et al., Fault-tolerant quantum computation against biased noise. Physical Review A. Nov. 19, 2008;78(5):052331.
Aoki et al., Quantum error correction beyond qubits. Nat. Phys. Aug. 2009;5(8):541-6.
Barends et al., Superconducting quantum circuits at the surface code threshold for fault tolerance. Nature. Apr. 2014;508(7497):500-3.
Bergeal et al., Phase-preserving amplification near the quantum limit with a Josephson ring modulator. Nature. May 2010;465(7294):64-8.
Bermudez et al., Robust trapped-ion quantum logic gates by continuous dynamical decoupling. Physical Review A. 2012;85:9 pages.
Berry et al., How to perform the most accurate possible phase measurements. Physical Review A. Nov. 23, 2009;80(5):052114.
Berry et al., Optimal input states and feedback for interferometric phase estimation. Physical Review A. Apr. 12, 2001;63(5):053804-1-11.
Bertet et al., Direct Measurement of the Wigner Function of a One-Photon Fock State in a Cavity. Phys. Rev. Lett. Oct. 28, 2002;89(20):200402-1-4.
Blais et al., Cavity quantum electrodynamics for superconducting electrical circuits: An architecture for quantum computation. Phys. Rev. A. Jun. 29, 2004;69(6):062320.
Boissonneault et al., Nonlinear dispersive regime of cavity QED: The dressed dephasing model. Physical Review A. Jun. 17, 2008;77(6):060305.
Braunstein et al., Dense coding for continuous variables. Phys. Rev. A. Apr. 2000;61(4):042302.
Braunstein et al., Teleportation of continuous quantum variables. Phys. Rev. Lett. Jan. 26, 1998;80(4):869-72.
Braunstein, Quantum error correction for communication with linear optics. Nature. Jul. 2, 1998;394(6688):47-9.
Brecht et al., Demonstration of superconducting micromachined cavities. Applied Physics Letters. Nov. 9, 2015;107(19):192603.
Brecht et al., Multilayer microwave integrated quantum circuits for scalable quantum computing. NPJ Quantum Information. Feb. 23, 2016;2:16002.
Brooks et al., Fault-tolerant quantum computation with asymmetric Bacon-Shor codes. Physical Review A. Mar. 7, 2013;87(3):032310.
Brune et al., Quantum nondemolition measurement of small photon numbers by Rydberg-atom phase-sensitive detection. Phys. Rev. Lett. Aug. 20, 1990;65(8):976-9.

(56) References Cited

OTHER PUBLICATIONS

C'Orcoles et al., Demonstration of a quantum error detection code using a square lattice of four superconducting qubits. Nat. Comm. Apr. 29, 2015;6:6979.
Cahill et al., Density operators and quasiprobability distributions. Phys. Rev. Jan. 25, 1969;177(5):1882-1902.
Calderbank et al., Good quantum error-correcting codes exist. Physical Review A. Aug. 1, 1996;54(2):1098-105.
Chiaverini et al., Realization of quantum error correction. Nature. Dec. 2004;432(7017):602-5.
Chow et al., Universal quantum gate set approaching fault-tolerant thresholds with superconducting qubits. Phys. Rev. Lett. Aug. 9, 2012;109(6):060501-1-5.
Cohen et al., Degeneracy-Preserving Quantum Nondemolition Measurement of Parity-Type Observables for Cat Qubits. Physical Review Letters. Aug. 9, 2017;119(6):060503.
Cory et al., Experimental Quantum Error Correction. Phys. Rev. Lett. Sep. 7, 1998;81(10):2152-5.
Cramer et al., Repeated quantum error correction on a continuously encoded qubit by real-time feedback. Nature communications. May 5, 2016;7:11526.
De Fouquieres et al., Second order gradient ascent pulse engineering. J. Mag. Res. Oct. 1, 2011;212(2):412-7.
Deleglise et al., Reconstruction of non-classical cavity field states with snapshots of their decoherence. Nature. Sep. 25, 2008;455(7212):510-4.
Devoret et al., Superconducting Circuits for Quantum Information: An Outlook. Science. Mar. 8, 2013;339(6124):1169-74.
Divincenzo et al., Fault-Tolerant Error Correction with Efficient Quantum Codes. Physical Review Letters. Oct. 1996. 7;77(15):3260-3.
Eastin et al., Restrictions on Transversal Encoded Quantum Gate Sets. Physical Review Letters. Mar. 18, 2009;102(11):110502.
Facchi et al., Quantum zeno subspaces. Physical review letters. Aug. 19, 2002;89(8):080401-1-4.
Flurin et al., Superconducting quantum node for entanglement and storage of microwave radiation. Physical review letters. Mar. 4, 2015;114(9):090503.
Fowler et al., Surface codes: Towards practical large-scale quantum computation. Phys. Rev. A. 2012;86(3):032324-1-48.
Frattini et al., 3-wave mixing Josephson dipole element. Applied Physics Letters. May 29, 2017;110(22):222603-1-4.
Gambetta et al., Building logical qubits in a superconducting quantum computing system. NPJ Quantum Information. Jan. 13, 2017;3(1):2.
Gao et al., Programmable interference between two microwave quantum memories. Physical Review X. Jun. 21, 2018;8(2):021073.
Gilles et al., Generation of nonclassical light by dissipative two-photon processes. Physical Review A. Apr. 1, 1994;49(4):2785-99.
Goto, Universal quantum computation with a nonlinear oscillator network. Physical Review A. May 10, 2016;93(5):050301.
Gottesman et al., Encoding a qubit in an oscillator. Phys. Rev. A. Jun. 11, 2001;64(1):012310-1-21.
Gottesman, An introduction to quantum error correction and fault-tolerant quantum computation. In Quantum information science and its contributions to mathematics. Proceedings of Symposia in Applied Mathematics. Apr. 2010;68:13-58.
Gottesman, Quantum fault tolerance in small experiments. arXiv:1610.03507. 2016:1-8.
Gottesman, Stabilizer codes and quantum error correction. Caltech Ph.D. Thesis. 1997. 122 pages.
Gottesman, Theory of fault-tolerant quantum computation. Phys. Rev. A. Jan. 1, 1998;57(1):127-37.
Hann et al., Robust readout of bosonic qubits in the dispersive coupling regime. Physical Review A. Aug. 6, 2018;98(2):022305.
Haroche et al., Measuring the photon number parity in a cavity: from light quantum jumps to the tomography of non-classical field states. J. Mod. Opt. Sep. 10, 2007;54(13-5):2101-14.
Hatridge et al., Quantum Back-Action of an Individual Variable-Strength Measurement. Science. Jan. 11, 2013;339(6116):178-81.
Heeres et al., Cavity state manipulation using photon-number selective phase gates. Phys. Rev. Lett. Sep. 22, 2015;115(13):137002-1-5.
Hofheinz et al., Synthesizing arbitrary quantum states in a superconducting resonator. Nature. May 28, 2009; 459(7246): 546-9.
Imamog et al., Stochastic wave-function approach to non-markovian systems. Physical Review A. Nov. 1, 1994;50(5):3650.
Jensen et al., Quantum memory for entangled continuous-variable states. Nat. Phys. Jan. 2011;7(1):13.
Johansson et al., Qutip: An open-source python framework for the dynamics of open quantum systems. Computer Physics Communications. Aug. 1, 2012;183(8):1760-72.
Kapit., Error-transparent quantum gates for small logical qubit architectures. Physical Review Letters. Feb. 1, 2018;120(5):050503-1-5.
Kelly et al., State preservation by repetitive error detection in a superconducting quantum circuit. Nature. Mar. 2015;519(7541):66-9.
Khaneja et al., Optimal control of coupled spin dynamics: design of nmr pulse sequences by gradient ascent algorithms. J. Mag. Res. Feb. 1, 2005;172(2):296-305.
Kirchmair et al., Observation of quantum state collapse and revival due to the single-photon Kerr effect. Nature. Mar. 14, 2013;495(7440):205-9.
Kitaev, Fault-tolerant quantum computation by anyons. Annals of Physics. Jan. 1, 2003;303(1):2-30.
Knill et al., A scheme for efficient quantum computation with linear optics. Nature. Jan. 2001; 409(6816):46-52.
Knill et al., Benchmarking quantum computers: The five-qubit error correcting code. Phys. Rev. Lett. Jun. 18, 2001;86(25):5811-4.
Knill et al., Resilient quantum computation: error models and thresholds. Proceedings of the Royal Society of London A: Mathematical, Physical and Engineering Sciences. Jan. 8, 1998;454(1969):365-84.
Leghtas et al., Confining the state of light to a quantum manifold by engineered two-photon loss. Science. Feb. 20, 2015;347(6224):853-7.
Leghtas et al., Hardware-efficient autonomous quantum memory protection. Phys. Rev. Lett. Sep. 20, 2013;111(12):120501.
Leung et al., Experimental realization of a two-bit phase damping quantum code. Phys. Rev. A. Sep. 1, 1999;60(3):1924-43.
Linke et al., Fault-tolerant quantum error detection. Science Advances. Oct. 1, 2017;3(10):e1701074.
Liu et al., Comparing and combining measurement-based and driven-dissipative entanglement stabilization. Physical Review X. Mar. 3, 2016;6(1):011022-1-18.
Lloyd et al., Analog quantum error correction. Phys. Rev. Lett. May 4, 1998;80(18):4088-91.
Lloyd et al., Quantum computation over continuous variables. Phys. Rev. Lett. Feb. 22, 1999;82(8):1784-7.
Lund et al., Fault-tolerant linear optical quantum computing with small-amplitude coherent states. Phys. Rev. Lett. Jan. 25, 2008;100(3):030503.
Lutterbach et al., Method for direct measurement of the Wigner function in cavity QED and ion traps. Phys. Rev. Lett. Mar. 31, 1997;78(13) 2547-50.
Menicucci et al., Universal Quantum Computation with Continuous-Variable Cluster States. Phys. Rev. Lett. Sep. 13, 2006;97(11):110501.
Michael et al., New class of quantum error-correcting codes for a bosonic mode. Physical Review X. Jul. 14, 2016;6(3):031006.
Minev et al., Planar multilayer circuit quantum electrodynamics. Physical Review Applied. Apr. 29, 2016;5:044021.
Mirrahimi et al., Dynamically protected cat-qubits: a new paradigm for universal quantum computation. New Journal of Physics. Apr. 22, 2014;16(4):045014.
Mirrahimi et.al., Dynamics and Control of Open Quantum Systems. Mar. 19, 2015. https://who.rocq.inria.fr/Mazyar.Mirrahimi/QuantSys2015.pdf, 98 pages.
Moussa et al., Demonstration of Sufficient Control for Two Rounds of Quantum Error Correction in a Solid State Ensemble Quantum Information Processor. Phys. Rev. Lett. Oct. 10, 2011;107(16):160501.
Nigg et al., Black-box superconducting circuit quantization. Phys. Rev. Lett. Jun. 12, 2012;108(24):240502-1-5.

(56) References Cited

OTHER PUBLICATIONS

Nigg et al., Quantum computations on a topologically encoded qubit. Science. 2014;345(6194):302-5.
Nigg et al., Stabilizer quantum error correction toolbox for superconducting qubits. Physical review letters. Jun. 14, 2013;110(24):243604.
Ofek et al., Demonstrating quantum error correction that extends the lifetime of quantum information. arXiv:1602.04768. Feb. 15, 2016;44 pages.
Okef et al., Extending the lifetime of a quantum bit with error correction in superconducting circuits. Nature. Aug. 25, 2016;536(7617):441-5.
Paik et al., Observation of High Coherence in Josephson Junction Qubits Measured in a Three-Dimensional Circuit QED Architecture. Phys. Rev. Lett. Dec. 5, 2011;107(24):240501.
Pfaff et al., Schrodinger's catapult: Launching multiphoton quantum states from a microwave cavity memory. Nature Physics. Jun. 5, 2017;13:882-7.
Pittman et al., Demonstration of quantum error correction using linear optics. Phys. Rev. A. May 31, 2005;71(5):052332.
Preskill, Sufficient condition on noise correlations for scalable quantum computing. Quantum Information & Computation. Mar. 2013;13(3-4):181-94.
Puri et al., Engineering the quantum states of light in a kerr-nonlinear resonator by two-photon driving. NPJ Quantum Information. Apr. 19, 2017;3(1):18.
Puri et al., Stabilized Cat in Driven Nonlinear Cavity: A Fault-Tolerant Error Syndrome Detector. arXiv:1807.09334. Jul. 24, 2018. 22 pages.
Raimond et al., Phase space tweezers for tailoring cavity fields by quantum zeno dynamics. Physical Review Letters. Nov. 16, 2010;105(21):213601.
Ralph, Continuous variable quantum cryptography. Phys. Rev. A. Dec. 8, 1999;61(1):010303.
Ralph, Quantum error correction of continuous-variable states against Gaussian noise. Phys. Rev. A. Aug. 25, 2011;84(2):022339.
Raussendorf et al., Fault-tolerant quantum computation with high threshold in two dimensions. Physical Review Letters. May 11, 2007;98(19):190504.
Raussendorf et al., Topological fault-tolerance in cluster state quantum computation. New Journal of Physics. Jun. 29, 2007;9(6):199.
Reagor et al., A quantum memory with near-millisecond coherence in circuit QED. Physical Review B. Jul. 8, 2016;94(1):014506-1-8.
Reed et al., Realization of three-qubit quantum error correction with superconducting circuits. Nature. Feb. 2012;482(7385):382-5.
Reiserer et al., Nondestructive Detection of an Optical Photon. Science. Dec. 13, 2013;342(6164):1349-51.
Rigetti et al., Superconducting qubit in a waveguide cavity with a coherence time approaching 0.1 ms. Physical Review B. Sep. 24, 2012;86(10):100506(R).
Riste et al., Detecting bit-flip errors in a logical qubit using stabilizer measurements. Nat. Comm. Apr. 29, 2015;6:6983.
Riste et al., Deterministic entanglement of superconducting qubits by parity measurement and feedback. Nature. Oct. 2013;502(7471):350-4.
Riste et al., Feedback control of a solid-state qubit using high-fidelity projective measurement. Phys. Rev. Lett. Dec. 10, 2012;109(24):240502.
Rosenblum et al., A CNOT gate between multiphoton qubits encoded in two cavities. Nature communications. Feb. 13, 2018;9(1):652.
Rosenblum et al., Demonstration of a fault-tolerant error syndrome measurement: results. Presentation Abstract. http://adsabs.harvard.edu/abs/2018APS..MARX15013R. APS March Meeting 2018; abstract IDS X15.013, 2 pages.
Rosenblum et al., Fault-tolerant detection of a quantum error. Science. Jul. 20, 2018;361(6399):266-70.
Sayrin et al., Real-time quantum feedback prepares and stabilizes photon number states. Nature. Sep. 2011;477(7362):73-7.
Schindler et al., Experimental Repetitive Quantum Error Correction. Science. May 27, 2011;332(6033),1059-61.
Schuster et al., Resolving photon number states in a superconducting circuit. Nature. Feb. 2007;445(7127):515-8.
Sears et al., Photon shot noise dephasing in the strong-dispersive limit of circuit QED. Phys. Rev. B. Nov. 12, 2012;86(18):180504.
Shor, Fault-tolerant quantum computation. IEEE Proceedings of 37th Annual Symposium on Foundations of Computer Science. 1996:56-65.
Shor, Scheme for reducing decoherence in quantum computer memory. Phys. Rev. A. Oct. 1, 1995 52(4):R2493-6.
Shulman et al., Suppressing qubit dephasing using real-time Hamiltonian estimation. Nat. Comm. Oct. 8, 2014;5:5156.
Steane, Error correcting codes in quantum theory. Phys. Rev. Lett. Jul. 29, 1996;77(5):793-7.
Steane, Multiple-particle interference and quantum error correction. Proc. R. Soc. Lond. A. Nov. 8, 1996;452(1954):2551-77.
Sun et al., Tracking Photon Jumps with Repeated Quantum Non-Demolition Parity Measurements. Nature. Jul. 2014;511(7510):444-8.
Taminiau et al., Universal control and error correction in multi-qubit spin registers in diamond. Nat. Nano. Mar. 2014;9(3):171-6.
Terhal et al., Encoding a qubit into a cavity mode in circuit-QED using phase estimation. Physical Review A. Jan. 11, 2016;93(1):012315.
Touzard et al., Coherent oscillations inside a quantum manifold stabilized by dissipation. Physical Review X. Apr. 4, 2018;8(2):021005.
Tuckett et al., Ultrahigh error threshold for surface codes with biased noise. Physical Review Letters. Jan. 31, 2018;120(5):050505.
Vijay et al., Observation of quantum jumps in a superconducting artificial atom. Phys. Rev. Lett. Mar. 14, 2011;106(11):110502-1-4.
Vijay et al., Stabilizing Rabi oscillations in a superconducting qubit using quantum feedback. Nature. Oct. 2012;490(7418):77-80.
Vijay et al., The Josephson bifurcation amplifier. Rev. Sci. Inst. Nov. 17, 2009;80(11):111101.
Vlastakis et al., Characterizing entanglement of an artificial atom and a cavity cat state with Bell's inequality. Nat. Comm. Nov. 27, 2015;6:8970.
Vlastakis et al., Deterministically Encoding Quantum Information Using 100-Photon Schrodinger Cat States. Science. Nov. 1, 2013;342(6158):607-10.
Vlastakis et al., Violating Bell's inequality with an artificial atom and a cat state in a cavity. arXiv:1504.02512. Apr. 2015:1-20.
Waldherr et al., Quantum error correction in a solid-state hybrid spin register. Nature. Feb. 2014;506(7487):204-7.
Wallraff et al., Strong coupling of a single photon to a superconducting qubit using circuit quantum electrodynamics. Nature. Sep. 9, 2004;431(7005):162-7.
Wang et al., A Schrödinger cat living in two boxes. Science. May 27, 2016;352(6289):1087-91.
Webster et al., Reducing the overhead for quantum computation when noise is biased. Physical Review A. Dec. 3, 2015;92(6):062309.
Wolinsky et al., Quantum noise in the parametric oscillator: from squeezed states to coherent-state superpositions. Physical Review Letters. May 2, 1988;60(18):1836-9.
Wustmann et al., Parametric resonance in tunable superconducting cavities. Physical Review B. May 1, 2013;87(18):184501.
Xue et al., Quantum filter for a class of non-Markovian quantum systems. 2015 54th IEEE Conference on Decision and Control (CDC). 2015:7096-100.
Yurke et al., Generating quantum mechanical superpositions of macroscopically distinguishable states via amplitude dispersion. Physical review letters. Jul. 7, 1986;57(1):13-6.
Zeytinoglu et al., Microwave-induced amplitude- and phase-tunable qubit-resonator coupling in circuit quantum electrodynamics. Physical Review A. Apr. 30, 2015;91(4):043846.
International Preliminary Report on Patentability for International Application No. PCT/US2019/039945, mailed Jan. 7, 2021.
Hornibrook et al., Cryogenic control architecture for large-scale quantum computing. Physical Review Applied. Feb. 23, 2015;3(2):024010.

* cited by examiner

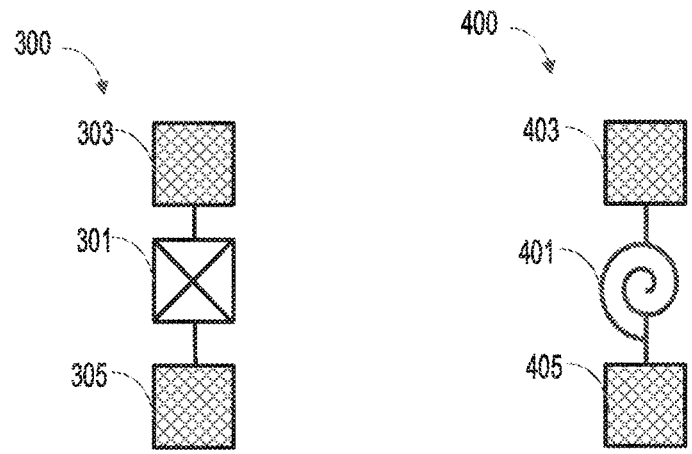
FIG. 3
FIG. 4
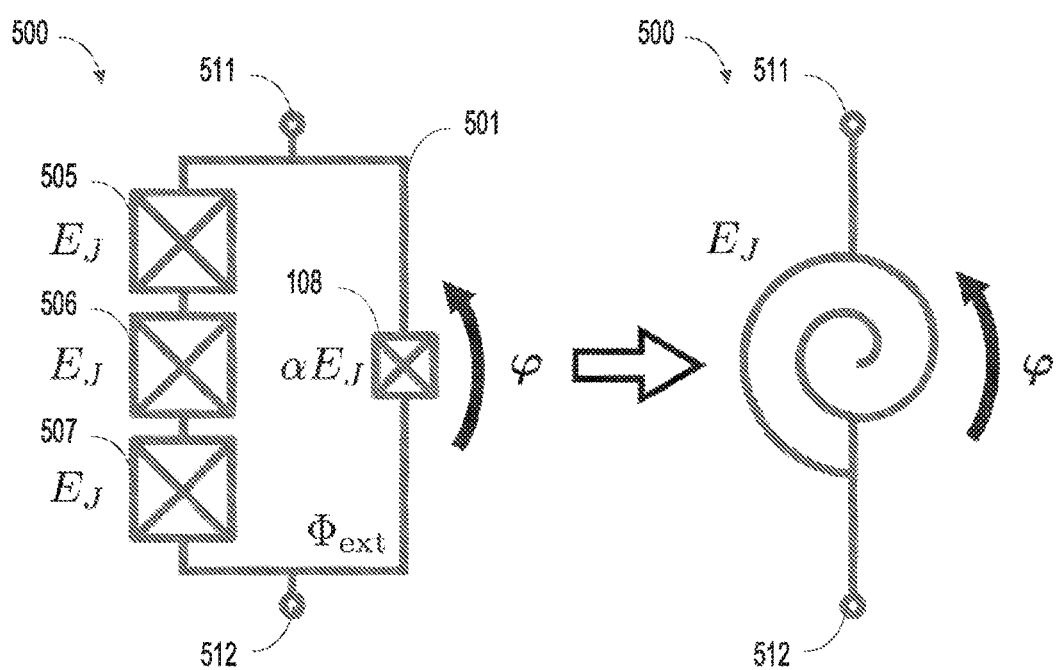
FIG. 5

QUANTUM INFORMATION PROCESSING WITH AN ASYMMETRIC ERROR CHANNEL

CROSS REFERENCE TO RELATED APPLICATIONS

This application is a national stage filing under 35 U.S.C. 371 of International Patent Application Serial No. PCT/US2019/039945, filed Jun. 28, 2019, entitled "QUANTUM INFORMATION PROCESSING WITH AN ASYMMETRIC ERROR CHANNEL", which claims the benefit under 35 U.S.C. § 119(e) of U.S. Provisional Patent Application No. 62/692,243, filed Jun. 29, 2018, titled "FAULT TOLERANT MEASUREMENTS AND GATES FOR QUANTUM INFORMATION PROCESSING." The contents of these applications are hereby incorporated by reference in their entirety.

STATEMENT REGARDING FEDERALLY-SPONSORED RESEARCH AND DEVELOPMENT

This invention was made with government support under 1609326 awarded by National Science Foundation, support under FA9550-15-0029 awarded by United States Air Force Office of Scientific Research, support under N00014-16-2270 awarded by United States Office of Naval Research and support under W911NF-14-1-0011 and W911NF-16-1-0349 awarded by United States Army Research Office. The government has certain rights in the invention.

FIELD

The technology described herein relates generally to quantum information systems. Specifically, the present application is directed to systems and methods for performing quantum information processing (QIP) using at least one qubit with an asymmetric error channel.

BACKGROUND

QIP uses quantum mechanical phenomena, such as energy quantization, superposition, and entanglement, to encode and process information in a way not utilized by conventional information processing. For example, it is known that certain computational problems may be solved more efficiently using quantum computation rather than conventional classical computation. However, to become a viable computational option, quantum computation requires the ability to precisely control a large number of quantum bits, known as "qubits," and the interactions between these qubits. In particular, qubits should have long coherence times, be able to be individually manipulated, be able to interact with one or more other qubits to implement multi-qubit gates, be able to be initialized and measured efficiently, and be scalable to large numbers of qubits.

A qubit may be formed from any physical quantum mechanical system with at least two orthogonal states. The two states of the system used to encode information are referred to as the "computational basis." For example, photon polarization, electron spin, and nuclear spin are two-level systems that may encode information and may therefore be used as a qubit for QIP. Different physical implementations of qubits have different advantages and disadvantages. For example, photon polarization benefits from long coherence times and simple single qubit manipulation, but suffers from the inability to create simple multi-qubit gates.

The above examples of qubits are physical two-level systems. However, quantum information may also be stored in logical qubits, which are formed from multiple physical two-level systems or quantum systems with more than two states. For example, states of a quantum mechanical oscillator, of which there are an infinite number of energy eigenstates, may also be used to form the computational basis for QIP. For example, coherent states of a quantum mechanical oscillator that are sufficiently displaced from one another in phase space are quasi-orthogonal states and may be used as a computational basis. Additionally, states that are superpositions of coherent states, known as "cat states" may be exactly orthogonal to one another and used to form a computational basis.

Different types of superconducting qubits using Josephson junctions have been proposed, including "phase qubits," where the computational basis is the quantized energy states of Cooper pairs in a Josephson Junction; "flux qubits," where the computational basis is the direction of circulating current flow in a superconducting loop; and "charge qubits," where the computational basis is the presence or absence of a Cooper pair on a superconducting island. Superconducting qubits are an advantageous choice of qubit because the coupling between two qubits is strong making two-qubit gates relatively simple to implement, and superconducting qubits are scalable because they are mesoscopic components that may be formed using conventional electronic circuitry techniques. Additionally, superconducting qubits exhibit excellent quantum coherence and a strong non-linearity associated with the Josephson effect. All superconducting qubit designs use at least one Josephson junction as a non-linear non-dissipative element.

BRIEF SUMMARY

According to some aspects, a quantum information processing (QIP) system is provided. The QIP system includes a data qubit and an ancilla qubit, the ancilla qubit having an asymmetric error channel. The data qubit is coupled to the ancilla qubit.

According to some aspects, a method of performing QIP in a system comprising a data qubit coupled to an ancilla qubit is provided. The method includes driving the ancilla qubit with a stabilizing microwave field to create an asymmetric error channel.

The foregoing is a non-limiting summary of the invention, which is defined by the appended claims.

BRIEF DESCRIPTION OF DRAWINGS

Various aspects and embodiments are described with reference to the following drawings. The drawings are not necessarily drawn to scale. For the purposes of clarity, not every component may be labeled in every drawing. In the drawings:

FIG. 3 is a diagram of a superconducting circuit element of FIG. 2 that includes a transmon, according to some embodiments.

FIG. 4 is a diagram of a superconducting circuit element of FIG. 2 that includes a superconducting nonlinear asymmetric inductor element (SNAIL), according to some embodiments.

FIG. 5 is a block diagram of a quantum information system based on cavity quantum electrodynamics, according to some embodiments.

DETAILED DESCRIPTION

Figure 1:
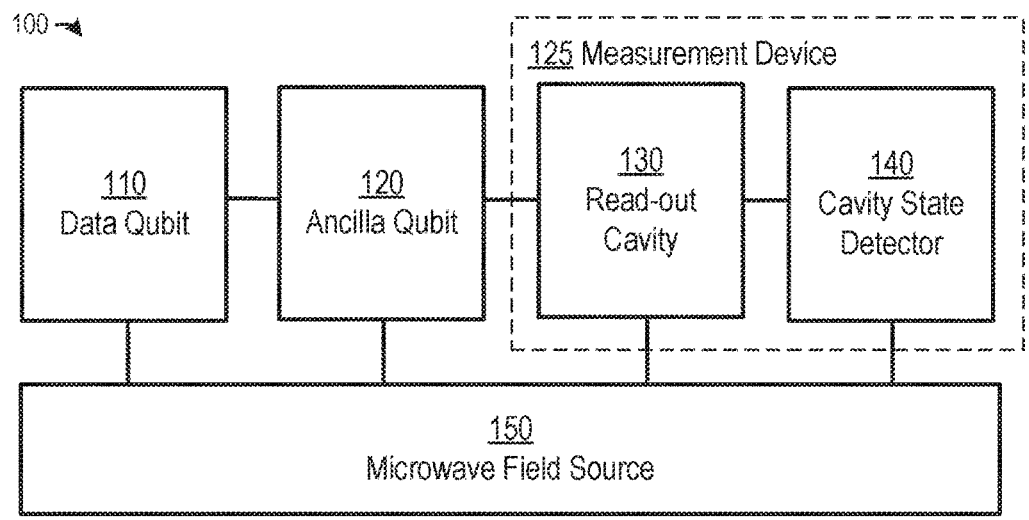
FIG. 1 is block diagram of a quantum information processing system, according to some embodiments.

Conventional QIP schemes encode information in one or more two-level quantum systems (i.e., "qubits"). The state of a single qubit may be represented by the quantum state $|\psi\rangle$, which may be in any arbitrary superposition of the two quantum states, $|0\rangle$ and $|1\rangle$, e.g., $|\psi\rangle = a|0\rangle + b|1\rangle$, where a and b are complex numbers representing the probability amplitude of the logical qubit being in state $|0\rangle$ and $|1\rangle$, respectively. Here $|0\rangle$ and $|1\rangle$ is the computational basis, which may be implemented physically using any physical system with two orthogonal states.

To perform a useful quantum information process, conventional quantum information systems initialize a set of qubits, referred to as "data qubits" because they are used to encode the information being processed, to a particular quantum state, implement a set of quantum gates on the qubits, and measure the final quantum state of the qubits after performing the quantum gates. A first type of conventional quantum gate is a single-qubit gate, which transforms the quantum state of a single qubit from a first quantum state to a second quantum state. Examples of single-qubit quantum gates include the set of rotations of the qubit on a Bloch sphere. A second type of conventional quantum gate is a two-qubit gate, which transforms the quantum state of a first qubit based on the quantum state of a second qubit. Examples of two-qubit gates include the controlled NOT (CNOT) gate and the controlled phase gate. Conventional single-qubit gates and two-qubit gates unitarily evolve the quantum state of the qubits from a first quantum state to a second quantum state.

For large-scale quantum computation to be viable, the quantum states used in the QIP must be protected from errors, which result from inevitable and uncontrolled interactions with the environment. Techniques for mitigating such errors include quantum error correction (QEC) schemes. In some conventional QEC schemes, quantum information is protected by linking errors and undesirable interactions with low-weight quantum operators. For example, quantum information may be encoded in a logical qubit using the non-local degrees of freedom of a high-dimensional system rather than simply encoding the information in the two quantum states of a physical qubit. In such encodings, high-weight operators imply many-body operators arising, for example, in a system of several qubits or operators involving many quantum states of a single high-dimensional physical system (e.g., a quantum mechanical oscillator). The high-weight operators characterizing a codespace of quantum information are referred to as "stabilizers" and are designed to commute with the logical qubit operators but anti-commute with the errors in the system. In the absence of errors, the system lies in the +1 eigenspace of the stabilizer and after an error occurs the system moves to the −1 eigenspace. Consequently, the location and type of errors can be determined from the result of measuring the stabilizers, which are also known as an "error syndrome." Measurement of these high-weight stabilizers uses highly engineered, highly unnatural many-body interactions between components of the quantum system.

The inventors have recognized and appreciated that the above types of QEC techniques are undesirable for practical implementations of QIP. Instead, the inventors have recognized and appreciated that it is desirable to synthesize stabilizer measurements via naturally available couplings between the data qubits of the system and an ancillary system. Coupling the data qubits of the QIP system exposes the data qubits to a different set of errors that may be just as challenging to mitigate. For example, if the measurement of the ancillary system is not designed intelligently, errors from the ancillary system may propagate to the data qubits, damaging the encoded quantum information beyond repair. Recognizing this, the inventors have developed techniques for reducing and/or, in some instances, eliminating such catastrophic backaction from the ancillary system.

To assist in explaining some aspects of the present application, a stabilizer measurement technique is described here. To synthesize the stabilizer measurements, a system M, representing the logical data qubit, encodes the quantum information in N subsystems implemented using physical qubits. A code is defined by multiple stabilizers but, for simplicity, a single stabilizer, $\hat{S}$, is considered here. A set of low-weight operators, $\hat{M}_i$, where i=1, 2, . . . N, commute with the stabilizer S and can be used to synthesize $\hat{S}$ through coupling with an ancilla. As an example, the four-qubit operator $\hat{\sigma}_{z,1} \hat{\sigma}_{z,2} \hat{\sigma}_{z,3} \hat{\sigma}_{z,4}$, where $\hat{\sigma}_{z,i}$ is the z-Pauli operator acting on the i-th qubit, is a stabilizer for surface codes, in which $\hat{M}_i = \hat{\sigma}_{z,i}$. As a second example, the parity operator $\hat{P} = \exp(i\pi \hat{a}^\dagger \hat{a})$ is a stabilizer for single-mode bosonic cat codes, where $\hat{a}^\dagger$ and $\hat{a}$ are the photon creation and annihilation operators, respectively. The ancillary system may be, for example, an ancilla qubit which is coupled to the data qubit via an interaction Hamiltonian $$\hat{V} = \hat{\sigma}_z \sum_{i=1}^{N} g_i(t) \hat{M}_i$$

where $\sigma_z$ is the z-Pauli operator of the ancilla qubit and $g_i$ are controllable interaction strengths between the ancilla and each of the physical qubits used to form the logical data qubit. The evolution of the joint system of the data qubit and the ancilla qubit is described by the unitary operator:

$$\hat{U}(t) = \mathcal{T} \exp\left(-i \int_0^t \hat{V}(\tau) d\tau\right)$$
$$= \cos\left(\sum_{i=1}^{N} \int_0^t g_i(\tau) \hat{M}_i d\tau\right) + i \sin\left(\sum_{i=1}^{N} \int_0^t g_i(\tau) \hat{M}_i d\tau\right) \hat{\sigma}_z.$$

The coupling strength and duration of the interaction, T, between the data qubit and the ancilla qubit may be chosen such that the unitary operator acting on the joint system (up to local rotations) becomes:

$$\hat{U}(T) = \frac{1+\hat{S}}{2} + \frac{1-\hat{S}}{2} \hat{\sigma}_z.$$

The result of the interaction with an interaction time T, is therefore a phase-flip of the ancilla qubit conditioned on whether the stabilizer is +1 or −1. This phase-flip in the ancilla qubit is the error syndrome.

The inventors have recognized and appreciated that, during the interaction time, the data qubit and the ancilla qubit are entangled and, to be a successful QEC scheme, it is desirable to engineer the joint system such that errors in the ancilla qubit do not propagate as uncorrectable errors to the data qubit, which is known as "fault-tolerance." To prevent the propagation of uncorrectable errors to the data qubit and achieve fault-tolerance, all possible errors in the ancilla qubit should commute with the unitary operator $\hat{U}(t)$ at all times. In the above example, the phase flip error $\hat{\sigma}_z$ satisfies this condition. Therefore, if a phase-flip error occurs at any time $\tau$ during the interaction time duration, then at time T, the state of the system is described by the unitary operator:

$$\hat{U}(T-\tau) \hat{\sigma}_z \hat{U}(\tau) = \hat{\sigma}_z U(T) = \frac{\hat{\sigma}_z(1+\hat{S})}{2} + \frac{1-\hat{S}}{2}.$$

Based on this unitary operation, it is clear that the phase flip in the ancilla qubit only introduces an error in the measurement of the syndrome, but does not cause any backaction on the data qubit. Importantly, however, bit flip errors (represented by the Pauli matrix $\hat{\sigma}_x$ and amplitude damping errors (represented by the Pauli matrix $\hat{\sigma}_-$) in the ancilla qubit do not commute with the unitary operator $\hat{U}(t)$.

In fact, a bit flip error, $\hat{\sigma}_x$ on the ancilla qubit propagates as a high-weight error to the data qubit.

Conventional approaches to fault-tolerant extraction of error syndromes are based on using multiple ancillas prepared in complex quantum states, performing multiple bit-wise entangling gates between the data qubits and the ancilla qubits, and then measuring the ancilla qubits. The inventors have recognized and appreciated that these conventional approaches lead to rapidly growing overhead of computationally expensive entangling gates and ancilla hardware, forcing more stringent requirements on error rates and making fault-tolerant quantum computation impractical, if not impossible, at a large scale. Moreover, the inventors have recognized and appreciated that an efficient fault-tolerant syndrome extraction scheme would enable large-scale quantum information processing. Accordingly, some aspects of the present application are directed to efficient fault-tolerant syndrome extraction.

The inventors have recognized and appreciated that, in the stabilizer measurement scheme described above, the unitary operator $\hat{U}(t)$ would result in no backaction on the data qubit if the ancilla qubit did not have bit flip $\hat{\sigma}_x$ errors. Thus, some aspects of the present application are directed to using an ancilla qubit with an asymmetric error channel where bit flip errors are suppressed relative to phase flip errors. By suppressing the bit-flip errors, which do not commute with the unitary operator $\hat{U}(t)$, it is possible to engineer a physical unitary operation that nearly commutes with the ancilla's error channel and will therefore be effectively transparent to ancilla errors.

Aspects of the present disclosure include a method for making fault-tolerant measurements in quantum systems. The techniques described herein may be used in at least three possible applications. First, the techniques may be used in quantum error correction schemes by allowing fault-tolerant extraction of error syndromes. Second, the techniques may be used for new, more efficient error correcting codes and procedures. Third, the techniques may be used to create bias-preserving gates, such as a controlled-NOT (CNOT) gate.

The inventors have recognized and appreciated that it is possible to perform a fault-tolerant extraction of an error syndrome using only local operations with an ancilla whose error channel is strongly biased (i.e., asymmetric). Some embodiments improve upon the overhead requirements of relative to conventional schemes fault-tolerant syndrome measurements. Some embodiments include a hardware efficient realization of such a syndrome extraction scheme using a two-component cat state in a parametrically driven non-linear oscillator that exhibits a highly-biased noise channel.

The inventors have further recognized and appreciated the flexibility of the above approach. In some embodiments, different codes may be used. In some embodiments, the syndrome extraction process is used for a variety of codes such as qubit-based toric codes, bosonic cat-codes (and in extension, binomial and pair-cat code) and Gottesman-Kitaev-Preskill (GKP) codes. However, other codes may also be used.

A challenge for error correction with biased noise is to be able to maintain the bias while performing elementary gate operations such as a CNOT gate, which is an important ingredient for many error correction codes and for universal computation. In conventional systems that use physical qubits as data and/or ancilla qubits, a native bias-preserving CNOT is not possible even if the underlying noise is biased. The inventors have recognized and appreciated that the aforementioned techniques developed for fault-tolerant syndrome extraction can be utilized and extended to realize a bias-preserving CNOT gate between two stabilized cat states. In some embodiments, a CNOT gate is based on the structure of cat states in phase space. In this case, a stabilized cat state can be realized in a parametrically driven nonlinear cavity or via dissipation engineering. Some embodiments that include a bias preserving CNOT gate may achieve gains in the threshold for topological error correcting codes (e.g. toric and surface codes).

In some embodiments, when combined with an ZZ(θ) gate, it may be possible to reduce the thresholds for what is known as "magic state preparation" (which is an important but expensive ingredient, in terms of overhead costs, to achieve universality). In some embodiments, the ZZ(θ) gate inherently preserves bias and may be implemented with stabilized cats. The inventors have recognized and appreciated that combining bias preserving CNOT gates, ZZ(θ) gates and syndrome measurements provides the basis for a fault-tolerant architecture for large-scale quantum computation with ultrahigh thresholds and drastically reduced overhead requirements. Such an architecture, which exploits the bias in the noise channel of stabilized cat qubits, does not have any equivalent in conventional systems based on physical qubits.

FIG. 1 illustrates a QIP system according to some embodiments. The QIP system 100 includes at least a data qubit 110 and an ancilla qubit 120. Some embodiments further include a microwave field source 150 and/or a measurement device 125. The measurement device 125 may include a read-out cavity 130 and a cavity state detector 140. Though not illustrated as such, the microwave field source 150 may be considered to be part of the measurement device 125 as microwave fields emitted by the microwave field source 150 play a role in the measurement.

The data qubit 110 may be any physical or logical qubit capable of being coupled to the ancilla qubit 120. In some embodiments, the data qubit 110 may include a superconducting circuit component. For example, the data qubit 110 may include at least one Josephson junction. In some embodiments, the data qubit 110 may include a transmon. In some embodiments, the data qubit 110 may include a superconducting nonlinear asymmetric inductor element (SNAIL), which is an example of a superconducting circuit component that includes multiple Josephson Junctions. In other embodiments, the data qubit 110 may include an oscillator. An example of a linear oscillator that may be used includes the electromagnetic field, e.g., microwave radiation, supported by a cavity. A cavity may include a three-dimensional (3D) cavity or a planar transmission line cavity. In some embodiments, the cavity may be driven to include a specific type of quantum state. For example, as described in more detail below, the cavity may be driven to include a cat state or a GKP state. In some embodiments, a superconducting circuit component may be coupled to a cavity to form a Kerr-nonlinear cavity.

The ancilla qubit 120 may be any physical or logical qubit capable of being coupled to the data qubit 110. In some embodiments, the ancilla qubit 120 may include a superconducting circuit component. For example, the ancilla qubit 120 may include at least one Josephson junction. In some embodiments, the ancilla qubit 120 may include a transmon. In some embodiments, the ancilla qubit 120 may include a SNAIL. In other embodiments, the ancilla qubit 120 may include an oscillator. An example of a linear oscillator that may be used includes the electromagnetic field, e.g., microwave radiation, supported by a cavity. A cavity may include a three-dimensional cavity or a planar transmission line cavity. In some embodiments, the cavity may be driven to include a specific type of quantum state. For example, as described in more detail below, the cavity may be driven to include a cat state or a GKP state. In some embodiments, a superconducting circuit component may be coupled to a cavity to form a Kerr-nonlinear cavity.

The ancilla qubit 120 may be used by the measurement device 125 to measure one or more properties of the data qubit 110. For example, an interaction between the data qubit 110 and the ancilla qubit 120 may be engineered such that the state of the ancilla qubit 120 is based on a particular property of the data qubit 110. In some embodiments, the measurement of the data qubit 110 is a quantum nondemolition measurement, meaning the state of the data qubit 110 is left unaffected by the measurement process. In some embodiments, the quantum nondemolition measurement may be performed by using the measurement device 125 to measure the state of the ancilla qubit 120, after the data qubit 110 and the ancilla qubit 120 interact, to determine a property of the ancilla qubit 120. In some embodiments, the interaction between the data qubit 110 and the ancilla qubit 120 may be turned on by driving the data qubit 110 and/or the ancilla qubit 120 with one or more microwave fields using the microwave field source 150.

The read-out cavity 130 is a cavity coupled to the ancilla qubit 120 and configured to support multiple electromagnetic radiation, e.g., microwave radiation, states based on a property of the ancilla qubit 120. In some embodiments, an interaction between the read-out cavity 130 and the ancilla qubit 120 is engineered such that the state of the read-out cavity 130 is dependent on a particular property of the ancilla qubit 120, which itself may be based on a property of the data qubit 110. For example, if a property of the ancilla qubit 120 is a first value, then the interaction results in the read-out cavity 130 being in a first state; and if the property of the ancilla qubit 120 is a second value, then the interaction results in the read-out cavity being in a second state. In some embodiments, the two states of the read-out cavity 130 may be two different quasi-orthogonal coherent states. In other words, the read-out cavity 130 may be displaced in different ways depending on the value of the property of the ancilla qubit 120. In some embodiments, this process may be performed using what is referred to herein as a "Q-switch," which uses a frequency conversion technique to conditionally displace the read-out cavity 130 based on the property of the ancilla qubit 130. In some embodiments, the interaction between the read-out cavity 130 and the ancilla qubit 120 may be turned on by driving the read-out cavity 130 and/or the ancilla qubit 120 with one or more microwave fields using the microwave field source 150.

The cavity state detector 140 may be, for example a microwave radiation detector capable of distinguishing between the possible states of the read-out cavity 130 that result from the interaction between the read-out cavity 130 and the ancilla qubit 120. In some embodiments, the cavity state detector may be a phase-sensitive detector that is capable of measuring not only amplitude, but phase of the electromagnetic field of the read-out cavity 130. For example, the cavity state detector 140 may be a homodyne detector or a heterodyne detector. The result of the detection, in some embodiments, is directly related to the error syndrome.

In some embodiments, the ancilla qubit 130 includes a cavity, the state of which may be measured directly using a homodyne detector. However, if the cavity of the ancilla qubit 130 is a high-Q cavity, the homodyne detection would be slow. Accordingly, the read-out cavity may be a low-Q cavity that may be read out quickly.

Figure 2:
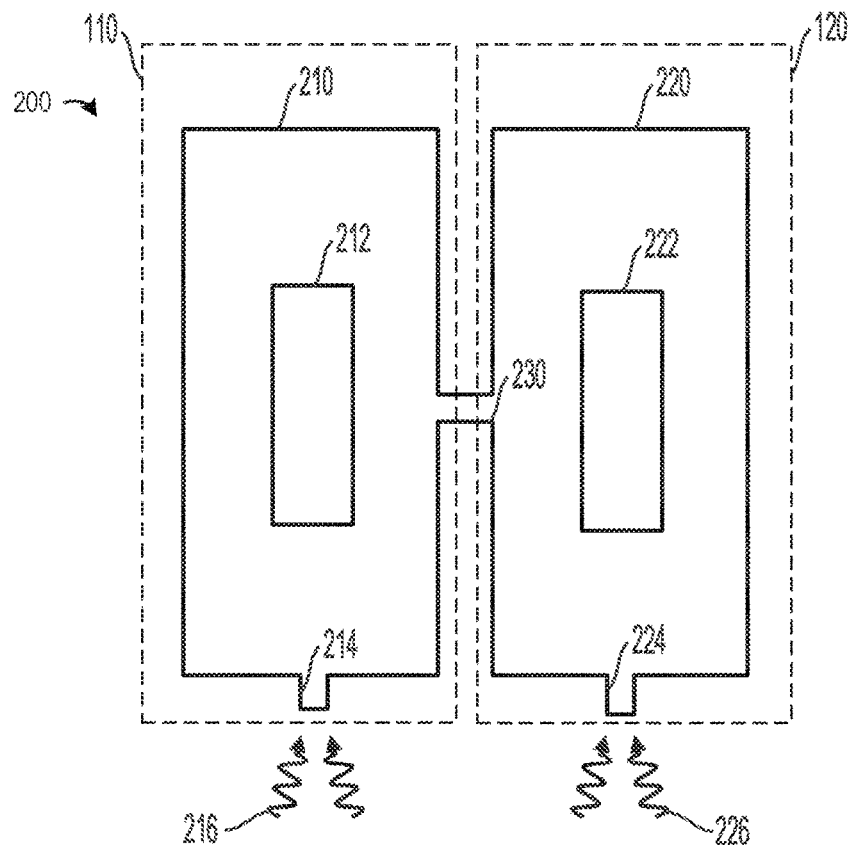
FIG. 2 is a diagram of the joint system of the data qubit and the ancilla qubit of FIG. 1, according to some embodiments.

FIG. 2 is a diagram of a particular embodiment of a joint system 200 that includes an example of the data qubit 110 and an example of the ancilla qubit 120, according to some embodiments. The data qubit 110 includes a data cavity 210 and a data superconducting circuit 212. The ancilla qubit 120 includes an ancilla cavity 220 and an ancilla superconducting circuit 222. The two cavities are coupled together with via an interface 230, which may include, for example, a microwave waveguide and/or a pin connector.

The data cavity 210 may be a three-dimensional cavity and includes at least one microwave port 214 for receiving microwave fields 216 from the microwave field source 150. The ancilla cavity 220 may be a three-dimensional cavity that includes at least one microwave port 224 for receiving microwave fields 226 from the microwave field source 150. In some embodiments, the microwave ports may include pin connectors and/or microwave waveguides. While FIG. 2 illustrates only a single port for each cavity, each cavity may include more than one port for receiving and/or transmitting microwave fields. For example, not shown in FIG. 2 is a port for coupling the ancilla cavity 220 to the read-out cavity 130.

In some embodiments, the data superconducting circuit element 212 and the ancilla superconducting circuit element 222 may include a nonlinear circuit element. For example, the superconducting circuit elements may be a transmon or a SNAIL. FIG. 3 illustrates an example of a superconducting circuit element 300 that may be used as the data superconducting circuit element 212 and/or the ancilla superconducting circuit element 222. The superconducting circuit element 300 includes a transmon 301 that consists of a single Josephson junction and an antenna that includes a first antenna portion 303 and a second antenna portion 305. The two antenna portions together form a dipole antenna through which the transmon 301 is coupled to the three-dimensional cavity in which the superconducting circuit element 300 is located.

FIG. 4 illustrates an example of a superconducting circuit element 400 that may be used as the data superconducting circuit element 212 and/or the ancilla superconducting circuit element 222. The superconducting circuit element 400 includes a SNAIL 401 that consists of a single Josephson junction and an antenna that includes a first antenna portion 403 and a second antenna portion 405. The two antenna portions together form a dipole antenna through which the SNAIL 401 is coupled to the three-dimensional cavity in which the superconducting circuit element 400 is located.

The SNAIL 401 is a nonlinear superconducting circuit element that has additional tenability relative to a transmon. FIG. 5 is a schematic diagram of a SNAIL 500, according to some embodiments. The SNAIL 500 includes a superconducting ring 501 with two nodes 511 and 512. There are two paths along two different portions of the superconducting ring 501 that connect the first node 511 and the second node 512.

The first ring portion includes multiple Josephson junctions 505-507 connected in series. In some embodiments, there are no other circuit elements between one Josephson junction and the next Josephson junction. For example, a Josephson junction is a dipole circuit element (i.e., it has two nodes). A first node of a first Josephson junction 505 is directly connected to the first node 511 of the SNAIL, which may lead to some other external circuit element (not shown). A second node of the first Josephson junction 505 is directly connected to a first node of a second Josephson junction 506.

A second node of the second Josephson junction 506 is directly connected to a first node of a third Josephson junction 507. A second node of the third Josephson junction 507 is directly connected to a second node 512 of the SNAIL, which may lead to some other external circuit element (not shown), such as a portion of an antenna.

While FIG. 5 illustrates the first ring portion including three Josephson junctions, any suitable number of Josephson junctions greater than one may be used. For example, three, four, five, six, or seven Josephson junctions may be used. Three Josephson junctions are selected for the example shown because three Josephson junctions is the lowest number of Josephson junctions (other than zero or one) that can be formed using a Dolan bridge process of manufacturing, which may be used in some embodiments.

In some embodiments, Josephson junctions 505-507 are formed to be identical. For example, the tunneling energies, the critical current, and the size of the Josephson junctions 505-507 are all the same.

The second ring portion of the SNAIL 500 includes a single Josephson junction 508. In some embodiments, there are no other circuit elements in the second ring portion. A first node of a single Josephson junction 508 is directly connected to the first node 511 of the SNAIL, which may lead to some other external circuit element (not shown), such as a portion of an antenna. A second node of the single Josephson junction 508 is directly connected to the second node 512 of the SNAIL, which may lead to some other external circuit element (not shown), such as a portion of an antenna.

The single Josephson junction 508 has a smaller tunneling energy than each of Josephson junctions 505-507. For this reason, the single Josephson junction 508 may be referred to as a "small" Josephson junction and Josephson junctions 505-507 may be referred to as "large" Josephson junctions. The terms "large" and "small" are relative terms that are merely used to label the relative size of Josephson junction 508 as compared to Josephson junctions 505-507. The Josephson energy and the Josephson junction size are larger in the large Josephson junction than in the small Josephson junction. The parameter $\alpha$ is introduced to represent the ratio of the small Josephson energy to the large Josephson energy. Thus, the Josephson energy of the large Josephson junctions 505-507 is $E_J$ and the Josephson energy of the small Josephson junction 508 is $\alpha E_J$, where $0 > \alpha < 1$.

The right side of FIG. 5 illustrates the circuit element symbol for the SNAIL 500, which is used in the superconducting circuit element 400 of FIG. 4. The parameters that characterize the SNAIL 500 are the Josephson energy $E_J$ and the superconducting phase difference, $\varphi$, of the small Josephson junction 508. Of note is the fact that the SNAIL 500 has only two nodes 511 and 512, which may be connected to respective portions of an antenna.

While two separate 3D cavities, one for the data qubit 110 and one for the ancilla qubit 120, is illustrated in FIG. 2, other cavity arrangements may be used. In some embodiments, a the data superconducting circuit element 212 and the ancilla superconducting circuit element 222 may be located within a single, shared 3D cavity. In other embodiments, the data superconducting circuit element 212 and the ancilla superconducting circuit element 222 may be coupled to a respective two-dimensional (2D) transmission line cavity.

Figure 6:
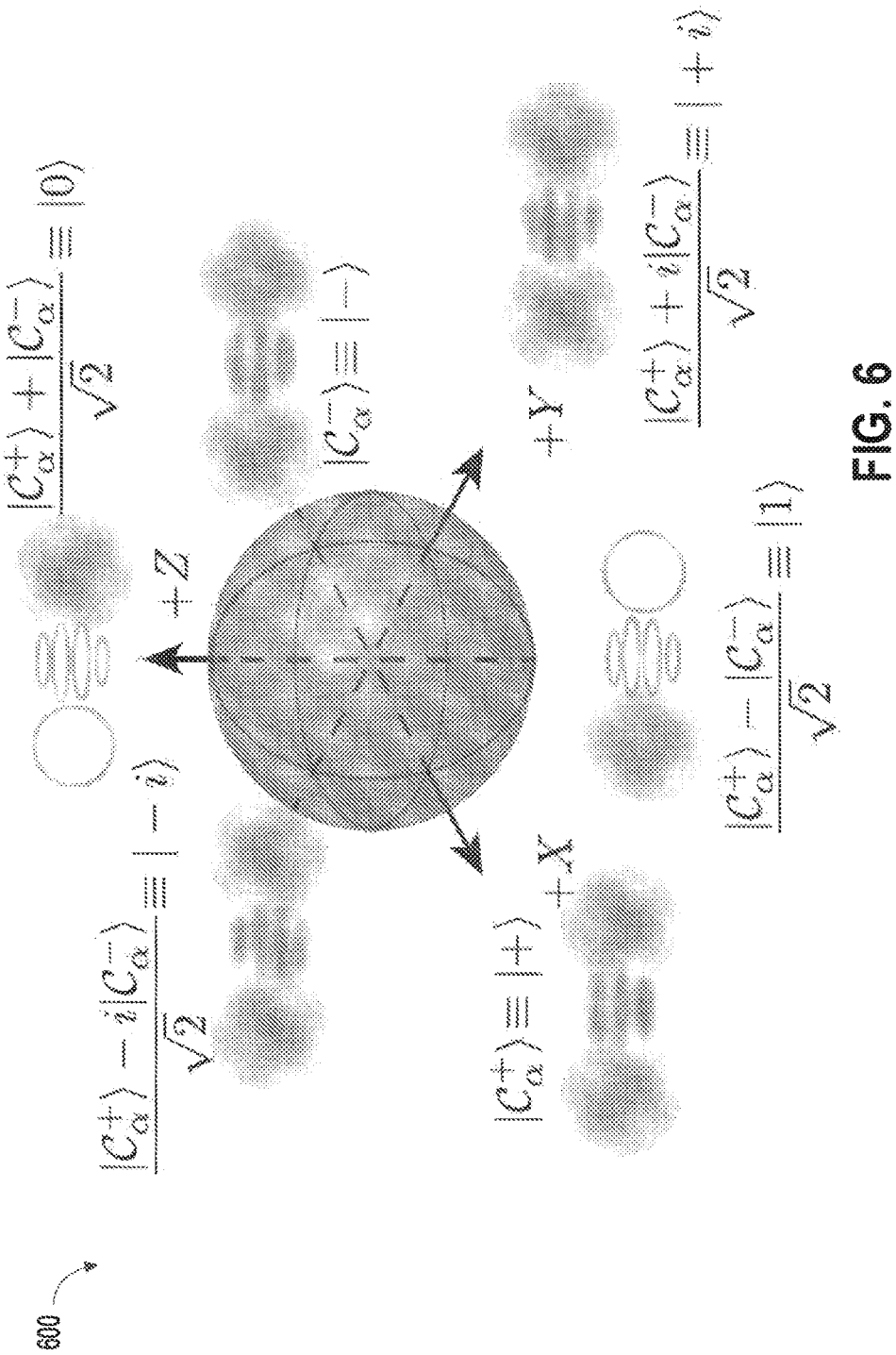
FIG. 6 depicts a Bloch sphere based on cat states, according to some embodiments.

In either the embodiments using a transmon, as illustrated in FIG. 3, or a SNAIL, as illustrated in FIG. 4, the superconducting circuit element coupled to a cavity forms a Kerr-nonlinear oscillator, which may be used as the data qubit and/or the ancilla qubit. In some embodiments, a two-photon pump, received from the microwave field generator 150, may be used to create a two-component cat state:

$$|\mathcal{C}_\beta^\pm\rangle = \mathcal{N}_\beta^\pm(|\beta\rangle \pm |-\beta\rangle),$$

where $\mathcal{N}_\beta^\pm = 1/\sqrt{2(1\pm e^{-2|\beta|^2})}$, and $\beta$ is the complex amplitude associated with the coherent state $|\beta\rangle$ associated with the cat state. The cat state $|\mathcal{C}_\beta^+\rangle$ and the cat state $|\mathcal{C}_\beta^-\rangle$ are degenerate and orthogonal eigenstates of the Kerr-nonlinear oscillator being pumped by the two-photon driving field. A Bloch sphere may be formed using these cat states, the orientation of the Bloch sphere being arbitrary with respect to the cat state basis states. FIG. 6 illustrates the Bloch sphere 600 used in this application. The basis of the logical qubit formed using these cat states is such that the +Z and −Z axis of the Bloch sphere 600 corresponds to the superposition states $|\mathcal{C}_\beta^+\rangle \pm |\mathcal{C}_\beta^-\rangle \sqrt{2}$, respectively, which closely approximate the coherent states $|\pm\beta\rangle$ for large values of $\beta$; the +X and −X axis of the Bloch sphere 600 corresponds to the cat state $|\mathcal{C}_\beta^+\rangle$ and the cat state $|\mathcal{C}_\beta^-\rangle$, respectively; and the +Y and −Y axis of the Bloch sphere 600 corresponds to the superposition states $|\mathcal{C}_\beta^+\rangle \pm i|\mathcal{C}_\beta^-\rangle \sqrt{2}$, respectively. FIG. 6 also illustrates a simplified phase space diagram of each of the states associated with the axes of the Bloch sphere 600.

Cat states of the type described above have the property that natural couplings cause only rotations around the Z axis of the Bloch sphere 600 because the pump used to create the cat states creates a large energy barrier that prevents phase rotations (i.e., rotations from the coherent state $|+\beta\rangle$ to $|-\beta\rangle$ and vice versa). Thus, using the Bloch sphere 600, a noise channel associated with photon loss corresponds to phase flip errors, which dominate the error channel for logical qubits in some embodiments, whereas bit flip errors are suppressed to create the asymmetric error channel, according to some embodiments. The phase-flip errors increase, e.g., linearly, with the size of the cat states, as determined by $|\beta|^2$, or equivalently the strength of the microwave field used to pump the cat states. On the other hand, the bit-flip errors and the amplitude damping errors are exponentially suppressed based on the size of the cat state $|\beta|^2$, or equivalently the strength of the microwave field used to pump the cat states. Thus, in some embodiments, when the pumped cat state of the Kerr-nonlinear cavity is used as the physical implementation of the ancilla qubit, fault-tolerant syndrome measurements may be performed.

Some embodiments extract an error syndrome based on conditional rotation of a cat state around the Z axis. This may be accomplished, in some examples, using only low-weight local interactions. In some embodiments, this fault-tolerant technique may be used with a variety of error correcting codes, such as stabilizer codes. Examples of stabilizer codes include, but are not limited to toric codes, bosonic cat codes, and GKP codes. Some embodiments may use non-stabilizer based error correcting codes, such as non-additive quantum codes. Additionally, some embodiments may use the asymmetric error channel of the ancilla qubit to perform fault-tolerant quantum gates.

In some embodiments, the interactions between a data qubit and an ancilla qubit are realized using the inherent nonlinearity of the ancilla qubit implemented using a cat state in a Kerr-nonlinear cavity. As such, some embodiments require no additional coupling elements. Thus, by exploiting the techniques described herein, hardware-efficient quantum information processing schemes can be realized.

Error Syndrome Detection

In some embodiments, a Kerr-nonlinear oscillator implemented, for example, using the hardware described above, may be driven by a two-photon drive with a frequency equal to twice a resonance frequency of the oscillator. When driven by such a microwave field, the oscillator is referred to as a pumped-cat oscillator (PCO) and the Hamiltonian in the rotating wave approximation is:

$$\hat{H}_{PCO} = -K\hat{a}^{\dagger 2}\hat{a}^2 + P(\hat{a}^{\dagger 2}+\hat{a}^2),$$

where $\hat{a}^\dagger$ and $\hat{a}$ are the photon creation and annihilation operators of the PCO, K is the strength of the Kerr nonlinearity, and P is the strength of the two-photon drive field. Rewriting the PCO Hamiltonian in terms of the coherent state amplitude, $$\beta = \sqrt{\frac{P}{K}},$$

results in:

$$\hat{H}_{PCO} = -K(\hat{a}^{\dagger 2}-\beta^2)(\hat{a}^2-\beta^2)+K\beta^4.$$

Figure 7A:
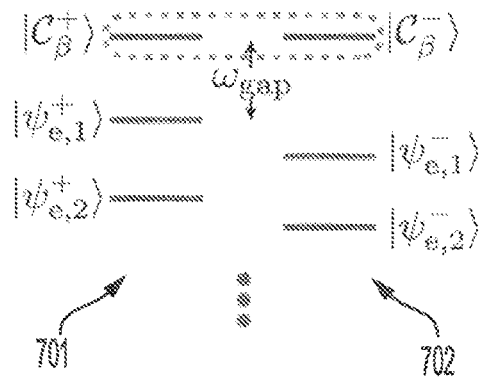
FIG. 7A depicts an eigenspectrum of a pumped cat oscillator, according to some embodiments.

The coherent states $|\pm\beta\rangle$ and, equivalently, the cat states $|\mathcal{C}_\beta^\pm\rangle$ are each degenerate eigenstates of this Hamiltonian with an eigenenergy $K\beta^4 = P^2/K$. For simplicity, it will be assumed that the drive field strength (P) will be real and positive, resulting in $\beta$ also being real. The coherent states $|\pm\beta\rangle$ are quasi-orthogonal ($\langle\beta|-\beta\rangle = \exp(-2\beta^2)$) and the cat states $|\mathcal{C}_\beta^\pm\rangle$ are exactly orthogonal. The cat states $|\mathcal{C}_\beta^\pm\rangle$ are also the $\pm 1$ eigenstates of the photon number parity operator, $\hat{P} = \exp(i\pi\hat{a}^\dagger\hat{a})$. Since the PCO Hamiltonian commutes the with photon number parity operator, the eigenstates of the Hamiltonian are also eigenstates of the parity operator. As a result, the eigenspace 700 of the PCO Hamiltonian, shown in FIG. 7A, can be divided into the even parity subspace 701 and odd parity subspace 702 denoted by the superscripts $\pm$, respectively. The cat subspace of the eigenspace 700 is denoted by $\mathcal{C}$ and is separated from the rest of the states of the eigenspace 700 by an energy gap $\omega_{gap} \propto 4 K\beta^2$.

In the rotating frame, the PCO Hamiltonian is described by quasi-energy eigenstates which exhibit negative energies. When a displacement transformation $D(\pm\beta) = \exp(\pm\beta\hat{a}^\dagger \mp \beta\hat{a})$ is applied to the PCO Hamiltonian, the displaced Hamiltonian, $\hat{H}'$, becomes:

$$\hat{H}' = D(\pm\beta)\hat{H}_{PCO}D^\dagger(\pm\beta) = -4K\beta^2\hat{a}^\dagger\hat{a} - K\hat{a}^{\dagger 2}\hat{a}^2 \mp 2K\beta(\hat{a}^{\dagger 2}\hat{a}+h\cdot c\cdot),$$

where, because $$\beta = \sqrt{\frac{P}{K}},$$

the terms with $\hat{a}^\dagger$, $\hat{a}$, $\hat{a}^{\dagger 2}$, and $\hat{a}^2$ vanish. A constant term $E = P^2/K$ representing an energy shift is also dropped. The vacuum state $|0\rangle$ is an eigenstate of $\hat{H}'$ and therefore, in the original frame, the coherent states $|\pm\beta\rangle$ or equivalently the superpositions $|\mathcal{C}_\beta^\pm\rangle$ are degenerate eigenstates of the original PCO Hamiltonian. In the limit of large $\beta$ (i.e., large pump values), $\beta^2 \gg \beta$, resulting in $\hat{H}'$ being well approximated by $\hat{H}' = -4K\beta^2\hat{a}^\dagger\hat{a}$, which is the Hamiltonian of an inverted harmonic oscillator. The first excited state of $\hat{H}'$ is the Fock state $|n=1\rangle$ with an energy $4K\beta^2$ below the vacuum state $|0\rangle$. Therefore, the displaced Fock states $D(\pm\beta)|n=1\rangle$ are the two degenerate excited states in the original undisplaced frame. Since the eigenstates of the PCO Hamiltonian are also the eigenstates of the parity operator, it may be convenient to express the excited states as the two orthogonal states $|\psi_{e,1}^\pm\rangle = N_{e,1}^\mp [D(\beta) \mp D(\backslash\beta)]|n=1\rangle$, which are even and odd parity states, respectively, where $N_{e,1}^\mp$ are normalization constants. The energy gap between the cat-subspace and $|\psi_{e,1}^\pm\rangle$ is therefore $\omega_{gap} \propto 4K\beta^2$.

Figure 7B:
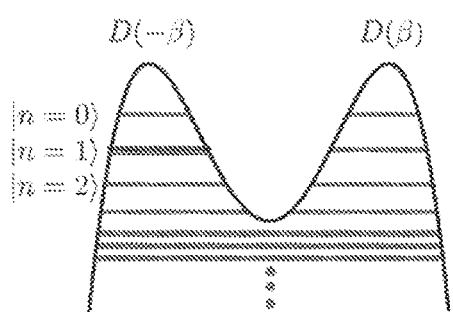
FIG. 7B depicts the potential of a pumped cat oscillator (PCO) in the limit of large parametric drive, according to some embodiments.

FIG. 7B illustrates the potential 710 of the PCO in the limit of large parametric drive, according to some embodiments. When the drive microwave field is large (e.g., large β, or equivalently, large P), the PCO behaves like two harmonic oscillators displaced by ±β. The tunneling between the two harmonic oscillators is suppressed exponentially as a function of β because the tunnel splitting can by approximated by the overlap $\langle n|D^\dagger(-\beta)D(\beta)|n\rangle = f(\beta^2) e^{-2\beta^2}$, where $f(\beta^2)$ is a polynomial function of $\beta^2$. Thus, the eigenspectrum of the PCO Hamiltonian reduces to superpositions of pairs of degenerate displaced Fock states. $[D(\beta) \pm D(-\beta)]|n\rangle$. For a fixed value of β, this approximation becomes less valid for higher values of n and breaks down near $n \sim \beta^2$. When the drive is zero (β=P=0), the Hamiltonian becomes that of an undriven nonlinear oscillator with Fock states $|n=0\rangle$ and $|n=1\rangle$ being degenerate and the next two excited states, $|n=2\rangle$ and $|n=3\rangle$ being non-degenerate. In such a situation, $\omega_{gap}$ becomes equal to the gap between the Fock states $|n=0\rangle$ and $|n=2\rangle$, which is equal to 2K. This eigenspectrum is described in the frame which is rotating at the frequency of the oscillator, $\omega_{PCO}$, which implies that the energy gap in the laboratory frame is $\omega_{PCO} - \omega_{gap}$. External drives (e.g., microwave fields) or perturbations at this frequency can therefore cause transition between $|C_\beta^\pm\rangle$ and excited states.

In some embodiments, the PCO interacts with the data qubit, represented by the system M, in such a way that the interaction Hamiltonian in the rotating frame is:

$\hat{H}_I = \Sigma_i \chi_i(t) \hat{M}_i (\hat{a}^\dagger + \hat{a})$.

To understand the effect of this interaction/coupling on the PCO, it is noted that the cat states undergo bit-flips under the action of the photon annihilation operator, $\hat{a}|C_\beta^\pm\rangle = \beta p^{\pm 1} |C_\beta^\mp\rangle$, where $p = N_\beta^+ / N_\beta^-$. Because $N_\beta^\pm = 1/\sqrt{2(1\pm e^{-2|\beta|^2})}$, for large β, p→1. While the annihilation operator, â, transforms a state within the cat subspace, $C$, to another state within $C$, the photon creation operation, $\hat{a}^\dagger$, may take the PCO out of the cat subspace. But for small couplings $\chi_i(t) \langle \hat{M}_i \rangle$, these spurious out-of-subspace excitations are suppressed due to the energy gap between the cat subspace and the other states of the eigenspectrum. In this restricted subspace, $\hat{a}^\dagger |C_\beta^\pm\rangle = \beta_p^{\mp 1} |C_\beta^\mp\rangle$. Thus, the interaction Hamiltonian can be approximated as:

$\hat{H}_I = 2\beta \hat{\sigma}_z \Sigma_i \chi_i'(t) \hat{M}_i$, where $\chi_i'(t) = \chi_i(t)(p+p^{-1})/2 \sim \chi_i(t)$ and $\hat{\sigma}_z = |C_\beta^+\rangle\langle C_\beta^-| + |C_\beta^-\rangle\langle C_\beta^+|$ is the Pauli operator in the cat subspace. Thus, the interaction Hamiltonian is an entangling interaction that is identical to the interaction Hamiltonian, $\hat{V}$, described above in the example stabilizer measurement technique and therefore leads to the unitary evolution equivalent to the unitary operator Û(t), above. Thus, the couplings $\chi_i(t)$ and interaction time can be selected such that the evolution of the system after time t=T is given by:

$$\hat{U}(T) = \frac{1+\hat{S}}{2} + \frac{1-\hat{S}}{2}\hat{\tilde{\sigma}_z}.$$

Based on the above, the ancilla cat state of the PCO undergoes a bit-flip conditioned on the stabilizer being $\hat{S}=+1$ or $\hat{S}=-1$. The error syndrome can be extracted, in some embodiments, by measuring the state of the PCO at time T.

In some embodiments, an alternative coupling of the form $\Sigma_i \chi_i(t)(\hat{L}_i \hat{a}^\dagger + \hat{L}_i^\dagger \hat{a})$, where $\hat{L}^\dagger + \hat{L}_i = \hat{M}_i$, may be used. For example, such a coupling may be used to extract the error syndrome when using the GKP code.

Figure 8:
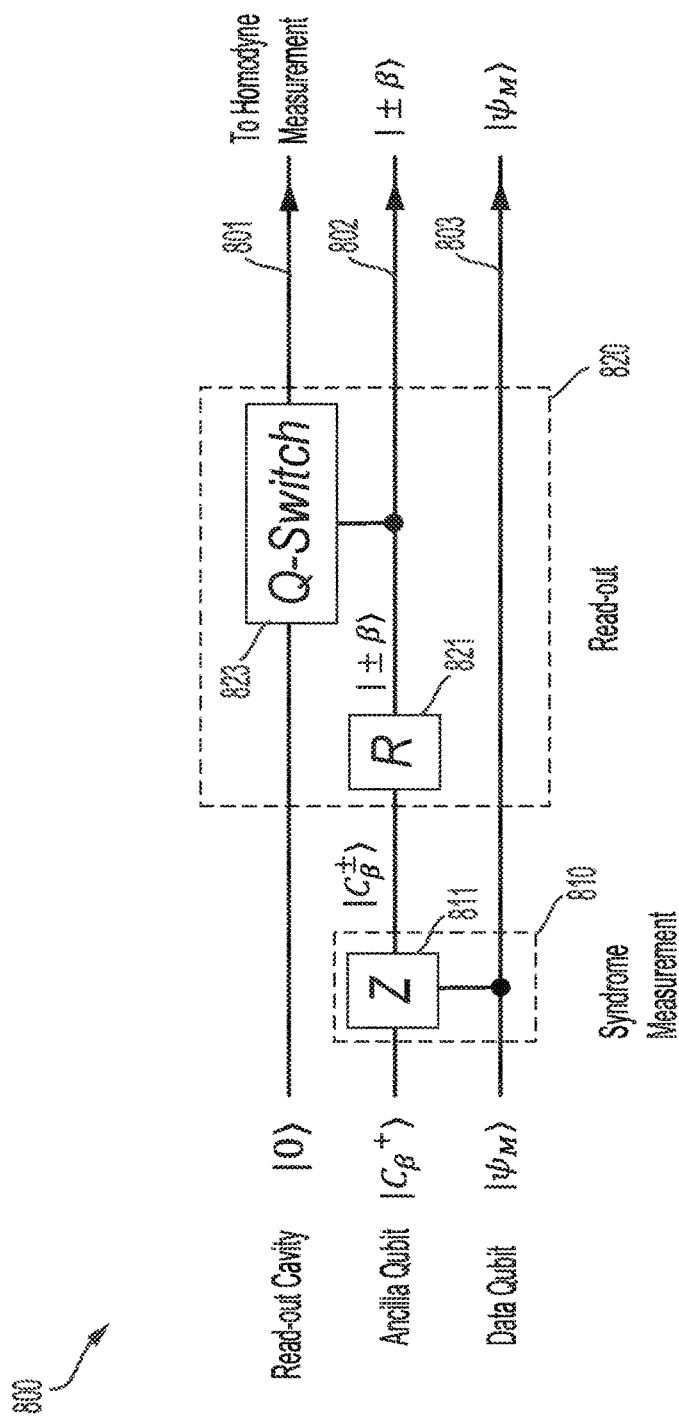
FIG. 8 is a quantum circuit diagram of error syndrome detection, according to some embodiments.

FIG. 8 is a quantum circuit diagram of error syndrome detection 800, according to some embodiments. The three horizontal lines represents a read-out cavity 801, an ancilla qubit 802 and a data qubit 803. Time increases from left to right such that operations that occur on the left of the drawing are performed before operations illustrated on the right of the drawing. The read-out cavity 801 is initialized in the vacuum state $|0\rangle$, the ancilla qubit 802 is initialized in the even number cat state, $|C_\beta^+\rangle$, and the data qubit 803 is in whatever state $|\psi_M\rangle$ the data qubit is in based on other operations that may be performed on the data qubit 803 prior to the error syndrome detection 800. In some embodiments, the ancilla qubit 802 includes a PCO, as described above.

The first act of the error syndrome detection 800 is to map the error syndrome on the state of the PCO. This is referred to as the syndrome measurement 810. For example, the ancilla qubit 802 may remain in the cat state $|C_\beta^+\rangle$ or be transformed to the cat state $|C_\beta^-\rangle$ based on at least one property of the data qubit 803. In some embodiments, the syndrome measurement may be implemented using a control-Z rotation 811, where the state of the PCO is conditionally rotated around the Z-axis of the Bloch sphere based on the state of the data qubit 803. In some embodiments, the syndrome measurement 810 does not change the state of the data qubit 803. As such, the syndrome measurement 810 may be a quantum non-demolition measurement.

After performing the syndrome measurement 810, the error syndrome detection 800 includes a readout operation 820. The readout operation 820 determines the state of the ancilla qubit 802, e.g., by determining the ancilla qubit 802 is in the cat state $|C_\beta^+\rangle$ or the cat state $|C_\beta^-\rangle$. In some embodiments, the read-out of the ancilla qubit 802 may include mapping the state of the ancilla qubit 802 onto the read-out cavity 801. In some embodiments, the read-out operation 820 may include two separate operations. The first operation may be a rotation operation 821 on the ancilla qubit 802. For example, the rotation operation 821 may rotate the cat states $|C_\beta^\pm\rangle$ to the approximate coherent states $|\pm\beta\rangle$. The second operation of the read-out operation 820 includes the "Q-Switch" operation 823 in which a single-photon exchange coupling between the PCO and the read-out cavity 801 is turned on by applying appropriate microwave fields from the microwave field generator 150. The result of the Q-Switch operation 823 is that the read-out cavity 801 is conditionally displaced based on the state of the PCO. Finally, after the read-out operation 820 is complete, the read-out cavity 801 is measured using, for example, a homodyne detection scheme, thereby yielding the error syndrome.

Error Channel Due to Single Photon Loss

The error channel (sometimes referred to as the noise channel) of a PCO is dominated by single-photon loss in the oscillator, which arises from the single-photon exchange coupling with a bath. As discussed above, if the coupling to the bath is smaller than the energy gap between the cat state subspace C and the other states of the eigenspectrum, then the dynamics of the PCO is confined to the cat state subspace. In this restricted subspace, with the assumption that there are no thermal excitations in the bath, i.e., the PCO can only lose photons but not gain photons, the single-photon exchange coupling with the bath results in phase-flip errors dominating over bit-flip errors, which are exponentially small with respect to the strength of the pump field, $\beta$. The bath lifts the two-fold degeneracy of the cat state subspace $\mathcal{C}$ by an amount exponentially small in the size of $\beta^2$. This is because the number of photons in the odd cat state $|\mathcal{C}_\beta^-\rangle$, given by $\langle \mathcal{C}_\beta^-|\hat{a}^\dagger\hat{a}|\mathcal{C}_\beta^-\rangle = \beta^2 p^2$, and the number of photons in the even cat state $|\mathcal{C}_\beta^+\rangle$, given by $$\langle \mathcal{C}_\beta^-|\hat{a}^\dagger\hat{a}|\mathcal{C}_\beta^-\rangle = \frac{\beta^2}{p^2},$$

differ by an exponentially small amount. It is more likely for a photon to be lost to the environment from $|\mathcal{C}_\beta^-\rangle$ than from $|\mathcal{C}_\beta^+\rangle$. This asymmetry lifts the degeneracy between the two cat stats. However, since the difference in the photon numbers decreases exponentially with $\beta$, the cat states $|\mathcal{C}_\beta^\pm\rangle$ are almost degenerate even for moderately sized pump strength, such as $\beta \sim 2$, for which $\exp(-2\beta^2) = 3.3 \times 10^{-4}$.

The preservation of the degenerate cat subspace in some embodiments makes the PCO an good candidate for a meter for use in syndrome detection because coupling with the bath commutes with the interaction Hamiltonian and does not cause backaction on the data qubit, $\mathcal{M}$. Single photon loss to the bath may, however, induce random flips between the two cat states $|\mathcal{C}_\beta^\pm\rangle$, which reduces the accuracy of the measurement of the ancilla qubit. Nevertheless, since the backaction is exponentially suppressed, the accuracy may be recovered by repeating the measurement multiple times. Thus, in some embodiments, the measurement of the ancilla qubit is performed multiple times and a majority vote is used to determine the error syndrome.

Other Noise Sources

In some embodiments, there are other sources of noise, such as photon gain, pure-dephasing, two-photon loss. Single-photon gain and pure dephasing may result in leakage out of the cat state subspace. But leakage can suppressed by ensuring the spectral densities of these noise sources are narrower than the energy gap between the cat state subspace and the other states of the eigenspectrum. Accordingly, some embodiments are engineered such that the PCO has single-photon gain and pure dephasing spectral densities less than the energy gap. In such embodiments, irrespective of the underlying cause of noise, the PCO's error channel is dominated by phase-flip errors, while bit-flip errors are exponentially suppressed.

Further, in some embodiments, it is possible that spurious excitations or sudden non-perturbative effects overcome the energy barrier and cause excitations to the states outside of the cat state subspace. Remarkably, fault-tolerance of the syndrome measurements is still preserved under these errors.

In the example of single-photon gain, the action of $\hat{a}^\dagger$ on a cat state that is part of the cat state subspace $\mathcal{C}$ causes both leakage out of the cat state subspace and a phase-flip error. As discussed above, in the limit of large $\beta$, the first excited states $|\psi_{e,1}^\pm\rangle$ are approximately equal to the displaced single photon Fock states (see, e.g., FIG. 7B). Under this approximation, $\hat{a}^\dagger|\mathcal{C}_\beta^\pm\rangle \sim \beta|\mathcal{C}_\beta^\mp\rangle + |\psi_{e,1}^\pm\rangle$ and a single-photon gain excites the first excited subspace. In the first excited subspace $(\hat{a}^\dagger+\hat{a}) \equiv 2\beta\hat{\sigma}_z^{e,1}$, where $\hat{\sigma}_z^{e,1} = |\psi_{e,1}^+\rangle\langle\psi_{e,1}^-| + |\psi_{e,1}^-\rangle\langle\psi_{e,1}^+|$. Because the two states $|\psi_{e,1}^\pm\rangle$ of the first excited subspace are approximately degenerate, the term $(\hat{a}^\dagger+\hat{a})$ can cause transitions between these two states, but cannot cause transitions out of the first excited subspace. Recall from above that the coupling between the PCO and the data qubit is proportional to $\hat{M}_i(\hat{a}^\dagger+\hat{a})$ and, in the cat state subspace, C, $(\hat{a}^\dagger+\hat{a}) \equiv 2\beta\hat{\sigma}_z$. Thus, the excited states form another two-level ancilla with the same coupling to the data qubit as the ancilla in the cat state subspace. As a result, the data qubit does not gain any information about whether the PCO was in cat subspace or not (e.g., in the first excited subspace). Equivalently, the data qubit is transparent to leakage errors in the PCO. If the PCO experiences n photon-gain events, then the PCO is excited to $|\psi_{e,n}^\pm\rangle$. As long as the $n^{th}$ excited subspace is two-fold degenerate, it will behave as a two-level ancilla with the same coupling to the data qubit $((\hat{a}^\dagger+\hat{a}) \equiv 2\beta\hat{\sigma}_z^{e,n})$. This approximation becomes less valid for highly excited states (e.g., large n). Thus, it may be beneficial to reduce such excitations by dissipative processes such as single- or two-photon loss. This is because photon-loss events transfer the population from the $n^{th}$ excited subspace to the $(n-1)^{th}$ excited subspace. In sum, the backaction due to out-of-subspace excitations in the PCO depends on the existence of pairs of degenerate eigenstates in the spectrum of the PCO. Since the difference in the energies of the pair of eigenstates $|\psi_{e,n}^\pm\rangle$ decreases exponentially with the size of the magnitude of the cat state, $\beta$, the backaction also decreases in the same manner.

In the example of pure-dephasing errors, the jump operator $\hat{a}^\dagger\hat{a}$ causes leakage. In the limit of large $\beta$, $\langle\psi_e^\pm|\hat{a}^\dagger\hat{a}|\mathcal{C}_\beta^\pm\rangle \sim \beta$. Using arguments similar to those above described in connection with single-photon gain, it can be seen that the data qubit remains transparent to excitation in the states that are not part of the cat state subspace $\mathcal{C}$ and backaction due to leakage errors is suppressed.

Example Stabilizer Measurements: Toric Codes

In some embodiments, an n-qubit $\hat{\sigma}_z$ stabilizer is used in connection with a toric code, which is an example of a topological quantum error correcting code. In some embodiments, two-dimensional toric codes may be used. A four-qubit stabilizer, $\hat{S}_z = \hat{\sigma}_{z,1} \hat{\sigma}_{z,2} \hat{\sigma}_{z,3} \hat{\sigma}_{z,4}$, may be measured using, e.g., a direct, eigenspace-preserving measurement. The Hilbert space of the stabilizer $\hat{S}_z$ may be classified into an even eigenspace, $\varepsilon$, and an odd eigenspace, $\mathcal{O}$. In some embodiments, an eight-fold degenerate even (odd) subspace comprises the states which are $+1$ ($-1$) eigenstates of $\hat{S}_z$. The even eigenspace, $\mathcal{E}$, and an odd eigenspace, O, may be defined as the code and error subspace, respectively, such that a measurement of $\hat{S}_z$ yields $-1$ or $+1$ based on whether there was an error or not. Thus, the measurement indicates the error syndrome.

In some embodiments, direct measurement of the stabilizer $\hat{S}_z$ would require a five-body interaction between the data qubits and an ancilla qubit, which is challenging to realize experimentally. Instead, some embodiments perform a syndrome measurement using only two-body interactions. This may be accomplished by replacing $\hat{M}_i$ with $\sigma_{z,i}$ in the interaction Hamiltonian described above. The resulting interaction Hamiltonian is:

$\hat{H}_I = \chi(t)\hat{S}'_z(\hat{a}^\dagger+\hat{a})$, where $\hat{S}'_z = \hat{\sigma}_{z,1} + \hat{\sigma}_{z,2} + \hat{\sigma}_{z,3} + \hat{\sigma}_{z,4}$, which has the form of a longitudinal qubit-oscillator coupling. For simplicity, all the interaction strengths are assumed to be equal, though it is not required for them to be equal. As long as the interaction strengths are known, the duration of interaction with each qubit can be adjusted to perform the syndrome measurement. An alternate approach is to keep the duration of interaction fixed, but use a pair of bit-flip driving field pulses for each qubit appropriately separated in time.

Following the analysis of the example stabilizer measurement technique described above, the unitary operator corresponding to this interaction Hamiltonian is:

$$\hat{U}(t) = i\sin\left\{2\beta\hat{S}'_z\int_0^t \chi(\tau)d\tau\right\}\hat{\sigma}_z + \cos\left\{2\beta\hat{S}'_z\int_0^t \chi(\tau)d\tau\right\}.$$

In some embodiments, the error syndrome may be extracted by first initializing the PCO to the cat state $|C_\beta^+\rangle$. Then, in embodiments where the interaction strength is the same for all qubits, the system is evolved for an interaction time $T_z$ such that $$\int_0^{T_z} \chi(\tau)d\tau = \frac{\pi}{8}\beta.$$

More generally, for embodiments where the interaction strengths are different for each qubit, then the interaction time duration for the i-th qubit is $T_{i,z}$, where $$\int_0^{T_{i,z}} \chi_i(\tau)d\tau = \frac{\pi}{8}\beta$$

for each qubit. At the end of the interaction time duration, the unitary operator reduces to:

$$\hat{U}(T_z) = e^{\frac{i\pi\hat{S}'_z}{4}}\left[\left(\frac{1+\hat{S}_x}{2}\right) + \left(\frac{1-\hat{S}_x}{2}\right)\overline{\overline{p}_z}\right].$$

In this expression for the unitary operator after the interaction time duration, the exponential term at the beginning is a local phase rotation of the qubits. In some embodiments, the local phase rotation may be kept track of in classical software while performing subsequent operations on the qubits and accounted for later. In other embodiments, local $\hat{\sigma}_z$-gate may be applied to the qubit during or after syndrome measurement to compensate for these phase rotations. The state of the PCO after time $T_z$, in some embodiments, is therefore $|C_\beta^+\rangle$ or $|C_\beta^-\rangle$ if the qubits started in the code $\hat{S}_z=+1$ or the code $\hat{S}_z=-1$, respectively.

In some embodiments, a time-dependent qubit-oscillator interaction is implemented by switching on and then turning off a coupling between the qubit and the oscillator. In some embodiments, the four qubits are initialized in a maximally entangled state $|\psi_o\rangle$ in the odd eigenspace, $\mathcal{O}$:

$$|\psi_o\rangle = \frac{1}{\sqrt{8}}\left(\sum_i \hat{\sigma}_{x,i} + \sum_{i,j,k}\hat{\sigma}_{x,i}\hat{\sigma}_{x,j}\hat{\sigma}_{x,k}\right)|0,0,0,0\rangle.$$

In some embodiments, the PCO is initialized to the even number cat state $|C_\beta^+\rangle$.

Figure 9A:
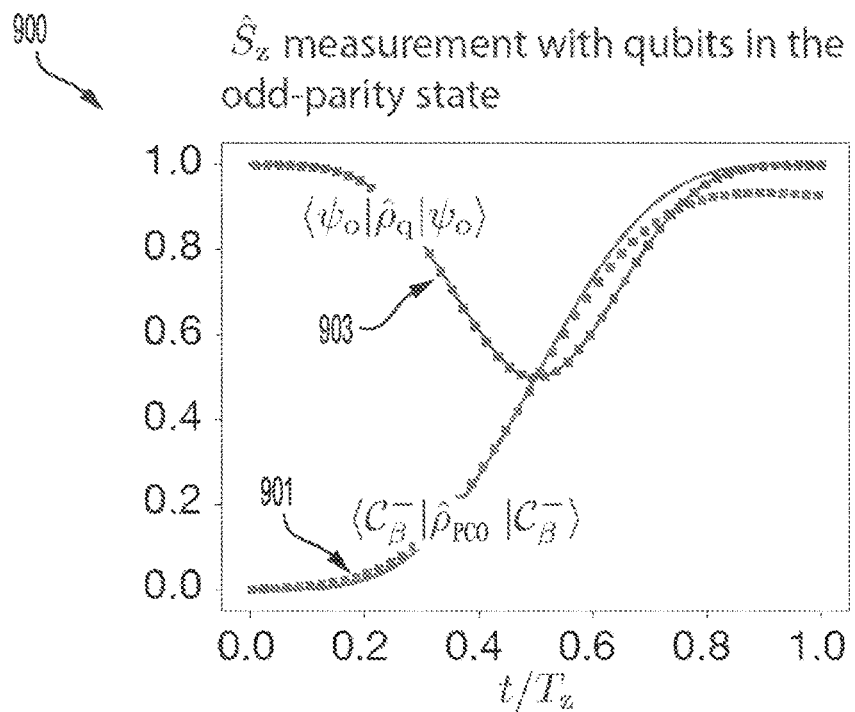
FIG. 9A is a plot of the dynamics of a PCO and associated qubits during a stabilizer measurement for a four-qubit toric code, according to some embodiments.
Figure 9B:
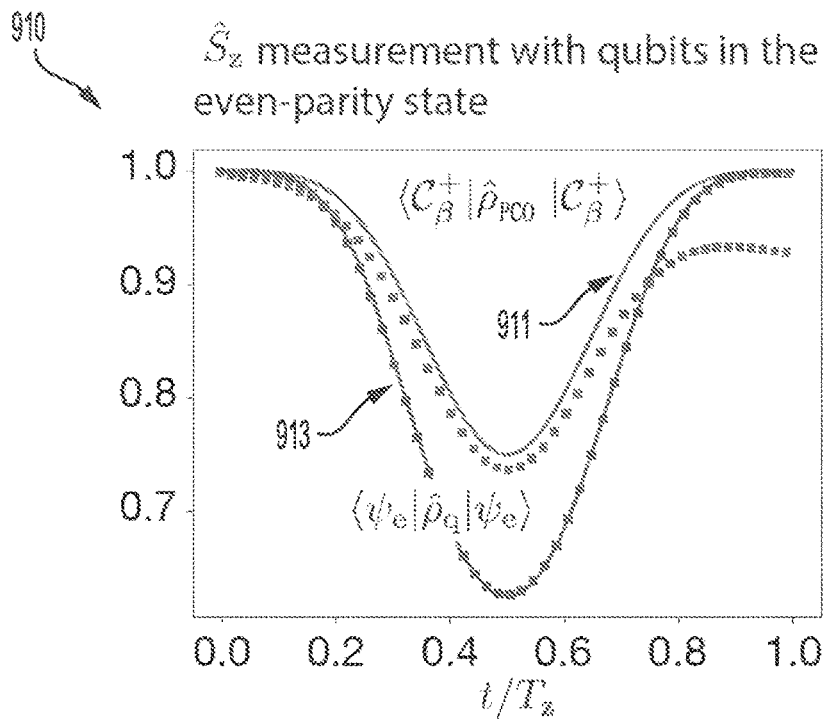
FIG. 9B is a plot of the dynamics of a PCO and associated qubits during a stabilizer measurement for a four-qubit toric code, according to some embodiments.

FIGS. 9A and 9B are plots of the dynamics of the PCO and the qubits during a stabilizer measurement for the rate of single-photon loss, $\kappa=0$ (solid lines) and $\kappa=K/200$, (dotted lines), for the values $P=4K$ (which is equivalent to $\beta=2$), $$\chi = \frac{\pi}{2}\chi_0\sin\left(\frac{\pi t}{T_z}\right),$$

$\chi_0=K/20$, and $T_z=\pi/(8\chi_0\beta)$. FIG. 9A is a plot 900 illustrating the probability 901 for the PCO to be in the state $|C_\beta^-\rangle$ and the probability 903 for the qubits to be in the state $|\psi_o\rangle$ as a function of time when the PCO is initialized in the state $|C_\beta^+\rangle$ and the qubits are initialized in the odd parity state $|\psi_o\rangle$. After the interaction time duration $T_z$, in the situation with no photon loss (solid lines), the probability that the qubits, represented by the density matrix $\hat{\rho}_q$ are in the maximally entangled odd parity state is $\langle\psi_o|\hat{\rho}_q|\psi_o\rangle=0.9999\sim1$ and the probability that the PCO, represented by the density matrix $\hat{\rho}_{PCO}$ is in the odd cat state is $\langle C_\beta^-|\hat{\rho}_{PCO}|C_\beta^-\rangle=0.9999\sim1$. When the photon loss is introduced (dotted lines), the probability of the PCO being in the odd cat state after the interaction time duration $T_z$, is reduced to $\langle C_\beta^-|\hat{\rho}_{PCO}|C_\beta^-\rangle=0.93$ due to loss-induced bit-flips between the even cat state and the odd cat state. The probability of the qubits being in the odd parity state after the interaction time duration $T_z$ is unchanged relative to without photon loss: $\langle\psi_o|\hat{\rho}_q|\psi_o\rangle=0.9999\sim1$. If the photon loss is increased to $\kappa=K/10$, the probability of the PCO being in the odd cat state after the interaction time duration $T_z$, is reduced to $\langle C_\beta^-|\hat{\rho}_{PCO}|C_\beta^-\rangle=0.52$. Thus, the fidelity of mapping the syndrome onto the ancilla qubit is reduced to 52%, which is approaching the 50% point where majority voting fails, but the backaction on the data qubits remains suppressed.

FIG. 9B is a plot 910 illustrating the probability 911 for the PCO to be in the state $|C_\beta^+\rangle$ and the probability 913 for the qubits to be in the state $|\psi_e\rangle$ as a function of time when the PCO is initialized in the state $|C_\beta^+\rangle$ and the qubits are initialized in the even parity state $|\psi_e\rangle$, where:

$$|\psi_e\rangle = \frac{1}{\sqrt{8}}\left(\sum_{i,j}\hat{\sigma}_{x,i}\hat{\sigma}_{x,j} + \hat{I} + \hat{\sigma}_{x,1}\hat{\sigma}_{x,2}\hat{\sigma}_{x,3}\hat{\sigma}_{x,4},\right)|0,0,0,0\rangle.$$

After the interaction time duration $T_z$, in the situation with no photon loss (solid lines), the probability that the qubits, represented by the density matrix $\hat{\rho}_q$ are in the even parity state is $\langle\psi_e|\hat{\rho}_q|\psi_e\rangle=0.9999\sim1$ and the probability that the PCO, represented by the density matrix $\hat{\rho}_{PCO}$ is in the odd cat state is $\langle C_\beta^+|\hat{\rho}_{PCO}|C_\beta^+\rangle=0.9999\sim1$. Thus, the data qubits are transparent to the errors in the PCO. The single-photon loss in the PCO reduces the fidelity of the syndrome extraction, but this can be recovered by repeating the protocol many times and taking a majority vote. For example, with $\kappa=K/200$, the fidelity of the controlled-Z rotation reduces to 93% (dotted line) but by repeating the procedure 5 times the probability of correctly mapping the syndrome to the PCO increases to 99.7%. As seen from the dotted line associated with plot 913, the state of the data qubit after the interaction time duration is unaffected by the photon loss.

In order to highlight the fault-tolerance of the measurements using a PCO, the case in which the measurement is carried out with a conventional two-level physical qubit with the same relaxation rate $\gamma=K/200$. With the conventional physical qubit the probability for the data qubits to remain in the original state decreases significantly to $\langle \psi_e|\hat{\rho}_q|\psi_q\rangle=0.992$ (and when $\gamma=K/10$, $\langle \psi_e|\hat{\rho}_q|\psi_e\rangle=0.867$) and $\langle \psi_o|\hat{\rho}_q|\psi_o\rangle=0.990$ (and when $\gamma=K/10$. $\langle \psi_o|\hat{\rho}_q|\psi_o\rangle=0.827$). In other words, one would have to repeat the measurement with the PCO over 100 times before the data qubits get corrupted as much as with just a single measurement with a conventional physical qubit. This clearly demonstrates the exponential suppression of backaction when the measurement is carried out using the PCO as an ancilla qubit.

When the photon loss is introduced (dotted lines), the probability of the PCO being in the odd cat state after the interaction time duration $T_z$, is reduced to $\langle C_\beta^-|\hat{\rho}_{PCO}|C_\beta^-\rangle=0.93$ due to loss loss-induced bit-flips between the even cat state and the odd cat state. The probability of the qubits being in the odd parity state after the interaction time duration $T_z$ is unchanged relative to without photon loss: $\langle \psi_o|\hat{\rho}_q|\psi_o\rangle>0.9999\sim1$. If the photon loss is increased to $\kappa=K/10$, the probability of the PCO being in the odd cat state after the interaction time duration $T_z$, is reduced to $\langle C_\beta^-|\hat{\rho}_{PCO}|C_\beta^-\rangle=0.52$. Thus, the fidelity of mapping the syndrome onto the ancilla qubit is reduced to 52%, which is approaching the 50% point where majority voting fails, but the backaction on the data qubits remains suppressed.

Example Stabilizer Measurements: Cat Codes

In some embodiments, a cat code stabilizer, which is a type of bosonic error correcting code where the information is encoded in superpositions of coherent states, is used. The stabilizer for the cat code is the photon-number parity operator $\hat{P}=e^{i\pi \hat{a}_s^\dagger \hat{a}_s}$, where $\hat{a}_s^\dagger$ and $\hat{a}_s$ are the photon creation and annihilation operators for a data qubit (sometimes referred to here as a storage qubit or storage cat or storage oscillator). When measured, the photon-number parity operator indicates whether a state of the data qubit has an even or an odd number of photons.

In some embodiments, the two-fold degenerate code subspace is defined by the cat states with even photon numbers: $|C_\beta^+\rangle$ and $|C_{i\beta}^{30}\rangle$, which are eigenstates of $\hat{P}$ with eigenvalue +1. The error subspace is defined by the cat states with odd photon numbers: $|C_\beta^-\rangle$ and $|C_{i\beta}^-\rangle$, which are eigenstates of $\hat{P}$ with eigenvalue $-1$.

In some embodiments for performing cat syndrome measurements, a storage oscillator, which encodes the cat codeword, is dispersively coupled to an ancilla qubit. The dispersive coupling between the storage oscillator and the ancilla qubit may be used to map the parity of the storage cat, which is a property of the data qubit, onto the ancilla qubit. However, a random relaxation of the ancilla during the measurement induces a random phase rotation of the cat codeword, making this scheme non-fault tolerant. The inventors have recognized and appreciated that a fault-tolerant syndrome detection scheme can be engineered by replacing the operator $\hat{M}$ in the interaction Hamiltonian, $\hat{H}_I$, above with the photon number operator $\hat{n}=\hat{a}_s^\dagger \hat{a}_s$. In some embodiments, the interaction Hamiltonian of the storage oscillator and ancilla PCO is then given by:

$$\hat{H}_I = \chi(t)\hat{a}_s^\dagger \hat{a}_s(\hat{a}^\dagger+\hat{a}).$$

This interaction is equivalent to a longitudinal interaction between the storage oscillator and the ancilla PCO. In some embodiments, this interaction can be created in a tunable manner.

The unitary operator corresponding to this interaction Hamiltonian is:

$$\hat{U}(t) = i\sin\left\{2\beta \hat{a}_s^\dagger \hat{a}_s \int_0^t \chi(\tau)d\tau\right\}\hat{\sigma}_z + \cos\left\{2\beta \hat{a}_s^\dagger \hat{a}_s \int_0^t \chi(\tau)d\tau\right\}.$$

In some embodiments, the error syndrome may be extracted by first initializing the PCO to the cat state $|C_\beta^+\rangle$. Then, the interaction between the storage oscillator and the ancilla PCO is turned on for an interaction time duration $T_p$ such that $$\int_0^{T_p} \chi(\tau)d\tau = \frac{\pi}{4\beta}.$$

At the end of the interaction time duration, $T_P$ the unitary operator reduces to:

$$U(T_P) = e^{\frac{i\pi \hat{a}_s^\dagger \hat{a}_s}{2}}\left[\left(\frac{1+\hat{P}}{2}\right)+\left(\frac{1-\hat{P}}{2}\right)\hat{\sigma}_z\right].$$

In this expression for the unitary operator after the interaction time duration, the exponential term at the beginning is a deterministic rotation of the frame of reference of the storage cat. In some embodiments, the deterministic rotation may be kept track of in classical software while performing subsequent operations on the qubits and accounted for later. If the storage oscillator is in the code subspace $x|C_\beta^+\rangle+y|C_{i\beta}^+\rangle$, then the states of the ancilla PCO and the storage oscillator after the interaction time duration $T_P$ are $|C_\beta^+\rangle$ and $x|C_\beta^+\rangle+y|C_{i\beta}^+\rangle$, respectively (ignoring the deterministic frame rotation). On the other hand, if the storage oscillator is in the error subspace $x|C_\beta^-\rangle+y|C_{i\beta}^-\rangle$, then the PCO evolves to the state $|C_\beta^-\rangle$ at time $T_P$ while the storage cat remains in the state $x|C_\beta^-\rangle+y|C_{i\beta}^-\rangle$. Accordingly, the state of the ancilla PCO indicates the error syndrome, $\hat{P}$. In some embodiments, the PCO only measures the parity of the storage cat without revealing information about the actual photon statistics as long as $\chi$ is small and the dynamics of the PCO can be restricted to the stabilized cat subspace. For finite $\chi/K_\beta^2$, there is a small probability of excitations out of the C subspace which could cause phase diffusion in the storage cat. Partial correction of this diffusion is possible in some embodiments by applying a counterdrive to the PCO to cancel the excitations out of the C subspace on average such that the correction Hamiltonian $\hat{H}_c=-\chi\langle \hat{a}_s^\dagger \hat{a}_s\rangle (\hat{a}^\dagger+\hat{a})$.

In some embodiments, a time-dependent qubit-oscillator interaction is implemented by switching on and then turning off a coupling between the storage cavity and the ancilla PCO. In some embodiments, the storage cavity is initialized in the odd-parity state $|\psi_o\rangle=|C_\beta^-\rangle+i|C_{i\beta}^-\rangle$, and the ancilla PCO is initialized in the cat state $|C_\beta^+\rangle$.

Figure 10A:
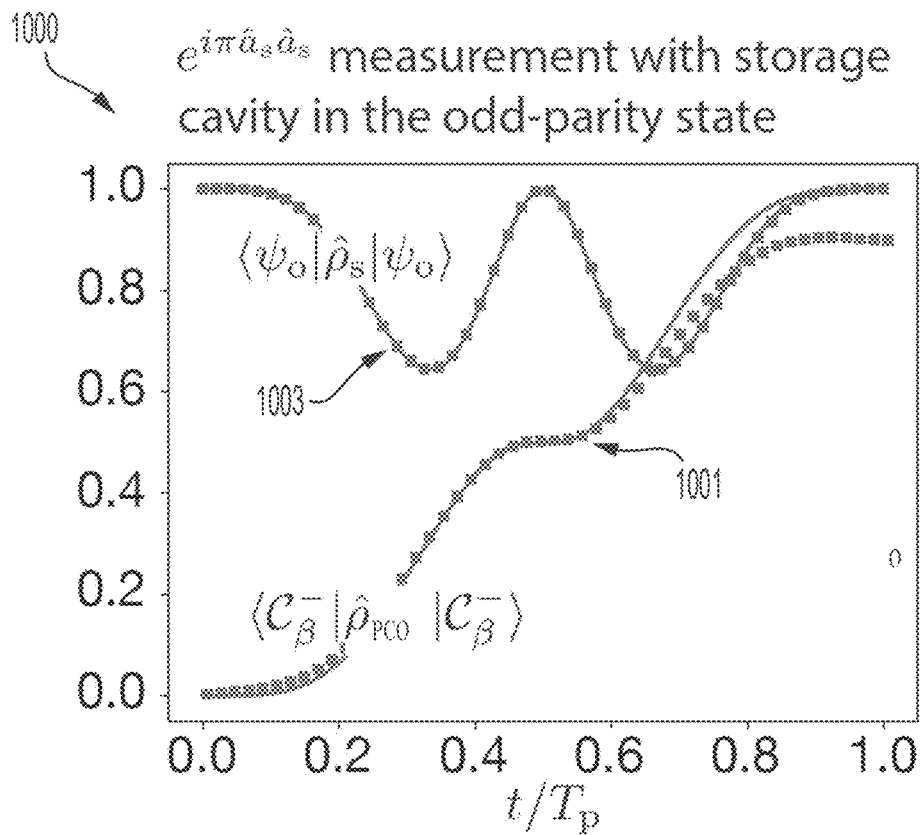
FIG. 10A is a plot of the dynamics of a PCO and associated qubits during a stabilizer measurement for a cat code, according to some embodiments.
Figure 10B:
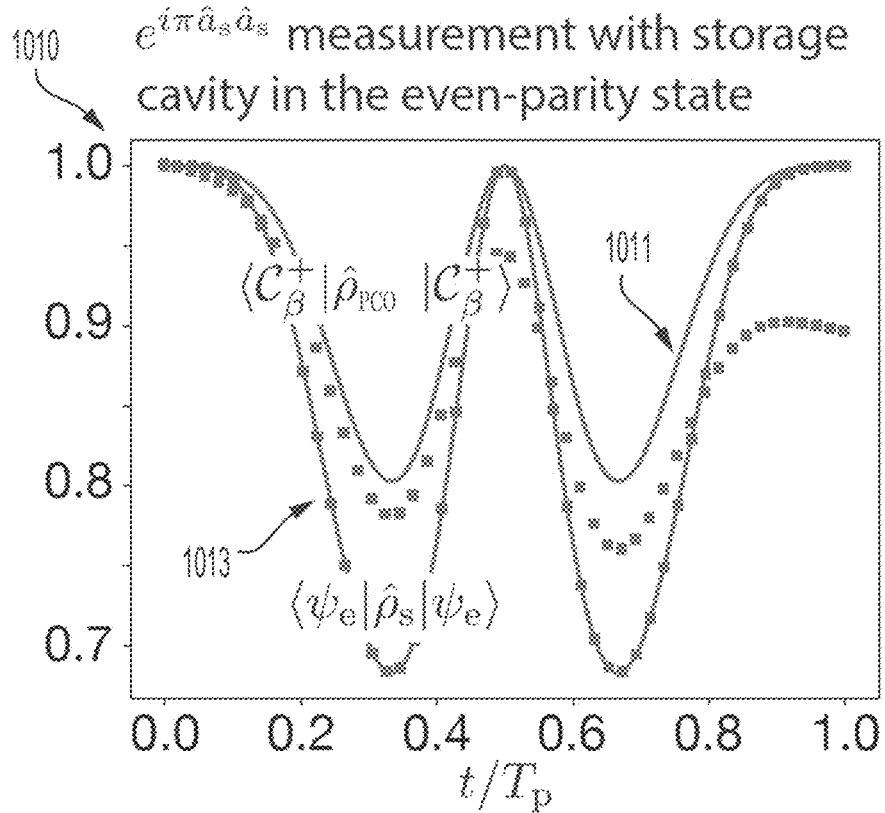
FIG. 10B is a plot of the dynamics of a PCO and associated qubits during a stabilizer measurement for a cat code, according to some embodiments.

FIGS. 10A and 10B are plots of the dynamics of the PCO and the storage cavity during a stabilizer measurement for the rate of single-photon loss, $\kappa=0$ (solid lines) and $\kappa=K/200$, (dotted lines), for the values P=4 K (which is equivalent to $\beta=2$), $$\chi = \frac{\pi}{2}\chi_0 \sin\left(\frac{\pi t}{T_P}\right),$$

$\chi_0=K/15$, and $T_P=\pi/(4\chi_0\beta)$). FIG. 10A is a plot 1000 illustrating the probability 1001 for the PCO to be in the state $|C_\beta^-\rangle$ and the probability 1003 for the storage cavity to be in the state $|\psi_o\rangle$ as a function of time when the PCO is initialized in the state $|C_\beta^+\rangle$ and the storage cavity is initialized in the odd parity state $|\psi_o\rangle$. After the interaction time duration $T_P$, in the situation with no photon loss (solid lines), the probability that the storage cavity, represented by the density matrix $\rho_s$ is in the maximally entangled odd-parity state is $\langle\psi_o|\hat{\rho}_s|\psi_o\rangle=0.9999\sim1$ and the probability that the PCO, represented by the density matrix $\hat{\rho}_{PCO}$ is in the odd cat state is $\langle C_\beta^-|\hat{\rho}_{PCO}|C_\beta^-\rangle=0.9999\sim1$. When the photon loss is introduced (dotted lines), the probability of the PCO being in the odd cat state after the interaction time duration $T_z$, is reduced to $\langle C_\beta^-|\hat{\rho}_{PCO}|C_\beta^-\rangle=0.90$ due to loss loss-induced bit-flips between the even cat state and the odd cat state. The probability of the storage cavity being in the odd parity state after the interaction time duration $T_P$ is unchanged relative to without photon loss: $\langle\psi_o|\hat{\rho}_s|\psi_o\rangle=0.9999\sim1$.

FIG. 10B is a plot 1010 illustrating the probability 1011 for the PCO to be in the state $|C_\beta^+\rangle$ and the probability 1013 for the storage cavity to be in the state $|\psi_e\rangle$ as a function of time when the PCO is initialized in the even-parity state $|\psi_e\rangle=|C_\beta^+\rangle+i|C_{i\beta}^+\rangle$ and the ancilla PCO is initialized in the cat state $|C_\beta^+\rangle$. For no photon loss ($\kappa=0$), the probability of the storage cavity at time $T_P$ being in the even-parity state is $\langle\psi_e|\hat{\rho}_s|\psi_e\rangle=0.9999\sim1$ and the probability that the PCO, is in the odd-parity state is $\langle C_\beta^-|\hat{\rho}_{PCO}|C_\beta^-\rangle=0.9999\sim1$. When the photon loss is introduced ($\kappa=K/200$), the probability of the ancilla PCO being in the odd-parity state decreases to $\langle C_\beta^-|\hat{\rho}_{PCO}|C_\beta^-\rangle=0.90$, but the probability that the storage cavity is in the even-parity state remains at $\psi_e|\hat{\rho}_s|\psi_e\rangle=0.9999\sim1$.

In order to highlight the fault-tolerance of the measurements using a PCO, the case in which the measurement is carried out with a conventional two-level physical qubit with the same relaxation rate $\gamma=K/200$. With the conventional two-level physical qubit, the backaction on the storage cavity increases by approximately two orders of magnitude.

Example Stabilizer Measurements: Gottesman-Kitaev-Preskill (GKP) Codes

In some embodiments, a GKP code, which is a type of bosonic error correcting code designed to correct random displacement errors in phase space, is used. In some embodiments, the codewords for the GKP code are the simultaneous +1 eigenstates of the phase-space displacements $\hat{S}_q=\exp(2i\sqrt{\pi}\hat{q})=D(i\sqrt{2\pi})$ and $\hat{S}_p=\exp(-2i\sqrt{\pi}\hat{p})=D(\sqrt{2\pi})$ of the storage cavity, where $\hat{q}$ and $\hat{p}$ are the position and momentum operators, respectively, defined in terms of the photon annihilation and creation operators of the storage cavity as $\hat{q}=(\hat{a}_s^\dagger+\hat{a}_s)/\sqrt{2}$ and $\hat{p}=i(\hat{a}_s^\dagger-\hat{a}_s)/\sqrt{2}$, and $D(i\sqrt{2\pi})$ and $D(\sqrt{2\pi})$ are displacement operators, where $D(\beta)=\exp(\beta\hat{a}_s^\dagger-\beta^*\hat{a}_s)$.

Two ideal GKP codewords are uniform superpositions of eigenstates of the position operator q at even and odd integer multiples of $\sqrt{\pi}$, respectively. These GKP states are a sum of an infinite number of infinitely squeezed states and are unphysical (non-normalizable) because of their unbounded number of photons. More realistic codewords that may be used in some embodiments can be realized by replacing the infinitely squeezed state $|\hat{q}=0\rangle$ with a squeezed Gaussian state and replacing the uniform superposition over these states by an overall envelope function, such as a Gaussian, a binomial, etc. The GKP code provides protection against low-rate errors which can be represented as small phase space displacements of the oscillator given by $\exp(-iu\hat{q})$ and $\exp(-iv\hat{p})$. The displaced GKP states are also the eigenstates of the stabilizers $\hat{S}_q$ and $\hat{S}_p$ with eigenvalues $\exp(i2\sqrt{\pi}u)$ and $\exp(i2\sqrt{\pi}v)$, respectively. A measurement of the stabilizers yields the eigenvalues and hence uniquely determines the displacement errors u and v. In some embodiments, this is possible when $|u|, |v| < \sqrt{\pi}/2$, which is when the displacement error is smaller than half the translational distance $\sqrt{\pi}$, between codewords.

In some embodiments, a simple approach to measure the eigenvalues $\exp(i2\sqrt{\pi}u)$ and $\exp(i2\sqrt{\pi}v)$ of $\hat{S}_q$ and $\hat{S}_p$, respectively, is based on an adaptive phase-estimation protocol (APE). In such embodiments, displacement operations are repetitively performed on the storage cavity, the displacement operations being conditioned on the state of the ancilla qubit. Thus, some embodiments are directed to a fault-tolerant protocol for the APE of the stabilizers for a GKP code using a stabilized cat in a PCO.

In some embodiments, to achieve a controlled displacement for use in APE, the storage cavity is coupled to the PCO via a tunable single photon exchange interaction (also known as a beam splitter operation), defined by the Hamiltonian:

$$\hat{H}_{BS}=\hat{H}_{PCO}+g(t)\hat{a}^\dagger\hat{a}_s+g^*(t)\hat{a}\hat{a}_s^\dagger,$$

where g(t) is a dynamic coupling strength between the storage cavity and the PCO. In some embodiments, this tunable beam splitter operation may be realized using the three- or four-wave mixing capability of the PCO and external microwave drives of appropriate frequencies received from the microwave field generator 150. For small values of $|g|$, the beam splitter Hamiltonian can be approximated as $$\hat{H}'_{BS} = \hat{H}_{PCO} + \beta\left(\frac{p+p^{-1}}{2}\right)(g(t)\hat{a}_s+g^*(t)\hat{a}_s^\dagger)\vec{\sigma}_z -$$

$$i\beta\left(\frac{p-p^{-1}}{2}\right)(g(t)\hat{a}_s+g^*(t)\hat{a}_s^\dagger)\vec{\sigma}_y.$$

For large amplitude $\beta$, the second term of the Hamiltonian $\hat{H}'_{BS}$ becomes negligibly small and evolution under the Hamiltonian results in a controlled displacement along the position or momentum quadrature depending on the phase chosen for the coupling g(t). In this limit, when the phase and amplitude of the coupling g(t) are chosen so that $g(t)=g^*(t)=|g(t)|$ and $\beta\int_0^{T_1}|g(t)|dt=\sqrt{\pi/2}$, the unitary operator corresponding to the beam splitter interaction Hamiltonian above reduces to:

$$\hat{U}_1(T_1) = D\left(-i\sqrt{\frac{\pi}{2}}\right)\left[(\tfrac{1+\vec{\sigma}_z}{2})D(i\sqrt{2\pi})+(\tfrac{1-\vec{\sigma}_z}{2})\right].$$

The above unitary operator, $\hat{U}_1(T_1)$, is the conditional displacement of the storage cavity for APE of $\hat{S}_q$, according to some embodiments.

Similarly, when the phase and amplitude of the coupling g(t) are chosen so that $g(t)=i|g(t)|$, $g^*(t)=i|g(t)|$, and $\beta\int_0^{T_2}|g(t)|dt=\sqrt{\pi/2}$, the unitary operator corresponding to the beam splitter interaction Hamiltonian above reduces to:

$$\hat{U}_2(T_2) = D\left(-\sqrt{\frac{\pi}{2}}\right)\left[(\tfrac{1+\vec{\sigma}_z}{2})D(\sqrt{2\pi})+(\tfrac{1-\vec{\sigma}_z}{2})\right].$$

The above unitary operator, $\hat{U}_2(T_2)$, is the conditional displacement of the storage cavity for APE of $\hat{S}_p$, according to some embodiments.

Figure 11A:
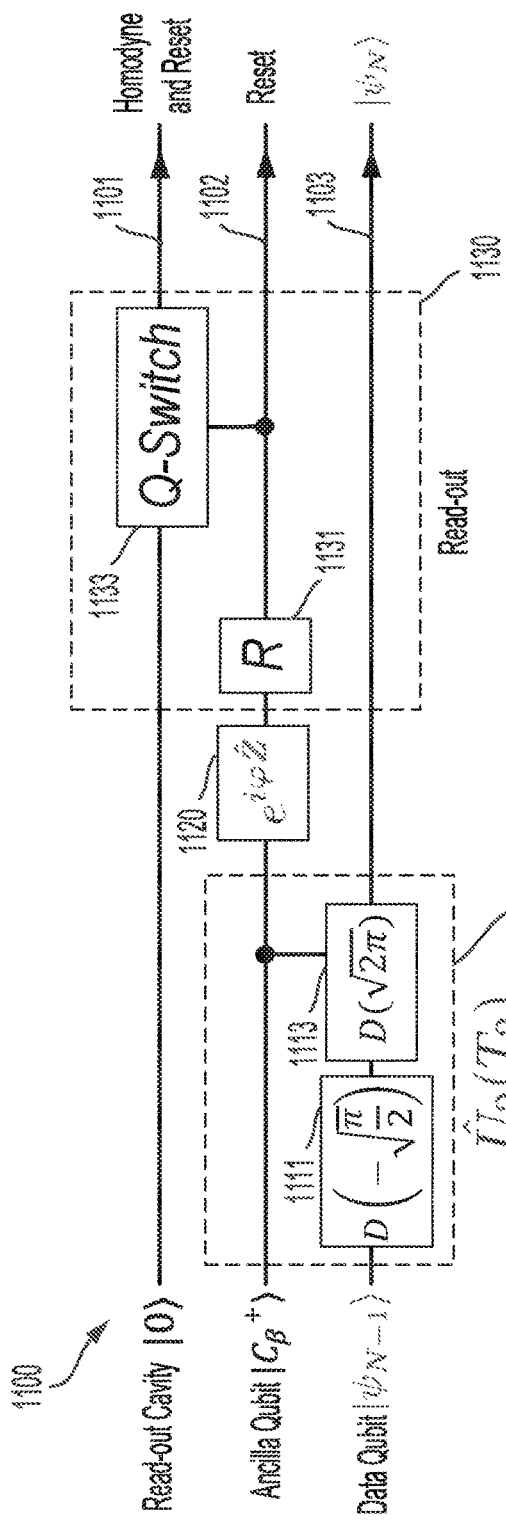
FIG. 11A is a quantum circuit diagram for performing adaptive phase estimation, according to some embodiments.
Figure 11B:
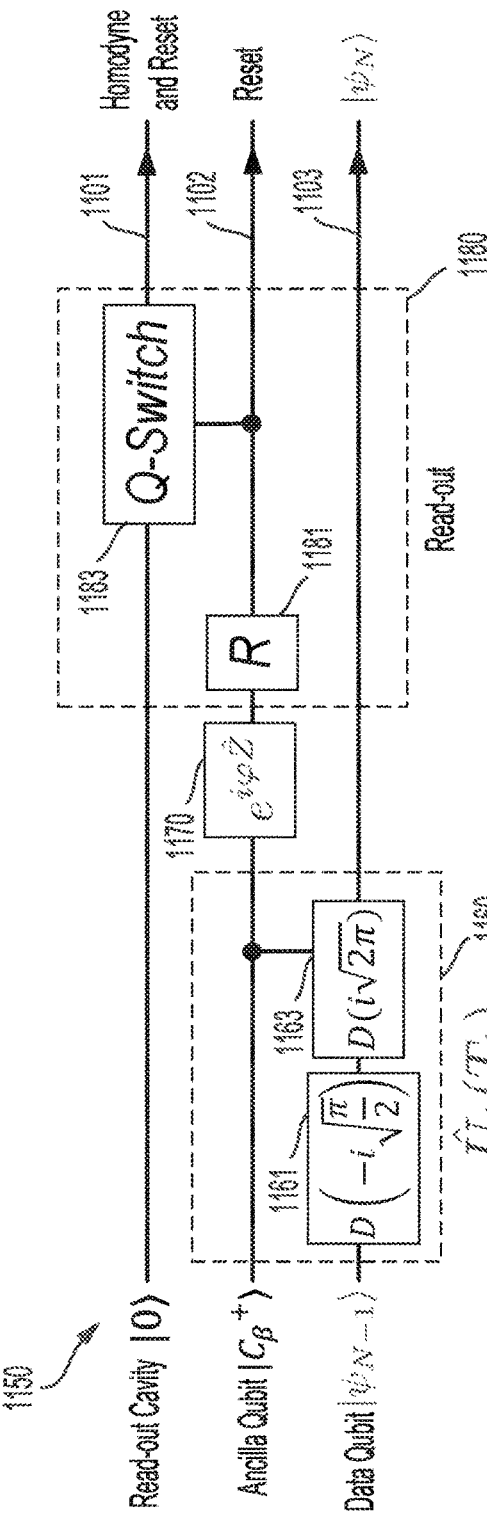
FIG. 11B is a quantum circuit diagram for performing adaptive phase estimation, according to some embodiments.

FIGS. 11A and 11B show a quantum circuit diagram for performing an APE protocol, according to some embodiments. FIG. 11A illustrates the protocol 1100 for estimating $\hat{S}_q$, and FIG. 11B illustrates the APE protocol 1150 for estimating $\hat{S}_p$. The three horizontal lines represent a read-out cavity 1101, an ancilla qubit 1102 and a data qubit 1103. Time increases from left to right such that operations that occur on the left of the drawings are performed before operations illustrated on the right of the drawings. The read-out cavity 1101 is initialized in the vacuum state $|0\rangle$, the ancilla qubit 1102 is initialized in the even number cat state, $|C_\beta^+\rangle$, and the data qubit 1103 is in whatever state $|\psi_{N-1}\rangle$ the data qubit is in based on other operations that may be performed on the data qubit 1103 prior to the APE protocol. In some embodiments, the ancilla qubit 1102 includes a PCO, as described above.

The protocol 1100 for estimating $\hat{S}_q$ includes performing a first joint unitary operation 1110 on the data qubit 1102 and the ancilla qubit 1103 such that $\hat{U}_1(T_1)$ is implemented. In some embodiments, the first joint unitary operation 1110 includes two separate actions. First, a displacement operation 1111 that implements the displacement $$D\left(-\sqrt{\frac{\pi}{2}}\right)$$

on the data qubit 1103 is performed. Then, a conditional displacement operation 1113 that implements the displacement $D(\sqrt{2\pi})$ on the data qubit 1103 based on the state of the ancilla qubit 1102 is performed.

The protocol 1100 for estimating $\hat{S}_q$ then includes a rotation operation 1120 performed on the ancilla qubit 1102 around the Z-axis by an angle $\varphi$. In some embodiments, the rotation operation 1120 is performed by driving the ancilla qubit 1102, which may be a PCO, with a microwave field. In some embodiments, the value of $\varphi$ may be determined by a previous iteration of the protocol 1100 for estimating $\hat{S}_p$.

The protocol 1100 for estimating $\hat{S}_q$ then includes a read-out operation 1130 for determining the state of the ancilla qubit 1102. The readout operation 1130 determines the state of the ancilla qubit 1102, e.g., by determining the ancilla qubit 1102 is in the cat state $|C_\beta^+\rangle$ or the cat state $|C_\beta^-\rangle$. In some embodiments, the read-out of the ancilla qubit 1102 may include mapping the state of the ancilla qubit 1102 onto the read-out cavity 1101. In some embodiments, the read-out operation 1130 may include two separate operations. The first operation may be a rotation operation 1131 on the ancilla qubit 1102. For example, the rotation operation 1131 may rotate the cat states $|C_\beta^\pm\rangle$ to the approximate coherent states $|\pm\beta\rangle$. The second operation of the read-out operation 1130 includes the "Q-Switch" operation 1133 in which a single-photon exchange coupling between the PCO 1102 and the read-out cavity 1101 is turned on by applying appropriate microwave fields from the microwave field generator 150. The result of the Q-Switch operation 1133 is that the read-out cavity 1101 is conditionally displaced based on the state of the PCO 1102. Finally, after the read-out operation 1130 is complete, the read-out cavity 1101 is measured using, for example a homodyne detection scheme.

After the protocol 1100 for estimating $\hat{S}_q$ is performed, the read-out cavity 1101 and the ancilla qubit 1103 may be reset to their respective initialized states $|0\rangle$ and $|C_\beta^+\rangle$, respectively).

The protocol 1150 for estimating $\hat{S}_p$ includes performing a second joint unitary operation 1160 on the data qubit 1102 and the ancilla qubit 1103 such that $\hat{U}_2(T_2)$ is implemented. In some embodiments, the second joint unitary operation 1160 includes two separate actions. First, a displacement operation 1161 that implements the displacement $$D\left(-i\sqrt{\frac{\pi}{2}}\right)$$

on the data qubit 1103 is performed. Then, a conditional displacement operation 1163 that implements the displacement $D(i\sqrt{2\pi})$ on the data qubit 1103 based on the state of the ancilla qubit 1102 is performed.

The protocol 1150 for estimating $\hat{S}_p$ then includes a rotation operation 1170 performed on the ancilla qubit 1102 around the Z-axis by an angle $\phi$. In some embodiments, the rotation operation 1170 is performed by driving the ancilla qubit 1102, which may be a PCO, with a microwave field. In some embodiments, the value of $\phi$ may be determined by a previous iteration of the protocol 1100 for estimating $\hat{S}_p$.

The protocol 1150 for estimating $\hat{S}_p$ then includes a read-out operation 1180 for determining the state of the ancilla qubit 1102. The readout operation 1180 determines the state of the ancilla qubit 1102, e.g., by determining the ancilla qubit 1102 is in the cat state $|C_\beta^+\rangle$ or the cat state $|C_\beta^-\rangle$. In some embodiments, the read-out of the ancilla qubit 1102 may include mapping the state of the ancilla qubit 1102 onto the read-out cavity 1101. In some embodiments, the read-out operation 1180 may include two separate operations. The first operation may be a rotation operation 1181 on the ancilla qubit 1102. For example, the rotation operation 1181 may rotate the cat states $|C_\beta^\pm\rangle$ to the approximate coherent states $|\pm\beta\rangle$. The second operation of the read-out operation 1180 includes the "Q-Switch" operation 1183 in which a single-photon exchange coupling between the PCO 1102 and the read-out cavity 1101 is turned on by applying appropriate microwave fields from the microwave field generator 150. The result of the Q-Switch operation 1183 is that the read-out cavity 1101 is conditionally displaced based on the state of the PCO 1102. Finally, after the read-out operation 1180 is complete, the read-out cavity 1101 is measured using, for example, a homodyne detection scheme.

After the protocol 1150 for estimating $\hat{S}_p$ is performed, the read-out cavity 1101 and the ancilla qubit 1103 may be reset to their respective initialized states $|0\rangle$ and $|C_\beta^+\rangle$, respectively).

As mentioned above, the amount of rotation performed in rotation operations 1120 and 1160 above are $\varphi$ and $\phi$, respectively, and may be determined based on a previous iteration of the respective estimation protocol. In this way, measurement results are fed back into subsequent iterations of the APE protocol. To understand how these feedback phases are determined, consider the situation where the data qubit 1103 is in an eigenstate of the stabilizer $\hat{S}_q$ with an eigenvalue $\exp(2i\sqrt{\pi}u)$. After the application of the first joint unitary operation 1110 that implements $\hat{U}_1(T_1)$, the state of the ancilla qubit becomes $i|C_\beta^-\rangle \sin(\sqrt{\pi}u)+|C_\beta^+\rangle \cos(\sqrt{\pi}u)$. If the ancilla qubit 1102 is further rotated about the Z-axis by an angle $\phi/2$ by the rotation operation 1120, the state of the ancilla qubit 1102 becomes $|C_\beta^-\rangle$ sin($\sqrt{\pi}u+\phi$)+$|C_\beta^+\rangle$ cos($\sqrt{\pi}u+\phi$). Thus, the probability for the ancilla qubit 1102 to remain in the $|C_\beta^+\rangle$ state after a single iteration of phase estimation is $P_\phi(+|u)=\cos^2(\sqrt{\pi}u+\phi/2)$. Consequently, to accurately predict the value of u, the sensitivity of the probability distribution $\partial P_\phi(+|u)/\partial\phi$ should be maximized. In some embodiments, this is achieved in APE by choosing the feedback phase $\phi$ based on whether the ancilla qubit 1102 was measured to be in the $|C_\beta^-\rangle$ or the $|C_\beta^+\rangle$ state in the previous iteration of the protocol. A similar analysis applies to performing the APE protocol 1150 for the eigenvalues of $\hat{S}_p$ and the feedback phase $\varphi$.

Based on the above, in some embodiments, the APE protocols 1100 and 1150 may be iterated to estimate the stabilizer eigenvalues. As the number of iterations of phase estimation increases, the accuracy of the estimates of u, v also increases and, consequently, the uncertainty of the eigenvalues exp(2i$\sqrt{\pi}$u) and exp(2i$\sqrt{\pi}$v) decreases.

Ancilla Readout

In several of the embodiments above (e.g., see FIG. 8 and FIGS. 11A-11B), a readout operation is performed to measure the ancilla qubit. While the state of the ancilla qubit may be directly measured by, in the case the ancilla qubit is a PCO, directly measuring the state of the cavity using homodyne detection, such a measurement would be slow due to the high Q of the PCO cavity. Thus, in some embodiments, a read-out cavity with a Q-value smaller than the Q-value of the ancilla cavity is measured using homodyne detection after mapping the state of the ancilla qubit onto the state of the read-out cavity. In some embodiments, the readout of the PCO may be a quantum nondemolition (QND) measurement, though it need not be (e.g., it may be that the readout introduces bit-flips or other errors in the state of the ancilla qubit). Such non-QND measurements are possible because the interaction between the ancilla PCO and the data qubit may be turned off while the PCO is being measured such that ancilla errors do not propagate to the data qubit. Such direct measurements of the ancilla qubit may be performed using a superconducting transmon.

In some embodiments, the readout of the ancilla PCO includes a measurement along the Z-axis of the Bloch sphere and does not introduce any additional nonlinearities into the system. As discussed above, the states along the Z-axis of the Bloch sphere are approximately coherent states and may be measured using homodyne detection of the field at the output of the PCO. To overcome the slow speed of direct homodyne detection of the PCO cavity, a Q-switch operation is performed whereby the PCO state is switched via frequency conversion into a low-Q read-out cavity. In some embodiments, the Q-switch operation conditionally displaces the readout cavity based on the state of the PCO along the Z-axis.

Figure 12:
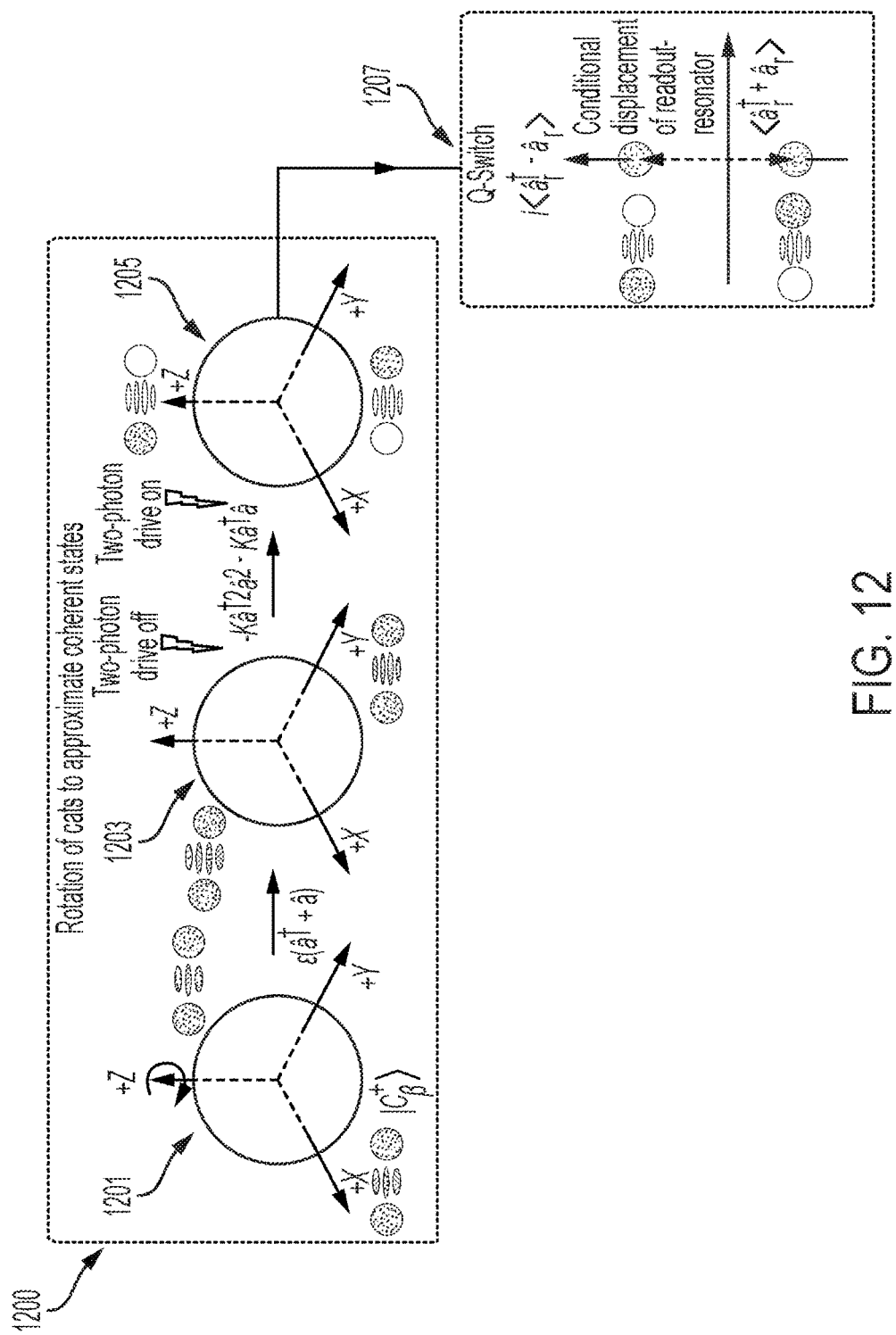
FIG. 12 is a diagram illustrating a readout process in terms of a Bloch sphere, according to some embodiments.

As discussed above, the read-out operation may include a first operation where the cat states of the PCO are rotated into coherent states. Then, the coherent state of the PCO is Q-switched into the readout cavity. Finally the readout cavity is measured. FIG. 12 illustrates the read-out process 1200 in terms of the Bloch sphere.

In some embodiments, the rotation of the cat states $|C_\beta^\pm\rangle$ of the PCO is performed using microwave drive fields from the microwave field generator 150. The Bloch sphere 1201 of the read-out process 1200 shows the cat states $|C_\beta^\pm\rangle$ of the PCO located along the X-axis of the Bloch sphere 1201, which is then rotated about the Z-axis of the Bloch sphere 1201. In some embodiments, the rotation around the Z-axis is performed using a single-photon drive with a Hamiltonian:

$$\hat{H}=\varepsilon(\hat{a}^\dagger+\hat{a})-K\hat{a}^{\dagger 2}\hat{a}^2+P(\hat{a}^{\dagger 2}+\hat{a}^2)$$

The result of this single-photon drive Hamiltonian is to rotate the cat states around the Z-axis in time T=$\pi\varepsilon\beta/8$ from $|C_\beta^\pm\rangle$ to $|C_\beta^+\rangle\pm i|C_\beta^-\rangle)/\sqrt{2}$, which is referred to as a parityless cat state and correspond to the states along the Y-axis of the Bloch sphere (see Bloch sphere 1203 of the readout process 1200). To map these parityless cat states onto the coherent states, the two-photon pump that creates the cat states is turned off (see Bloch sphere 1203) for a time T=$\pi/2K$, allowing the states of the PCO to evolve freely under the Kerr-nonlinear Hamiltonian ($-K\hat{a}^{\dagger 2}\hat{a}^2-K\hat{a}^\dagger\hat{a}$). The free evolution under the Kerr-nonlinear Hamiltonian results in the states $|C_\beta^+\rangle\pm i|C_\beta^-\rangle)/\sqrt{2}$ transforming into the near coherent states $|C_\beta^+\rangle\mp|C_\beta^-\rangle)/\sqrt{2}\approx|\mp\beta\rangle$, as shown in Bloch sphere 1205 of the readout process 1200. Once the free evolution of the PCO state is complete, the two-photon cat pump is reapplied so that the cat subspace is again stabilized against bit-flips. As a result, the PCO remains in the coherent states, as shown in Bloch sphere 1205 of the read-out process 1200.

After the PCO is transformed from cat states into coherent states via the above rotations, the state of the PCO lies along the Z-axis of the Bloch sphere. In some embodiments, the PCO is then coupled to an off-resonance readout cavity. In the absence of an external microwave drive field, the coupling between the PCO and the readout cavity is negligible due to a large detuning between the two. In some embodiments, a single-photon exchange coupling (a beam splitter coupling) is turned on by applying at least one microwave drive field from the microwave field generator to compensate for the frequency difference between the PCO and the readout cavity. A three- or four-wave mixing between the drives, the PCO and the readout cavity results in an interaction between the PCO and the readout cavity causing a resonant single photon exchange between the two. This controllable coupling is referred to a Q-switch. The result of the Q-switch operation is to displace the readout cavity conditions on the state of the PCO, as shown in phase space diagram 1207 of the read-out process 1200. The Q-switch Hamiltonian for this process is given by $\hat{H}_Q=g(\hat{a}^\dagger\hat{a}_r+\hat{a}\hat{a}_r^\dagger)$, where $\hat{a}_r^\dagger$ and $\hat{a}_r$ are the creation and annihilation operators of the readout cavity and g is the tunable coupling strength between the PCO and the readout cavity. For small values of g, the Q-switch Hamiltonian may be approximated as:

$$\hat{H}_Q = g\beta\left(\frac{p+p^{-1}}{2}\right)(\hat{a}_r + \hat{a}_r^\dagger)\vec{\sigma}_z - ig\beta\left(\frac{p-p^{-1}}{1}\right)(\hat{a}_r - \hat{a}_r^\dagger)\vec{\sigma}_y.$$

In cases of moderately large $\beta$, the final term becomes negligibly small and the result is a displacement of the readout oscillator conditioned on the state of the PCO, where the amplitude of the readout cavity's field is $$\langle\hat{a}_r\rangle = \mp\frac{2gi\beta}{\kappa_r}(1 - e^{-\kappa_r t/2})$$

where $\kappa_r$ is the linewidth of the field.

After the readout cavity is conditionally displaced, a homodyne detector is used to determine the state of the readout cavity and, thereby, determine the state of the PCO, which is equivalent to extracting an error syndrome.

Bias-Preserving Quantum Gates

The inventors have recognized and appreciated that the above techniques of using an asymmetric error channel of an ancilla qubit to detect error syndromes may be extended to implement a bias-preserving quantum gate. For qubits with biased noise channels (i.e., asymmetric error channels), operations that do not commute with the dominant error type can un-bias, or depolarize, the noise channel of the qubit, thereby reducing the benefits of the biased noise channel.

To understand how non-commuting operations can un-bias the noise channel of a qubit with a biased noise channel, consider a system that preserves the noise bias. For example, consider the following two-qubit gate:

$$ZZ(\theta) = \exp[i\theta \hat{Z}_1 \hat{Z}_2/2]$$

where $\hat{Z}_i$ is the Z-Pauli operator for the i-th qubit and $\theta$ is a tunable phase angle. When $\theta=\pi/2$, the $ZZ(\theta)$ gate becomes a controlled-phase gate, also referred to as a CZ gate, up to local Pauli rotations and an overall phase. The $ZZ(\theta)$ gate may be implemented with an interaction Hamiltonian of the form $\hat{H}_{ZZ} = -V\hat{Z}_1\hat{Z}_2$ with the unitary evolution given by $\hat{U}_{ZZ}(t) = \exp(iVt\hat{Z}_1\hat{Z}_2)$. Under this unitary evolution, the $ZZ(\theta)$ gate is realized after an interaction time duration $T = \theta/2V$. If a phase-flip occurs in either one of the two qubits at a time $\tau$ during the interaction time, the evolution is modified as follows:

$$\hat{U}_e(T) = \hat{U}(T-\tau)\hat{Z}_{1/2}\hat{U}(\tau) = \hat{Z}_{1/2}\hat{U}(T)$$

Thus, the erroneous gate operation is equivalent to an error-free gate followed by a phase flip. Accordingly, the $ZZ(\theta)$ gate preserves the error bias of the qubit.

On the other hand, the controlled NOT (CNOT) gate (also referred to as a CX gate) between two qubits may be implemented using the following CX Hamiltonian:

$$\hat{H}_{cx} = V\left[\left(\frac{\hat{I}_1 + \hat{Z}_1}{2}\right) \otimes \hat{I}_2 + \left(\frac{\hat{I}_1 + \hat{Z}_1}{2}\right) \otimes \hat{X}_2\right]$$

with the unitary evolution given by $\hat{U}_{CX}(t) = \exp(i\hat{H}_{CX}t)$, where the control qubit and target qubit of the CNOT gate are labelled by 1 and 2, respectively. Under this evolution, the CNOT gate is realized after an interaction time duration $T = \pi/2V$, such that $$U(T) = \left[\left(\frac{\hat{I}_1 + \hat{Z}_1}{2}\right) \otimes \hat{I}_2 + \left(\frac{\hat{I}_1 + \hat{Z}_1}{2}\right) \otimes \hat{X}_2\right],$$

where an overall phase is ignored. In the case of this CNOT gate, a phase-flip error in the target qubit at time $\tau$ during the interaction time modifies the unitary evolution as follows:

$$\hat{U}_e(T) = \hat{U}(T-\tau)\hat{I}_1 \otimes \hat{Z}_2 \hat{U}(\tau)$$
$$= \hat{I}_1 \otimes \hat{Z}_2 e^{iV(T-\tau)(\hat{I}_1 - \hat{Z}_1) \otimes \hat{X}_2} \hat{U}(T).$$

Thus, the phase-flip error in the target qubit introduces a phase-flip error in the control qubit, depending on when the phase error in the target qubit occurs. Importantly, the phase-flip of the target qubit during the CNOT gate propagates as a combination of a phase-flip error and a bit-flip error in the same qubit. Consequently, the CNOT gate reduces the bias of the noise channel by introducing bit-flips in the target qubit. Similarly, coherent errors in the gate operation that arise from uncertainty in V and T also give rise to bit-flip errors in the target qubit. As a consequence, a native bias-preserving CNOT gate is not possible to implement.

The inventors have recognized and appreciated that in the absence of a bias-preserving CNOT gate, alternate circuits are required to extract an error syndrome. These alternate circuits add complexity and limit the gains in fault-tolerance thresholds for error correction that result from using qubits with biased noise. The inventors have therefore developed a novel solution to this problem by engineering a bias-preserving CNOT gate using the same two-component cat states realized in a parametrically driven nonlinear oscillator described above.

As shown in FIG. 6 above, the Bloch sphere is oriented such that the superposition states are oriented along the Z-axis of the Bloch sphere. Moreover, for the purposes of the CNOT gate, the Z-axis is selected as the computational basis such that:

$$|0\rangle = \frac{|C_\alpha^+\rangle + |C_\alpha^-\rangle}{\sqrt{2}}, |1\rangle = \frac{|C_\alpha^+\rangle - |C_\alpha^-\rangle}{\sqrt{2}},$$

where $\alpha$ is the complex amplitude of the coherent state associated with the cat states.

The cat states and their superpositions, $|0\rangle$ and $|1\rangle$, are degenerate eigenstates of a parametrically driven Kerr-nonlinear oscillator. As described above, the PCO exhibits strong noise bias such that bit-flips are exponentially suppressed. Some embodiments use the PCO to implement a native CNOT gate while preserving the error bias, overcoming the problem with the example CNOT gate described above. In some embodiments, the CNOT gate is based on the topological phase that arises from the rotation of the cat states around the Bloch sphere generated by changing a phase of the parametric drive. The topological nature of some embodiments allows the CNOT gate to preserve the error bias in the qubits. The ability to preserve the noise bias demonstrates just one advantage of using continuous variable physical systems, such as the PCO, to implement a logical qubit rather than using two-level physical systems as the basis of a qubit.

In some embodiments, the time-dependent unitary evolution of the qubits undergoing a CNOT gate does not contain an explicit $\hat{X}$ operator (i.e., the X-Pauli operator) because, as described in the above example of a CNOT gate, the $\hat{X}$ operator does not maintain the noise bias of the qubit. In some embodiments, evolution equivalent to the $\hat{X}$ operator are engineered using alternative techniques that do preserve the noise bias. To see how this is accomplished, it is noted that the cat states are eigenstates of the $\hat{X}$ operator such that $\hat{X}|C_\alpha^\pm\rangle = \pm|C_\alpha^\pm\rangle$. Also, the orientation of the cat state on the Bloch sphere is defined by a phase $\phi$ of the two-photon drive field that creates the cat state in the PCO, where the Hamiltonian of the PCO is given by:

$$\hat{H}_0(\phi) = -K\hat{a}^{\dagger 2}\hat{a}^2 + P(\hat{a}^{\dagger 2}e^{2i\phi} + \hat{a}^2 e^{-2i\phi}),$$
$$= -K(\hat{a}^{\dagger 2} - \alpha^2 e^{-2i\phi})(\hat{a}^2 - \alpha^2 e^{2i\phi}) + \frac{P^2}{K}.$$

This Hamiltonian is the same as the previously discussed PCO Hamiltonian, but the drive field is no longer considered to be real and positive, resulting in the inclusion of the phase $\phi$. In some embodiments, this phase of the two-photon pump is varied to implement the CNOT gate. For example, if the phase is adiabatically changes from 0 to $\pi$, then the cat states transform from $|\mathcal{C}_\alpha^\pm\rangle$ to $|\mathcal{C}_{-\alpha}^\pm\rangle = \pm|\mathcal{C}_\alpha^\pm\rangle$. Consequently, rotating the phase of the two-photon pump field by $\pi$ is equivalent to implementing the $\hat{X}$ operator.

In some embodiments, a two-qubit bias-preserving CNOT gate is based on a conditional phase-space rotation of a target qubit based on the state of the control qubit. To show how the conditional rotation results in a CNOT gate, consider two PCOs, each stabilized/pumped with its own two-photon microwave pump field. The initial state of the two qubit system is:

$$|\psi(0)\rangle = (c_0|0\rangle + c_1|1\rangle) \otimes (d_0|0\rangle + d_1|1\rangle)$$
$$= (c_0|0\rangle + c_1|1\rangle) \otimes [(d_0+d_1)|C_\alpha^+\rangle + (d_0-d_1)|C_\alpha^{-1}\rangle],$$

where the first and second terms in the tensor product refer to the control and target qubits, respectively, and the terms $c_i$ and $d_i$ are simply the probability amplitudes for each of the components of the superposition and can be arbitrarily chosen to be any initial state. If the phase of the two-photon drive applied to the target PCO is conditioned on the state of the control PCO, then the state of the system evolves as follows such that any given time t, the state is:

$$|\psi(t)\rangle = c_0|0\rangle \otimes [(d_0+d_1)|C_\alpha^+\rangle + (d_0-d_1)|C_\alpha^-\rangle] +$$
$$c_1|1\rangle \otimes [(d_0+d_1)|C_{\alpha e^{i\phi(t)}}^+\rangle + (d_0-d_1)|C_{\alpha e^{i\phi(t)}}^-\rangle].$$

If the time-varying phase, $\phi(t)$ is such that $\phi(0)=0$ and $\phi(T)=\pi$, then at time T, the state becomes:

$$|\psi(T)\rangle = c_0|0\rangle \otimes \{(d_0+d_1)|C_\alpha^+\rangle + (d_0-d_1)|C_\alpha^-\rangle\} +$$
$$c_1|1\rangle \otimes \{(d_0+d_1)|C_{\alpha e^{i\pi}}^+\rangle + (d_0-d_1)|C_{\alpha e^{i\pi}}^-\rangle\}$$
$$= c_0|0\rangle \otimes \{(d_0+d_1)|C_\alpha^+\rangle + (d_0-d_1)|C_\alpha^-\rangle\} +$$
$$c_1|1\rangle \otimes \{(d_0+d_1)|C_\alpha^+\rangle - (d_0-d_1)|C_\alpha^-\rangle\}$$
$$= c_0|0\rangle \otimes (d_0|0\rangle + d_1|1\rangle) + c_1|1\rangle \otimes (d_0|1\rangle + d_1|0\rangle)$$
$$= \hat{U}_{CX}|\psi(0)\rangle.$$

The above result shows that a CNOT gate is realized by rotating the phase of the cat in the target PCO by $\pi$ conditioned on the state of the control PCO. The CNOT operation is realized because, during this rotation, the $|\mathcal{C}_\alpha^-\rangle$ state acquires a $\pi$ phase relative to the $|\mathcal{C}_\alpha^+\rangle$ state. This acquired phase difference between the two cat states is a topological phase that results from the state $|\mathcal{C}_\alpha^-\rangle$ being $2\pi$ periodic in the phase of $\alpha$, whereas the state $|\mathcal{C}_\alpha^+\rangle$ is $\pi$ periodic in the phase of $\alpha$. The topological phase does not depend on energy like a dynamic phase does. Nor is the topological phase dependent on the geometry of the path, as is the case with a geometric phase. This phase will arise as long as the states $|\pm\alpha\rangle$ move along a loop in phase space that doesn't come too close to the origin (e.g., the size of the cat, $\alpha$, should be large enough that the geometric phase difference between the two cat states is exponentially small and the topology is the only source of the phase difference between the two cat states). If the number of times that the states $|\pm\alpha\rangle$ go around the origin to $\oplus\mp\alpha\rangle$ is given by u, then the phase acquired by $|\pm\alpha\rangle$ is exp(iu$\pi$). In other words, u is the winding number.

It can be shown that, unlike the previously described CNOT gate using the $\hat{X}$ operator, the CNOT gate based on topological phase described above preserves the bias in the noise channel of the qubits. In particular, a phase-flip error occurs in the control PCO during the CNOT gate evolution is equivalent to a phase-flip occurring on the control qubit after an ideal CNOT gate is performed. Similarly, a phase-flip error on the target PCO during the CNOT gate evolution is equivalent to phase-flip errors on the control and target qubits occurring after an ideal CNOT gate. Therefore, according to some embodiments, the CNOT gate does not un-bias the noise channel. This result contrasts with the aforementioned CNOT gate implemented between two strictly two-level qubits and shows one advantage of using a larger Hilbert space (e.g., an oscillator) to perform quantum information processing.

In some embodiments, a particular Hamiltonian is used to implement the time evolution of the state $|\psi(t)\rangle$, described above. In general, it is assumed that the amplitude of the cats in the control PCO, $\alpha$, and the target PCO, $\beta$, are different. The following is the time dependent interaction Hamiltoinian that implements a bias-preserving CNOT gate between two PCOs according to some embodiments:

$$\hat{H}_{CX} \equiv$$
$$-K(\hat{a}_c^{\dagger 2} - \beta^2)(\hat{a}_c^2 - \beta^2) - K\left[\hat{a}_t^{\dagger 2} - \alpha^2 e^{-2i\phi(t)}\left(\frac{\beta - \hat{a}_c^\dagger}{2\beta}\right) - \alpha^2\left(\frac{\beta - \hat{a}_c^\dagger}{2\beta}\right)\right] \times \left[\hat{a}_t^{\dagger 2} - \alpha^2 e^{-2i\phi(t)}\left(\frac{\beta - \hat{a}_c}{2\beta}\right) - \alpha^2\left(\frac{\beta - \hat{a}_c}{2\beta}\right)\right] - \frac{\dot{\phi}(t)}{4\beta}\hat{a}_t^\dagger \hat{a}_t(2\beta - \hat{a}_c^\dagger - \hat{a}_c).$$

In the Hamiltonian $\hat{H}_{CX}$, the first line is the parametrically driven nonlinear oscillator stabilizing the control cat-qubit. The phase of the drive to this oscillator is fixed at $\phi=0$. To understand the other two lines, recall that $\hat{a}_c^\dagger$, $\hat{a}_c \sim \beta \hat{Z}_c \pm i\beta \exp(-2\beta^2)\hat{Y}_c$. Therefore, if the control qubit is in the state $|0\rangle$ in the computational basis (which is approximately equal to $|\beta\rangle$ for large $\beta$) and the exponentially small contribution from the $\hat{Y}_c$ term is ignored, then the CNOT Hamiltonian is simplified to:

$$\hat{H}_{CX}^{|0\rangle_c} \equiv -K(\hat{a}_c^{\dagger 2} - \beta^2)(\hat{a}_c^2 - \beta^2) - K(\hat{a}_t^{\dagger 2} - \alpha^2)(\hat{a}_t^2 - \alpha^2).$$

As a result, when the control qubit is in the state $|0\rangle$, the state of the target oscillator remains unchanged.

On the other hand, if the control qubit is in the state $|1\rangle$ in the computational basis (which is approximately equal to $|-\beta\rangle$ for large $\beta$), then the CNOT Hamiltonian simplifies to:

$$\hat{H}_{CX}^{|1\rangle_c} \equiv$$
$$-K(\hat{a}_2^{\dagger 2} - \beta^2)(\hat{a}_c^2 - \beta^2) - K(\hat{a}_t^{\dagger 2} - \alpha^2 e^{-2i\phi(t)})(\hat{a}_t^2 - \alpha^2 e^{2i\phi(t)}) - \dot{\phi}(t)\hat{a}_t^\dagger \hat{a}_t.$$

The second line of the above expression shows that the cat states $|\mathcal{C}_{\alpha e^{i\phi(t)}}^\pm\rangle$ are the instantaneous eigenstates of the target PCO. As a result, if the phase $\phi(t)$ is changed adiabatically, respecting the limitation $\phi(t) << |\Delta\omega_{gap}|$, then the orientation of the target PCO states follow $\phi(t)$ and $\alpha$ evolves in time to $\alpha e^{i\phi(t)}$. During the rotation in phase space, the target PCO also acquires a geometric phase $\Phi_g^\pm(t)=\phi(t)\alpha^2 r^{\mp 2}$, which is proportional to the area under the phase space path and dependent on the state of the target PCO, where $$r = \frac{N_+}{N_-} \sim 1 - e^{-2\alpha^2}.$$

The difference in the geometric phases acquired by the two cat states $\Phi_g^\pm(t)$ reflects the fact that the mean photon numbers are different for the two cat states and the area of the path followed by $|\mathcal{C}_{\alpha e^{i\phi(t)^-}}\rangle$ in phase space is larger than that followed by $|\mathcal{C}_{\alpha e^{i\phi(t)^+}}\rangle$. In the limit of large $\alpha$, the difference in the two geometric phases decreases exponentially in $\alpha^2$ such that $$\Phi_g^-(t) - \Phi_g^+(t) = \frac{4\phi(t)\alpha^2 e^{-2\alpha^2}}{1 - e^{-4\alpha^2}}.$$

Consequently, for large $\alpha$, the two geometric phases are approximately equal and do not result in a phase difference between the two states. Instead, it is an overall phase shift that results in an additional $Z_c(\Phi_g)$ rotation. This overall phase shift can be accounted for classically in software, or by applying an additional rotation $Z_c(-\Phi_g)$ to undo the additional rotation. Alternatively, this extra rotation may be canceled by the operation of the CNOT gate itself using the additional interaction given by the last term in expression for $\hat{H}_{CX}^{11}$ $^c$ given above. The projection of this last term in the cat state bases is given by:

$$\dot{\phi}(t)\hat{a}_t^\dagger \hat{a}_t = \dot{\phi}(t)\alpha^2 [r^2|\mathcal{C}_{\alpha e^{i\phi(t)}}^+\rangle \langle \mathcal{C}_{\alpha e^{i\phi(t)}}^+| + r^{-2}|\mathcal{C}_{\alpha e^{i\phi(t)}}^-\rangle \langle \mathcal{C}_{\alpha e^{i\phi(t)}}^-|].$$

This term leads to a dynamic phase that exactly cancels out the geometric phase. Thus, the CNOT Hamiltonian results in a two-qubit evolution that implements a bias-preserving CNOT gate.

In some embodiments, the physical realization of the bias-preserving CNOT gate using three-wave mixing between two oscillators. The natural coupling between two oscillators is a beam splitter coupling. Thus, in some embodiments, the oscillators are themselves fourth-order, Kerr nonlinear. As such, the three-wave mixing can be generated by parametrically driving the target oscillator at a frequency $\omega_d = 2\omega_t - \omega_c$, where $\omega_t$ and $\omega_c$ are the frequencies of the target and control oxillators, respectively. Under such a driving field, the fourth order nonlinearity converts a photon in the drive field and a photon in the control oscillator to two photons in the target oscillator. Thereby, an effective three-wave mixing is realized between the control and target oscillators. In some embodiments, the Kerr nonlinearity of the oscillators themselves is sufficient to realize the CNOT interaction Hamiltonian and no additional coupling elements are necessary. Moreover, because of the parametric nature of the interaction, the coupling is controllable.

Figure 13:
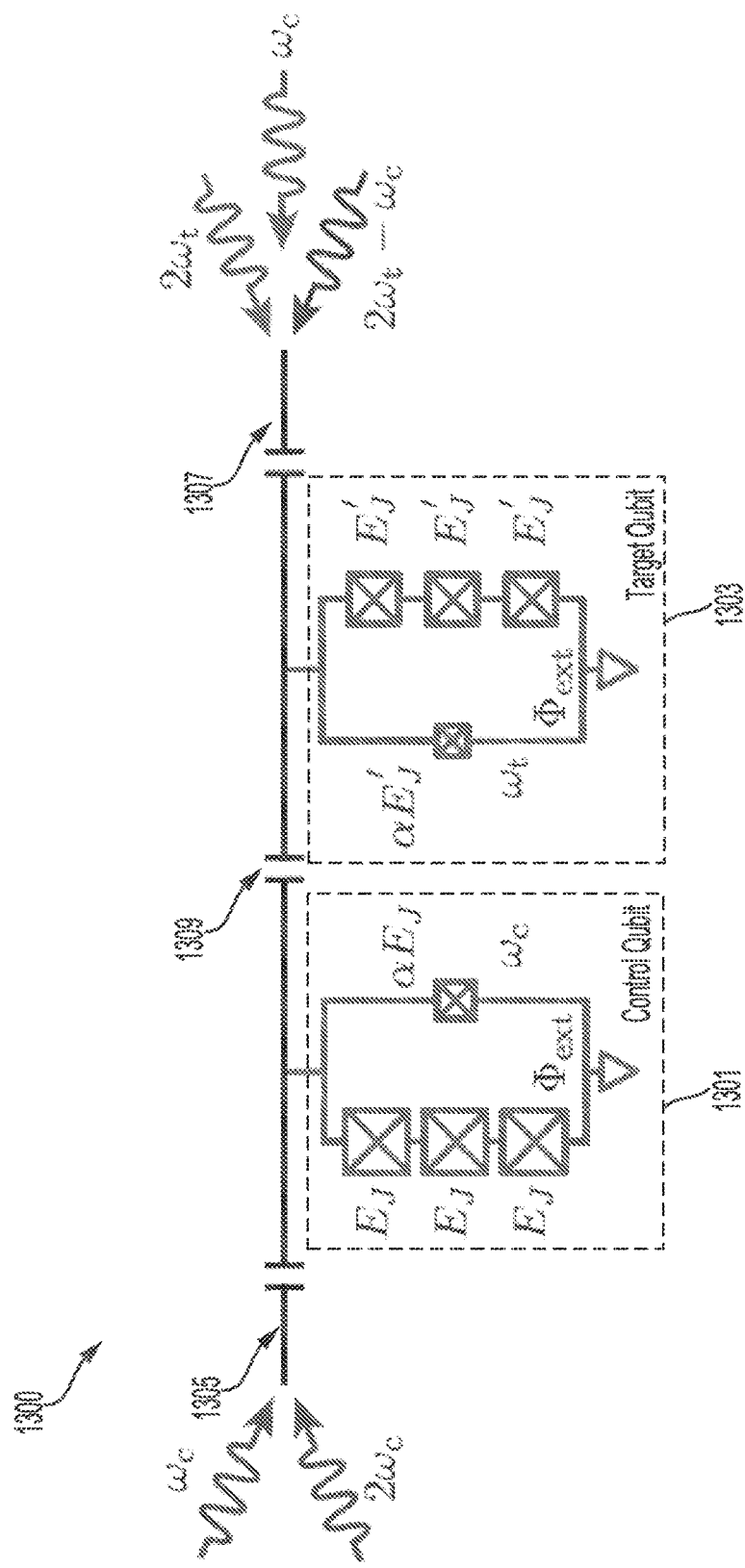
FIG. 13 is a schematic of a quantum information processing system, according to some embodiments.

FIG. 13 is a schematic of a quantum information processing device 1300 configured to implement a bias-preserving CNOT gate, according to some embodiments. FIG. 13 provides additional detail about the driving fields than are provided in, e.g., the block diagrams of FIG. 1 and FIG. 2. The schematic of FIG. 13 is a circuit diagram equivalent of the quantum information processing device 1300. The physical system, in some embodiments, is implemented as discussed in connection with FIGS. 1-5 above.

The quantum information processing device 1300 includes a control qubit 1301 and a target qubit 1303. In some embodiments, the qubits 1301 and 1303 are a Kerr nonlinear cavity. The nonlinearity of the cavity may be controlled using a superconducting circuit element, such as a transmon or a SNAIL, as described above. In the example shown in FIG. 13, both the control qubit 1301 and the target qubit 1303 include a SNAIL. The SNAIL of the control qubit 1301 has a resonance frequency of $\omega_c$ and the SNAIL of the target qubit 1303 has a resonance frequency of $\omega_t$. In some embodiments, the SNAILs are biased with an external magnetic field to engineer three- and/or four-wave mixing interactions between the control qubit 1301 and the target qubit 1303. Using this engineered interaction, a two-photon driven Kerr nonlinear oscillator results and may be used to create a PCO with a biased noise channel.

The control qubit 1301 and the target qubit 1303 are capacitively coupled to one another, as illustrated by the capacitor 1309. Microwave fields may be coupled to the control qubit 1301 via an input port 1305 and microwave fields may be coupled to the target qubit 1303 via an input port 1307. Microwave fields may be received from the microwave field generator 150, discussed in connection with FIG. 1. In some embodiments, microwave fields of more than one frequency may be applied to a given input port at one time.

To conditionally rotate the state of the target PCO in phase space based on the state of the control PCO, the CNOT Hamiltonian $\hat{H}_{CX}$ described above is implemented. Expanding the terms of the CNOT Hamiltonian can help understand what driving fields are needed to implement this Hamiltonian. The expanded CNOT Hamiltonian may be written as:

$$\hat{H}_{CX}=-K\hat{a}_c^{\dagger 2}\hat{a}_c^2-K\hat{a}_t^{\dagger 2}\hat{a}_t^2+K\beta^2(\hat{a}_c^{\dagger 2}+h\cdot c.)+K\alpha^2\cos(\phi(t))(e^{i\phi(t)}\hat{a}_t^{\dagger 2}+h\cdot c.)-(K\alpha^2\sin(\phi(t))/\beta)(i\hat{a}_t^{\dagger 2}\hat{a}_c+h\cdot c.)+(K\alpha^4/2\beta)\sin(2\phi(t))(i\hat{a}_c^\dagger+h\cdot c.)-(K\alpha^4\sin^2(\phi(t))/\beta^2)\hat{a}_c^\dagger\hat{a}_c-\dot{\phi}(t)\hat{a}_t^{\dagger \hat{a}}/2+(\dot{\phi}(t)/4\beta))\hat{a}_t^\dagger\hat{a}_t(\hat{a}_c^\dagger+h\cdot c.)$$

This expression can be further simplified by transforming the Hamiltonian into a rotating frame in which the frequencies of the two PCOs are both zero as:

$$\hat{H}'_{CX}=-K\hat{a}_c^{\dagger 2}\hat{a}_c^2-K\hat{a}_t^{\dagger 2}\hat{a}_t^2+K\beta^2(\hat{a}_c^{\dagger 2}e^{-2i\theta(t)}+h\cdot c.)+K\alpha^2\cos(2\phi(t))(\hat{a}_t^{\dagger 2}+h\cdot c.)-(K\alpha^2/\beta)\sin(\phi(t))(i\hat{a}_t^{\dagger 2}\hat{a}_c e^{i\theta(t)-\phi(t)}+h\cdot c.)+(K\alpha^4/2\beta)\sin(2\phi(t))(i\hat{a}_c^\dagger e^{-i\theta}+h\cdot c.)+(\dot{\phi}(t)/4\beta)\hat{a}_t^\dagger\hat{a}_t(\hat{a}_c^\dagger e^{-i\theta(t)}+h\cdot c.)$$

where $$\theta(t) = \int_0^t \left(\frac{K\alpha^4}{\beta^2}\right)\sin^2(\phi(s))ds.$$

In this form, it becomes clear how the Hamiltonian can be parametrically engineered using for-wave mixing based on the Kerr-nonlinearity and driving fields. For example, in embodiments where a PCO is realized using a SNAIL, the terms proportional to $\hat{a}_i^{\dagger 2}$ and $\hat{a}_i^2$, where i=c, t labels the control (c) and target (t) qubits, are realized using three-wave mixing and the terms proportional to $\hat{a}_t^{\dagger 2}\hat{a}_c$, $\hat{a}_c^{\dagger 2}\hat{a}_t$, $\hat{a}_t^\dagger\hat{a}_c\hat{a}_c^\dagger$, and $\hat{a}_t^\dagger\hat{a}_t\hat{a}_c$ are realized using four-wave mixing. Terms proportional to $\hat{a}_c$ and $\hat{a}_c^\dagger$ do not require a nonlinearity and are realized by simply applying a drive field to the control qubit. Additionally, $\phi(t)$ is a phase shift that changes over time and adiabatically increases from 0 to $\pi$ in the time T. Using all of the above information, the CNOT Hamiltonian can be expressed in terms of microwave field amplitudes and phases as:

$$\hat{H}'_{CX} = -K\hat{a}_c^{\dagger 2}\hat{a}_c^2 - K\hat{a}_t^{\dagger 2}\hat{a}_t^2 + A_1(\hat{a}_c^{\dagger 2}e^{i\Phi_1(t)} + h \cdot c.) + A_2(\hat{a}_t^{\dagger 2}e^{i\Phi_2(t)} + h \cdot c.) + A_3(\hat{a}_t^2\hat{a}_c e^{i\Phi_3} + h \cdot c.) + A_4(\hat{a}_c^\dagger e^{i\Phi_4(t)} + h \cdot c.) + A_5\hat{a}_t^\dagger(\hat{a}_c^\dagger e^{i\Phi_5} + h \cdot c.),$$

where the field amplitudes, $A_i$, are assumed to be positive. The driving microwave fields corresponding to the amplitudes $A_1$, $A_2$, $A_3$, $A_4$, and $A_5$ are applied at the frequencies $2\omega_c$, $2\omega_t$, $2\omega_t-\omega_c$, $\omega_c$, and $\omega_c$, respectively.

In some embodiments, a particular sequence of fields is applied to the control qubit 1301 and/or the target qubit 1303 during an interaction time duration T. It is during this interaction time that the execution of the CNOT gate is performed. In some embodiments, during the times outside of this interaction time duration, the amplitudes and phases take on the following fixed values: $A_1=K\beta^2$, $\Phi_1=0$, $A_2=K\alpha^2$, $\Phi_2=0$, $A_3=A_4=A_5=\Phi_3=\Phi_4=\Phi_5=0$. During the CNOT interaction time, the phases $\Phi_i(t)$ are time-varying and change from a value of 0 to $\pi$. The value of the phases between 0 and T may change in any way, as long as the changes are adiabatic. In some embodiments, the phases change linearly. For example, $\Phi_i(t)=\pi t/T$.

Figure 14A:
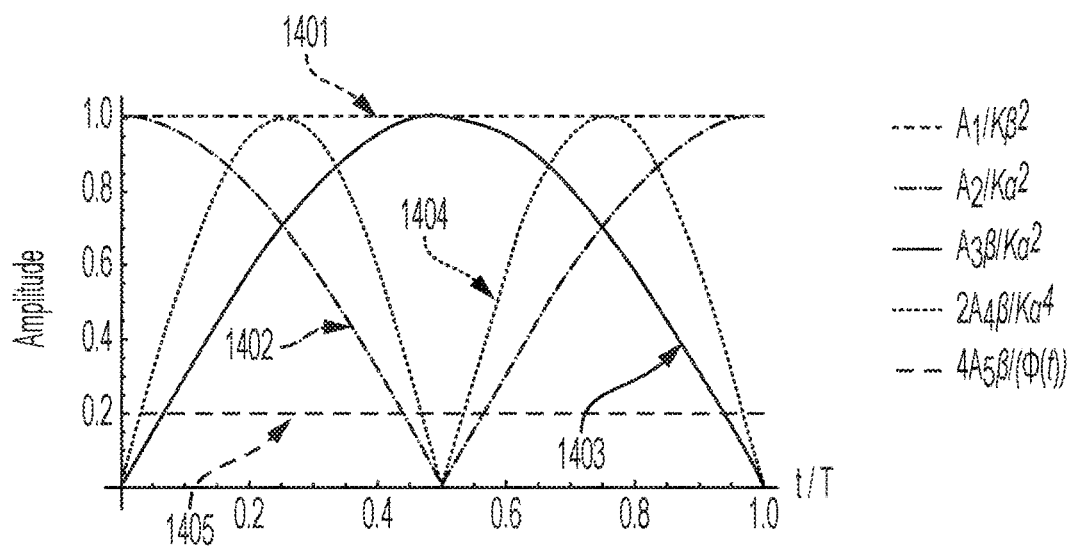
FIG. 14A is a plot of the amplitude as a function of time of multiple driving fields used to implement a bias-preserving CNOT gate, according to some embodiments.
Figure 14B:
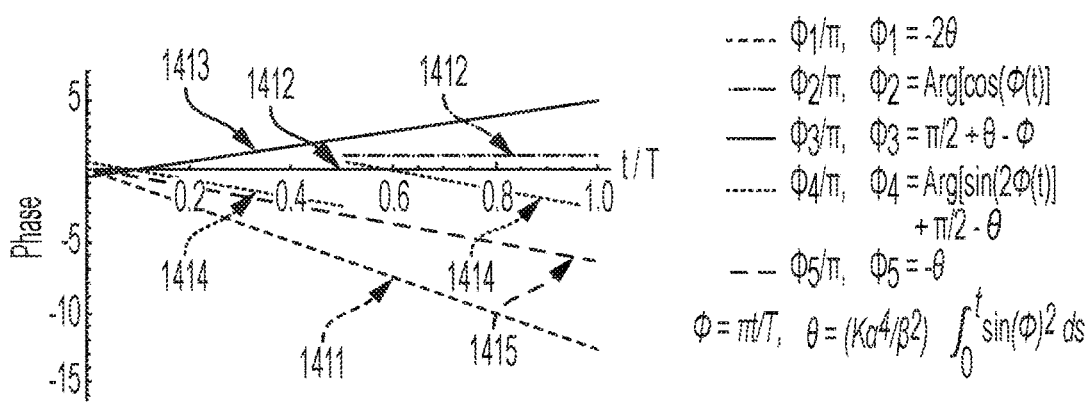
FIG. 14B is a plot of the phases as a function of time of multiple driving fields used to implement a bias-preserving CNOT gate, according to some embodiments.

FIG. 14A is a plot of the amplitude as a function of time of the five driving fields used to implement the CNOT gate, according to some embodiments, and FIG. 14B is a plot of the time-dependent phases as a function of time for the five driving fields used to implement the CNOT gate.

First, a first microwave field is applied to the control cavity at a frequency $2\omega_c$ with a fixed amplitude $A_1$ and a time-dependent phase $\Phi_1(t)$. This first microwave field provide the two-photon term to drive the control cavity via three-wave mixing. The fixed amplitude $A_1$ is illustrated by line 1401 in FIG. 14A and the time-dependent phase $\Phi_1(t)$ is illustrated by line 1411 in FIG. 14B. In the example shown, the phase decreases linearly.

Next, a second microwave field is applied to the target cavity at a frequency $2\omega_t$ with a time-dependent amplitude $A_2$ and a time dependent-phase $\omega_2(t)$. This second microwave field provides the two-photon term to drive the target cavity via three-wave mixing. The changing amplitude $A_2$ is illustrated by line 1402 in FIG. 14A and the time-dependent phase $\Phi_2(t)$ is illustrated by line 1412 in FIG. 14B. The amplitude changes sinusoidally over time. In the example shown, the phase is constant at a first phase value during a first portion of the gate time duration and constant at a second phase value during a second portion of the gate time duration, wherein the first phase value is less than the second phase value. This is because the amplitudes are always taken to be positive. When the amplitude $A_2$, which is a sine function, crosses the zero amplitude point, rather than going negative, the amplitude begins to increase again, and the phase takes on a different value instead.

A third microwave field at a frequency $2\omega_t-\omega_c$ is applied to the target cavity with a time-dependent amplitude $A_3$ and a time-dependent phase $\Phi_3(t)$. This third microwave field realizes the coupling terms proportional to $\hat{a}_t^{\dagger 2}\hat{a}_c$ in the CNOT Hamiltonian. The changing amplitude $A_3$ is illustrated by line 1403 in FIG. 14A and the time-dependent phase $\Phi_3(t)$ is illustrated by line 1413 in FIG. 14B. The amplitude changes as a cosine over time. In the example shown, the phase increases linearly as a function of time.

A fourth microwave field at a frequency $\omega_c$ is applied to the control cavity at a with a time-dependent amplitude $A_4$ and a time-dependent phase $\Phi_4(t)$. This fourth microwave field realizes the single-photon drive of the control cavity. The changing amplitude $A_4$ is illustrated by line 1404 in FIG. 14A and the time-dependent phase $\Phi_4(t)$ is illustrated by line 1414 in FIG. 14B. The amplitude changes as a cosine over time. In the example shown, the phase decreases linearly during the first portion of the gate time duration and decreases linearly during the second portion of the gate time duration. The linear decrease has the same slope in both portions of the gate time duration, but there is a jump in the phase half way through the gate time duration. This is because the amplitudes are always taken to be positive. When the amplitude $A_4$, which is a cosine, crosses the zero amplitude point, rather than going negative the amplitude begins to increase again and the phase jumps to a different value instead.

Finally, a fifth microwave field is applied to the target cavity at a frequency $\omega_c$ with a fixed amplitude $A_5$ and a time-dependent phase $\Phi_5(t)$. This fifth microwave field realizes the final term in the CNOT Hamiltonian. The fixed amplitude $A_5$ is illustrated by line 1405 in FIG. 14A and the time-dependent phase $\Phi_5(t)$ is illustrated by line 1415 in FIG. 14B. In the example shown, the phase decreases linearly.

Error-Correction Code Tailored to Biased Noise

The inventors have recognized and appreciated that aspects of the stabilizer measurement scheme described above may be used to efficiently implement an error-correction code tailored to the biased noise because the measurement scheme preserves the noise bias. Above, the preparation of cat states in data qubits and ancilla qubits is described. Quantum gates such as Z-axis rotations and $ZZ(\theta)$ gates are also described above. In addition, measurements along the Z-axis can be performed, for example, using homodyne detection using the techniques above. Measurements along the X-axis can be performed using additional gates and ancilla. The inventors have recognized and appreciated that these state preparation techniques, quantum gates, and detections can be combined with the bias preserving CNOT gate between the two cat-qubits to implement universal fault-tolerant quantum computation. Accordingly, some embodiments use the bias-preserving set of operations $\{CNOT, Z(\theta), ZZ(\theta), \mathcal{P}_{|\pm\rangle}, \mathcal{M}_{\hat{X}}, \mathcal{M}_{\hat{Z}}\}$ to implement efficient and compact circuits for fault-tolerant error correction based on concatenation, where $\mathcal{P}_{|\pm\rangle}$ is the preparation of the cat states $|\mathcal{C}_\alpha^\pm\rangle$, $\mathcal{M}_{\hat{X}}$ is a measurement along the X-axis, and $\mathcal{M}_{\hat{Z}}$ is a measurement along the Z-axis.

In some embodiments, the biased-noise qubits are encoded in a repetition code $\mathcal{C}_1$ and corrections are made for the dominant error types (e.g., phase flip errors). A repetition code with n qubits can correct for $(n-1)/2$ phase flip errors. In some embodiments, the codewords are $|0\rangle_L = (|+\rangle_L + |-\rangle_L)/\sqrt{2}$ and $|1\rangle_L = (|+\rangle_L - |-\rangle_L)/\sqrt{2}$, where $|+\rangle_L = |\mathcal{C}_\alpha^+\rangle |\mathcal{C}_\alpha^\pm\rangle |\mathcal{C}_\alpha^+\rangle \ldots$ and $|-\rangle_L = |\mathcal{C}_\alpha^-\rangle |\mathcal{C}_\alpha^-\rangle |\mathcal{C}_\alpha^-\rangle \ldots$, where there are n cat states per codeword state. The result of this first encoding is a more symmetric noise channel with reduced noise strength. In some embodiments, the repetition code with errors below a threshold may then be concatenated to a CSS code $\mathcal{C}_2$ to further reduce errors.

Figure 15:
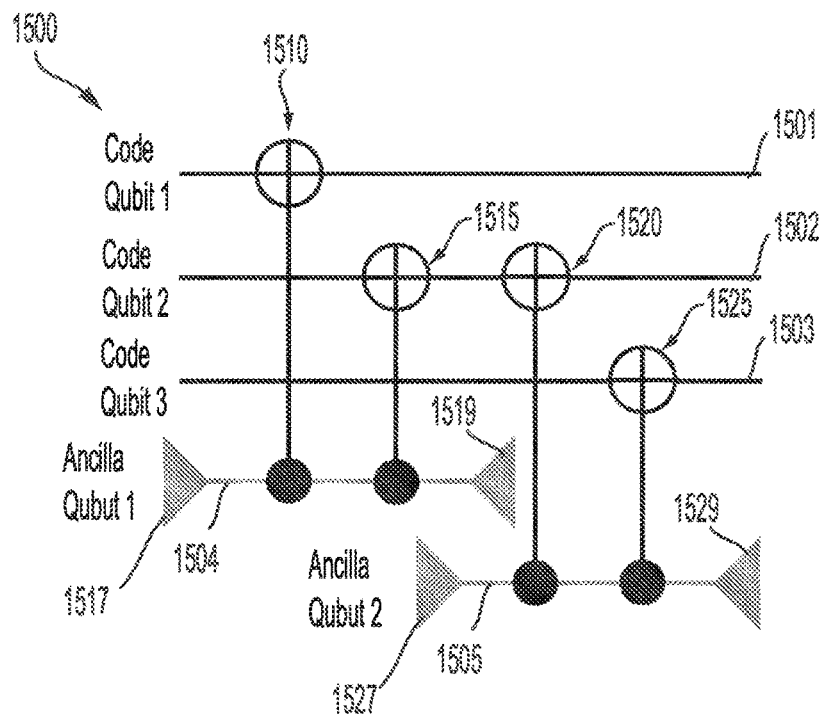
FIG. 15 is a quantum circuit diagram of a technique for detecting errors, according to some embodiments.

The $n-1$ stabilizer generators for the repetition code are $\hat{X}_1 \otimes \hat{X}_2 \otimes \hat{I}_3 \otimes \hat{I}_4 \ldots$, $\hat{I}_1 \otimes \hat{X}_2 \otimes \hat{X}_3 \otimes \hat{I}_4 \ldots$, etc. In some embodiments, the most naive way to detect errors is used, which is to measure each stabilizer generator using an ancilla. Such a technique is shown by the quantum circuit diagram 1500 of FIG. 15. The horizontal lines 1501-1503 represent the code qubits and the horizontal lines 1504-1505 represent the ancilla qubits in an example where n=3.

Each ancilla 1504-1505 is initialized in the state $|e_\alpha^+\rangle$, as illustrated by the triangles 1517 and 1527. Then two CNOT gates 1510 and 1515 are implemented between the first ancilla qubit 1504 and the first two code qubits 1501 and 1502, and two CNOT gates 1520 and 1525 are implemented between the second ancilla qubit 1505 and the second two code qubits 1502 and 1503. Finally, the ancilla qubits 1504-1505 are measured along the X axis, as represented by the triangles 1519 and 1529. Some embodiments, to be fault-tolerant, measure each of the stabilizer generator r times and the syndrome bit is determined with a majority vote on the measurement outcomes. A syndrome bit is incorrect if m≥(r+1)/2 of the measurements are faulty.

This decoding scheme is equivalent to constructing an r-bit repetition code for each of the (n−1) stabilizer generators of the repetition code. Thus, each bit of syndrome from the inner code is itself encoded in an [r, 1, r] repetition code so that decoding can proceed by first decoding the syndrome bits and then decoding the resulting syndrome. This naive way to decode the syndrome results in a simple analytic expression for the logical error rates. However, the inventors have recognized and appreciated that this naive decoding may not be the preferred approach to decode and, in some embodiments, the two-stage decoder of FIG. 15 can be replaced by a decoder that directly infers the most likely error on the n-qubit repetition code given s measured syndrome bits. Accordingly, in some embodiments, the notion of a measurement code is introduced that exploits the above insights to improve on the naive scheme by constructing a block code that can directly correct the bit-flip errors on the n data qubits in a single decoding step.

In some embodiments, to construct a measurement code the syndrome measurement procedure measures a total of s elements of the stabilizer group (not necessarily the specified generators) by coupling to ancilla qubits and corrects any t=(d−1)/2 phase-flip errors on the n qubits. Thus, there is a classical code with parameters [n+2, n, d]. However, not every classical code with those parameters is admissible, because the classical parity checks should be compatible with the stabilizers of the original quantum code, in this example the repetition code. In particular, each parity check in the measurement code should have even weight when restricted to the data qubits so that it commutes with the logical $\hat{Z}_L$ operator of the quantum phase-flip code. In some embodiments, consistency with the stabilizer group of the base quantum code is the only constraint on a measurement code.

The general form of a measurement code can be specified by the parity check matrix $H_M$. This in turn is specified as a function of the (generally redundant) parity checks $H_Z$ of the quantum repetition code and an additional set of s ancilla bits that label the measurements. Given $H_Z$, the parity check matrix of the measurement code is the block matrix $H_M=(H_Z\ I_S)$, where $I_S$ is the s×s identity matrix. Since there are s ancilla bits for readout, $H_M$ is an s×(n+s) matrix. In some embodiments, the rows of the $H_Z$ have even weight because the rows come from the stabilizers of a quantum repetition code. The rows are linearly independent, making the associated code have parameters [n+s, n, d] for some d≤n. The distance is never greater than n since a string of $\hat{Z}$ operators on the data qubits, corresponding to 1's on exactly the first n bits, is always in the kernel of $H_M$.

The measurement of the j-th parity check in the measurement code can be done by a standard choice of circuit. In some embodiments, a CNOT gate is applied to the i-th qubit if there is a 1 in the i-th column, and target the ancilla labeled in column n+j. Note that by construction there is a 1 in position (j; n+j) of $H_M$. The effective error rate of this bare-ancilla measurement gadget depends on the number of CNOT gates used, and hence on the weight of the stabilizer being measured. Therefore, all other things (such as code distance) being equal, lower weight rows are preferred when designing a measurement code. The two examples considered here are generated from the following choices for $H_Z$, displayed here in transpose to save space:

$$H_Z^T = \begin{pmatrix} 1 & 1 & 0 \\ 1 & 0 & 1 \\ 0 & 1 & 1 \end{pmatrix},$$

$$H_Z^T = \begin{pmatrix} 1 & 0 & 0 & 0 & 1 & 1 & 0 & 0 & 1 \\ 1 & 1 & 0 & 0 & 0 & 0 & 1 & 1 & 0 \\ 0 & 1 & 1 & 0 & 0 & 1 & 0 & 1 & 0 \\ 0 & 0 & 1 & 1 & 0 & 0 & 0 & 1 & 1 \\ 0 & 0 & 0 & 1 & 1 & 0 & 1 & 1 & 0 \end{pmatrix}.$$

These example codes saturate the distance bound, such that d=n for each code (e.g., d=3 and d=5, respectively). In contrast, the measurement code associated with repeating the measurements of the standard generators r times for n=r=3, is:

$$H_Z^T = \begin{pmatrix} 1 & 1 & 1 & 0 & 0 & 0 \\ 1 & 1 & 1 & 1 & 1 & 1 \\ 0 & 0 & 0 & 1 & 1 & 1 \end{pmatrix}.$$

Both this choice and the 3×3 choice above have distance d=3 as measurement codes. However, the 3×3 choice above corresponds to a [6, 3, 3] measurement code whereas the naive repeated generator method yields a [12, 3, 3] measurement code. In general, the naive scheme yields an $[n_{(n-1)r}, n, d(n, r)]$ code, and for smaller r the distance will not yet saturate to n. For the n=5 case, r must equal 2 before the measurement code has a distance 3, and r=4 before the distance saturates at d=5. Thus, the naive scheme yields either a [13, 5, 3] code or a [21, 5, 5] code, which are inferior in either distance or rate respectively to the [14, 5, 5] code that results from the choice. These examples also illustrate a counterintuitive feature of measurement codes, according to some embodiments. Consider again the naïve repeated generator method with n=5 and r=2 or 4. If the decoder works by first decoding the syndrome bits individually, then the data are only protected against at most (r−1)/2=0 or 1 arbitrary errors respectively. However, a decoder that uses the structure of the associated measurement code can correct 1 or 2 arbitrary data errors with these respective parameters, which then reduces the leading order behavior of the code failure probability.

Both of the two example codes above are small enough that the exact probability of a decoding failure can be computed via an exhaustive lookup table. To demonstrate the advantage of the measurement code over naive encoding and decoding, we estimate the probability of a logical error in the CNOT-gadget using the measurement code in the second example above for n=5. The corresponding threshold is ~6×10⁻³. On the other hand, to reach a similar threshold using the naive decoder requires n=11, r=5. Thus, in some embodiments, the decoder requires fewer resources than the naive decoder. In general an optimal (maximum likelihood) decoder is infeasible to implement because it requires exponential resources in n and s to compute, so substantially larger codes will need decoding heuristics such as message passing algorithms to approach peak decoding performance. In some embodiments, the decoder declares failure whenever the data error is not guessed exactly right, even though this is not necessary. When repeated rounds of error correction occur, it is sufficient to define success as reducing the weight of any correctable error.

Methods of Performing QIP

Figure 16:
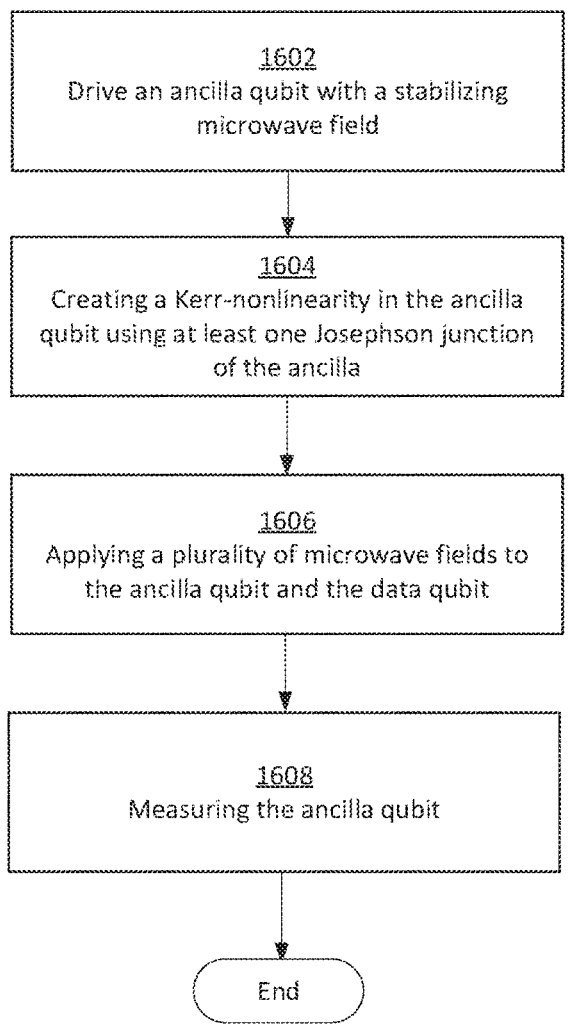
FIG. 16 is a flowchart of a quantum information processing method, according to some embodiments.

Various methods of performing QIP are discussed above in connection with measuring error syndromes and performing bias-preserving gates. FIG. 16 is a flowchart of a method 1600 of performing QIP that applies generally to most of the embodiments described above that use a data qubit coupled to an ancilla qubit. In some embodiments, the physical realization of the data qubit and the ancilla qubit may be any of the physical systems described above.

At act 1602, the method 1600 includes driving an ancilla qubit with a stabilizing field. In some embodiments, the stabilizing field generates the asymmetry in the error channel of an ancilla qubit that is exploited to measure error syndromes and perform bias-preserving quantum gates. The stabilizing field may be applied to the ancilla qubit using the microwave field generator 160.

At act 1604, the method 1600 includes creating a Kerr-nonlinearity in the ancilla qubit using at least one Josephson junction of the ancilla. In some embodiments, coupling a superconducting circuit element to a cavity creates the Kerr-nonlinearity. For example, a transmon or a SNAIL may be located in a 3D cavity to create a Kerr-nonlinear cavity.

At act 1606, the method 1600 includes applying a plurality of microwave fields to the ancilla qubit and the data qubit. In some embodiments, these microwave fields may be applied to create pumped cat states in the Kerr-nonlinear cavity. In some embodiments, the microwave fields may be applied to perform rotation on the states of the data qubit or the ancilla qubit. In some embodiments, the microwave fields may be applied to perform conditional gates, such as conditional rotations, on one qubit based on the state of another qubit. In some embodiments, the microwave fields may be applied to couple the ancilla qubit to the data qubit or to couple the ancilla qubit to a readout cavity. Or, as discussed above, any number of operations may be performed by applying microwave fields to the data qubit and/or the ancilla qubit.

At act 1608, the method includes measuring the ancilla qubit. As discussed above, the ancilla qubit may be measured directly by, e.g., performing homodyne detection of a cavity of the ancilla qubit. Alternatively, the ancilla qubit may be measured by coupling the ancilla qubit to a readout cavity, conditionally displacing the state of the readout cavity based on the state of the ancilla qubit, and then measuring the state of the readout cavity. In some embodiments, the measurement of the ancilla is a QND measurement.

Figure 17:
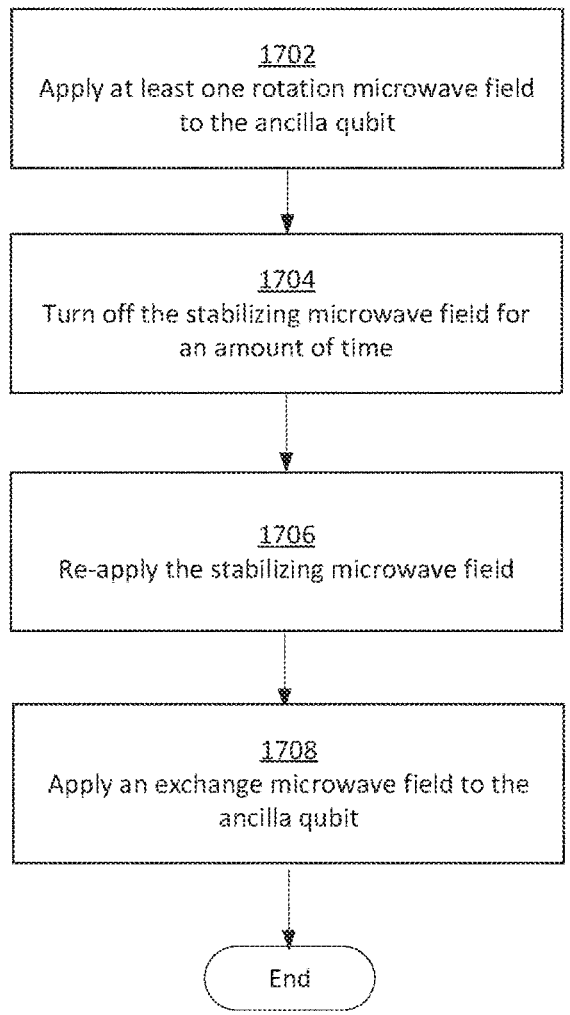
FIG. 17 is a flowchart of a readout method, according to some embodiments.

FIG. 17 is a flowchart of a method 1700 for performing readout of an ancilla qubit, according to some embodiments. In some embodiments, the method 1700 may be used to measure a property of a data qubit that is coupled to the ancilla qubit. In some embodiments, the method 1700 may implement a QND measurement.

At act 1702, the method 1700 includes applying at least one rotation microwave field to the ancilla qubit. In some embodiments, the rotation may be about the Z-axis of a Bloch sphere associated with the ancilla qubit. In some embodiments, the rotation may rotate cat states from $|C_\beta^\pm\rangle$ to $|C_\beta^+\rangle \pm i|C_\beta^-\rangle)/\sqrt{2}$.

At act 1704, the method 1700 includes turning off a stabilizing microwave field for an amount of time. In some embodiments, this allows the ancilla qubit to freely evolve. In some embodiments, the ancilla qubit may include a Kerr-nonlinear cavity and the state of the ancilla qubit may freely evolve under the Kerr-nonlinear Hamiltonian. In some embodiments, the free evolution of the ancilla qubit results in a rotation of the state of the ancilla qubit that could not be performed if the stabilizing field was still applied to the ancilla qubit.

At act 1706, the method 1700 includes re-applying the stabilizing microwave field to the ancilla qubit. In some embodiments, re-applying the stabilizing microwave field stops the free evolution of the state of the ancilla. In some embodiments, re-applying the stabilizing microwave field keeps the state of the ancilla in one of two coherent states. In some embodiments, re-applying the stabilizing field suppresses a particular type of error such that the error channel of the ancilla qubit is asymmetric. For example, the stabilizing field may suppress bit-flip errors.

At act 1708, the method 1700 includes applying an exchange microwave field to the ancilla qubit. In some embodiments, the exchange microwave field creates an interaction between the ancilla qubit and a readout cavity. In some embodiments, applying the exchange microwave field creates a three- or four-wave mixing interaction. In some embodiments, applying the exchange microwave field causes a Q-switch operation.

Other Considerations

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

As used herein in the specification and in the claims, the phrase "equal" or "the same" in reference to two values (e.g., distances, widths, etc.) means that two values are the same within manufacturing tolerances. Thus, two values being equal, or the same, may mean that the two values are different from one another by ±5%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A quantum information processing (QIP) system comprising:
    a data qubit;
    an ancilla qubit with an asymmetric error channel, the data qubit coupled to the ancilla qubit; and
    a measurement device configured to measure a property of the data qubit using the ancilla qubit using a quantum non-demolition measurement, the measurement device comprising:
        a readout cavity coupled to the ancilla qubit; and
        a cavity state detector configured to measure a state of the readout cavity, wherein the cavity state detector comprises a phase-sensitive detector.

2. The QIP system according to claim 1, wherein using the quantum non-demolition measurement comprises:
    causing the data qubit and the ancilla qubit to interact such that the state of the ancilla qubit is based on the property of the data qubit; and
    measuring the state of the ancilla qubit to determine the state of the data qubit.

3. The QIP system according to claim 2, wherein the measurement device is configured to suppress errors of a first type in the ancilla qubit by repeatedly performing the quantum non-demolition measurement.

4. The QIP system according to claim 2, wherein the phase-sensitive detector comprises a homodyne detector.

5. The QIP system according to claim 1, further comprising a microwave field source configured to apply a stabilizing microwave field to the ancilla qubit to create the asymmetric error channel.

6. A quantum information processing (QIP) system comprising:
    a data qubit;
    an ancilla qubit with an asymmetric error channel, the data qubit coupled to the ancilla qubit;
    a measurement device configured to measure a property of the data qubit using the ancilla qubit using a quantum non-demolition measurement; and
    a microwave field source configured to cause the data qubit and the ancilla qubit to interact such that a z-component of a state of the ancilla qubit is based on the property of the data qubit.

7. The QIP system according to claim 6, wherein:
    the ancilla qubit is an ancilla superconducting nonlinear asymmetric inductive element (SNAIL) with a resonance frequency; and
    the microwave field source is configured to apply a pump microwave field to the ancilla SNAIL at a pump frequency that is twice the resonance frequency of the SNAIL.

8. The QIP system according to claim 7, wherein the microwave field source is configured to:
    apply at least one initialization microwave field to the ancilla qubit to initialize the ancilla qubit in a cat state along an x-axis of a Bloch sphere; and
    apply at least one drive microwave field to at least one of the data qubit and the ancilla qubit to create an interaction between the data qubit and the ancilla qubit.

9. The QIP system according to claim 8, wherein the microwave field source is configured to apply the at least one initialization microwave field to the ancilla qubit by adiabatically increasing an amplitude of a pump microwave field of the ancilla SNAIL, prepared in a vacuum state, from 0 to a pump amplitude value equal to $K|\alpha|^2$, where K is a strength of a Kerr nonlinearity of the ancilla SNAIL and a is a coherent state amplitude associated with the cat state.

10. The QIP system according to claim 7, wherein:
    the data qubit is a transmon;
    the property of the data qubit is $\sigma_z$ of the transmon; and
    the microwave field source is further configured to apply a drive microwave field to the transmon at the resonance frequency of the SNAIL and in phase with the pump microwave field to cause the data qubit and the ancilla qubit to interact such that a z-component of the state of the ancilla qubit is dependent on a z-Pauli operator, $\sigma_z$, of the data qubit.

11. The QIP system according to claim 7, wherein:
the data qubit comprises a cat state in a linear oscillator;
the property of the data qubit is a photon number parity of the cat state; and
the microwave field source is further configured to apply a drive microwave field to the cat state in the linear oscillator at the resonance frequency of the SNAIL and in phase with the pump microwave field to cause the data qubit and the ancilla qubit to interact such that a z-component of the state of the ancilla qubit is dependent on the photon number parity of the data qubit.

12. The QIP system according to claim 7, wherein:
the data qubit comprises a Gottesman-Kitaev-Preskill (GKP) state in a linear oscillator;
the property of the data qubit is a stabilizer of the GKP state; and
the microwave field source is further configured to apply a drive microwave field to the ancilla SNAIL at a drive frequency equal to a difference between the resonance frequency of the SNAIL and a resonance frequency of the linear oscillator to cause the data qubit and the ancilla qubit to interact such that a z-component of the state of the ancilla qubit is dependent on the stabilizer of the GKP state of the data qubit.

13. A method of performing quantum information processing (QIP) in a system comprising a data qubit coupled to an ancilla qubit, the method comprising:
driving the ancilla qubit with a stabilizing microwave field to create an asymmetric error channel, and
measuring a property of the data qubit using the ancilla qubit by performing a quantum non-demolition measurement, wherein performing the quantum non-demolition measurement comprises:
causing the data qubit and the ancilla qubit to interact such that a state of the ancilla qubit is based on the property of the data qubit; and
measuring the state of the ancilla qubit to determine the state of the data qubit.

14. The method according to claim 13, further comprising causing the data qubit and the ancilla qubit to interact such that a z-component of the state of the ancilla qubit is based on the property of the data qubit, wherein:
the ancilla qubit is an ancilla superconducting nonlinear asymmetric inductive element (SNAIL) with a resonance frequency; and
causing the data qubit and the ancilla qubit to interact comprises applying a pump microwave field to the ancilla SNAIL at a pump frequency that is twice the resonance frequency of the SNAIL.

15. The method according to claim 14, further comprising:
applying at least one initialization microwave field to the ancilla qubit to initialize the ancilla qubit in a cat state along an x-axis of a Bloch sphere; and
applying at least one drive microwave field to at least one of the data qubit and the ancilla qubit to create an interaction between the data qubit and the ancilla qubit.

16. The method according to claim 15, wherein applying the at least one initialization microwave field to the ancilla qubit comprises adiabatically increasing an amplitude of a pump microwave field of the ancilla SNAIL, prepared in a vacuum state, from 0 to a pump amplitude value equal to $K|\alpha|^2$, where K is a strength of a Kerr nonlinearity of the ancilla SNAIL and a is a coherent state amplitude associated with the cat state.

17. The method according to claim 13, further comprising implementing a quantum data gate between the data qubit and the ancilla qubit.

18. The method according to claim 17, wherein the quantum data gate is a CNOT gate, the data qubit is a target qubit of the CNOT gate, and the ancilla qubit is a control qubit of the CNOT gate, and wherein the control qubit comprises a first cat state and the target qubit comprises a second cat state.

19. The method according to claim 18, further comprising rotating the first cat state in phase space to implement the CNOT gate.

20. The method of claim 18, further comprising applying, over a gate time duration, a plurality of microwave fields to the data qubit and the ancilla qubit to implement the CNOT gate.

21. The method according to claim 20, further comprising:
applying a first microwave field with a frequency $2\omega_c$ to the control qubit, wherein $\omega_c$ is a resonance frequency of the control qubit;
applying a second microwave field with a frequency $2\omega_t$ to the target qubit, wherein $\omega_t$ is a resonance frequency of the target qubit;
applying a third microwave field with a frequency $2\omega_t-\omega_c$ to the target qubit;
applying a fourth microwave field with a frequency $\omega_c$ to the control qubit; and
applying a fifth microwave field with a frequency $\omega_c$ to the target qubit.

22. The method according to claim 21, wherein:
an amplitude of the first microwave field is constant over the gate time duration;
an amplitude of the second microwave field is time-varying over the gate time duration;
an amplitude of the third microwave field is time-varying over the gate time duration;
an amplitude of the fourth microwave field is time-varying over the gate time duration; and
an amplitude of the fifth microwave field is constant over the gate time duration.

* * * * *

UNITED STATES PATENT AND TRADEMARK OFFICE
CERTIFICATE OF CORRECTION

| | | |
|---|---|---|
| PATENT NO. | : 12,288,135 B2 | Page 1 of 1 |
| APPLICATION NO. | : 17/253460 | |
| DATED | : April 29, 2025 | |
| INVENTOR(S) | : Shruti Puri et al. | |

It is certified that error appears in the above-identified patent and that said Letters Patent is hereby corrected as shown below:

On the Title Page

Item (72), the last name of Inventor Philippe is hereby corrected as shown below:
(72) Inventors: Shruti Puri, New Haven, CT (US);
Alexander Grimm, New Haven, CT (US);
Philippe Campagne-Ibarcq, New Haven, CT (US);
Steven M. Girvin, Hamden, CT (US);
Michel Devoret, New Haven, CT (US)

In the Claims

At Column 40, Claim 9, Line number 56:
"strength of a Kerr nonlinearity of the ancilla SNAIL and a"
Should read:
--strength of a Kerr nonlinearity of the ancilla SNAIL and $\alpha$--

At Column 42, Claim 16, Line number 10:
"ancilla SNAIL and a is a coherent state amplitude associated"
Should read:
--ancilla SNAIL and $\alpha$ is a coherent state amplitude associated--

Signed and Sealed this
Third Day of June, 2025

Coke Morgan Stewart
*Acting Director of the United States Patent and Trademark Office*